(12) United States Patent
Kubo et al.

(10) Patent No.: US 9,596,046 B2
(45) Date of Patent: Mar. 14, 2017

(54) OPTICAL LINE TERMINAL AND OPTICAL NETWORK UNIT

(71) Applicant: NIPPON TELEGRAPH AND TELEPHONE CORPORATION, Chiyoda-ku, Tokyo (JP)

(72) Inventors: Ryogo Kubo, Yokosuka (JP); Jun-ichi Kani, Yokosuka (JP); Akihiro Otaka, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 13/796,800

(22) Filed: Mar. 12, 2013

(65) Prior Publication Data

US 2013/0202302 A1 Aug. 8, 2013

Related U.S. Application Data

(62) Division of application No. 13/148,462, filed as application No. PCT/JP2010/052543 on Feb. 19, 2010, now Pat. No. 8,929,737.

(30) Foreign Application Priority Data

Feb. 24, 2009 (JP) ................................ 2009-040287
Apr. 23, 2009 (JP) ................................ 2009-105179
Apr. 23, 2009 (JP) ................................ 2009-105183

(51) Int. Cl.
*H04J 14/00* (2006.01)
*H04J 14/02* (2006.01)
(Continued)

(52) U.S. Cl.
CPC .......... *H04J 14/0221* (2013.01); *H04B 10/25* (2013.01); *H04L 12/12* (2013.01);
(Continued)

(58) Field of Classification Search
CPC ................ H04L 12/12; H04Q 11/0067; H04Q 2011/0079; H04Q 2011/0083;
(Continued)

(56) References Cited

U.S. PATENT DOCUMENTS 6,574,019 B1 6/2003 Harada
6,898,209 B2 5/2005 Dekeyser
(Continued)

FOREIGN PATENT DOCUMENTS

EP 1 940 051 A1 7/2008
JP 2000-196557 7/2000
(Continued)

OTHER PUBLICATIONS

Haran et al, "ONU power-save annex", ITU-T Drafts, Study Period 2005-2008, International Telecommunication Union, vol. Study Group 15, Apr. 2, 2008, pp. 1-12.*
(Continued)

*Primary Examiner* — Ken N Vanderpuye
*Assistant Examiner* — David Lambert
(74) *Attorney, Agent, or Firm* — Ohlandt, Greeley, Ruggiero & Perle, L.L.P.

(57) ABSTRACT

An optical line terminal which includes an observing unit that observes information of any one or all of an arrival interval of frames, an instantaneous bandwidth under use of a flow, a queue length of a queue temporarily storing the frames, and a traffic type, and a stop determining unit that dynamically determines a sleep time to be a period in which a sleep state where partial functions of the ONU are stopped is maintained, on the basis of the information obtained by the observing unit. The ONU is entered into a sleep state, immediately after communication ends, after a predetermined waiting time passes from when the communication
(Continued)

ends, or after a waiting time determined on the basis of the information passes from when the communication ends.

12 Claims, 41 Drawing Sheets

(51) Int. Cl.
*H04L 12/12* (2006.01)
*H04Q 11/00* (2006.01)
*H04B 10/25* (2013.01)

(52) U.S. Cl.
CPC . *H04Q 11/0067* (2013.01); *H04Q 2011/0079* (2013.01); *H04Q 2011/0083* (2013.01); *Y02B 60/32* (2013.01); *Y02B 60/34* (2013.01)

(58) Field of Classification Search
CPC .... H04Q 2011/0088; H04Q 2011/0064; H04B 10/25; H04J 14/0221; Y02B 60/34
See application file for complete search history.

(56) References Cited

U.S. PATENT DOCUMENTS

| | | | |
|---|---|---|---|
| 7,277,737 B1* | 10/2007 | Vollmer et al. ............... | 455/574 |
| 7,480,295 B2 | 1/2009 | Sung et al. | |
| 7,751,858 B2 | 7/2010 | Chou | |
| 7,826,378 B2 | 11/2010 | Absillis et al. | |
| 8,014,674 B2 | 9/2011 | Gao et al. | |
| 8,023,442 B2 | 9/2011 | Kim et al. | |
| 2005/0049013 A1* | 3/2005 | Chang et al. ............... | 455/574 |
| 2005/0221869 A1 | 10/2005 | Liu et al. | |
| 2006/0168081 A1* | 7/2006 | Okada ....................... | G06F 9/50 709/207 |
| 2007/0274247 A1* | 11/2007 | Chou ............................ | 370/315 |
| 2008/0056290 A1 | 3/2008 | Hedge et al. | |
| 2008/0101354 A1* | 5/2008 | Arndt ............................ | 370/389 |
| 2008/0232794 A1* | 9/2008 | Absillis et al. ............... | 398/9 |
| 2009/0263127 A1* | 10/2009 | Haran et al. .................. | 398/38 |
| 2010/0111523 A1 | 5/2010 | Hirth et al. | |
| 2010/0118753 A1* | 5/2010 | Mandin et al. ............... | 370/311 |

FOREIGN PATENT DOCUMENTS

| | | |
|---|---|---|
| JP | 2004164566 A | 6/2004 |
| JP | 200789027 A | 4/2007 |
| JP | 2007274534 A | 10/2007 |
| JP | 2008-113193 | 5/2008 |
| JP | 2008-263281 | 10/2008 |
| JP | 2009-260970 | 11/2009 |

OTHER PUBLICATIONS

Tatsuta, et al., "Design philosophy and performance of a DE-PON system for mass deployment", Journal of Optical Networking, vol. 6, No. 6, Jun. 2007, pp. 689-700.
Nedevschi, et al., "Reducing Network Energy Consumption via Sleeping and Rate-Adaptation", Proceedings of the 5$^{th}$ USENIX Symposium on Networked Systems Design and Implementation, pp. 326-336, 2008.
International Search Report dated Apr. 20, 2011 for corresponding International Application No. PCT/JP2010/052543 with English translation.
Jeff Mandin, "EPON Powersaving via Sleep Mode", IEEE Draft, vol. 802.3, Sep. 9, 2008, pp. 1-8.
Haran, et al., "Onu Power-Save Annex", ITU-T Drafts, Study Period 2005-2008, International Telecommunication Union, vol. Study Groupl 15; 2, Apr. 1, 2008, pp. 1-12.
Extended European Search Report dated May 25, 2012 for corresponding European Patent Application No. 10746143.6-2416.
International Preliminary Report on Patentability dated Sep. 13, 2011 for corresponding International Patent Application No. PCT/JP2010/052543 with English translation.
Japanese Office Action dated Oct. 29, 2013 corresponding to Japanese Application No. 2012-269140; 5 pages.
Mandin, "EPON Powersaving via Sleep Mode", IEEE Draft, vol. 802.3, Sep. 9, 2008, pp. 1-8.
U.S. Office Action dated Jun. 12, 2014 corresponding to U.S. Appl. No. 13/797,068; 27 pages.

* cited by examiner

Fig. 14

| TRAFFIC AMOUNT (THRESHOLD VALUE = 0) | TRAFFIC OF SPECIFIC TYPE | TRAFFIC OTHER THAN TRAFFIC OF SPECIFIC TYPE | STOP DETERMINATION |
|---|---|---|---|
| NON-EXISTENCE (ZERO) | NON-EXISTENCE | NON-EXISTENCE | STOP |
| EXISTENCE | EXISTENCE | NON-EXISTENCE | STOP |
| EXISTENCE | EXISTENCE | EXISTENCE | NON-STOP |
| EXISTENCE | NON-EXISTENCE | EXISTENCE | NON-STOP |

(61, 62, 63, 64)

| VLAN-ID | TRAFFIC AMOUNT (THRESHOLD VALUE = 0) | TRAFFIC OF SPECIFIC TYPE | TRAFFIC OTHER THAN THAT | STOP DETERMINATION | ASSOCIATED LLID |
|---|---|---|---|---|---|
| k | NON-EXISTENCE (ZERO) | NON-EXISTENCE | NON-EXISTENCE | STOP | k |
| k | EXISTENCE | EXISTENCE | NON-EXISTENCE | STOP | k |
| k | EXISTENCE | EXISTENCE | EXISTENCE | NON-STOP | k |
| k | EXISTENCE | NON-EXISTENCE | EXISTENCE | NON-STOP | k |

OPTICAL LINE TERMINAL AND OPTICAL NETWORK UNIT

BACKGROUND

1. Field of the Disclosure

The present disclosure relates to an optical line terminal and an optical network unit that have a function of saving power of a device by stopping operation of partial functions for a predetermined period in an optical network that performs point-to-point or point-to-multi-point communication.

2. Discussion of the Background Art

As illustrated in FIG. 1, an optical network is a network in which one optical line terminal (OLT) performs point-to-point communication with one optical network unit (ONU) through an optical fiber transmission path.

As illustrated in FIG. 2, a passive optical network (PON) is a network in which one optical line terminal (OLT) performs point-to-multi-point communication with plural optical network units (ONU) through an optical fiber transmission path and a one-to-n optical splitter (n refers to a natural number). As a representative standard of a gigabit-class PON, an Ethernet® PON (EPON) that is standardized in the IEEE802.3 is known. In addition, a 10G-EPON is examined as a 10 gigabit-class PON in the IEEE802.3av examination group.

FIG. 3 is a functional block diagram of a conventional OLT in an EPON. A downlink main signal is transmitted to a PON interface (PON-IF) port 101 through a service node interface (SNI) port 104, a queue managing unit 103, and a PON signal processing unit 102. Meanwhile, an uplink main signal is transmitted to the SNI port 104 through the PON-IF port 101, the PON signal processing unit 102, and the queue managing unit 103. An OLT 100 has a multi-point control protocol (MPCP) unit that reports a data amount in a queue included in the ONU to the ONU using a report message, a band allocating unit that monitors the data amount in the queue included in the ONU on the basis of the report message received from the ONU and allocates an instantaneous bandwidth under use to each ONU, and an operations, administration, and maintenance (OAM) unit that exchanges a control frame for maintenance and monitor with the ONU, as the PON signal processing unit 102.

FIG. 4 is a functional block diagram of a conventional ONU in an EPON. An uplink main signal is transmitted to a PON-IF port 204 through a user network interface (UNI) port 201, a queue managing unit 202, and a PON signal processing unit 203. Meanwhile, a downlink main signal is transmitted to the UNI port 201 through the PON-IF port 204, the PON signal processing unit 203, and the queue managing unit 202. The ONU 200 has an MPCP unit that reports a data amount in a queue to the OLT and an OAM unit that exchanges a control frame for maintenance and monitor with the OLT, as the PON signal processing unit 203.

As a conventional technology that is related to saving of power of a communication terminal, a method that causes a transmitting terminal to monitor a flow control signal from a receiving terminal and perform power saving control is described in Patent Document 1.

FIG. 15 is a diagram illustrating the configuration of an optical network system of a point-to-point type. An optical network of the point-to-point type is a network in which one optical line terminal (OLT) 73 performs one-to-one communication with one optical network unit (ONU) 71 through an optical fiber transmission path 72.

FIG. 16 is a diagram illustrating the configuration of a passive optical network (PON) system of a point-to-multi-point type. The PON is a network in which one optical line terminal (OLT) 830 performs one-to-n communication with plural optical network units (ONU) 81 to 8n through an optical fiber transmission path 820 and a one-to-n (n refers to a natural number) optical splitter 810. As a representative standard of a gigabit-class PON, an Ethernet® PON (EPON) that is standardized in the IEEE802.3 is known.

FIG. 17 is a diagram illustrating the configuration of a conventional OLT in an EPON. An OLT 90 includes a PON interface (PON-IF) 91, a PON signal processing unit 92, a queue managing unit 93, and a service node interface (SNI) 94.

The PON-IF 91 is an interface that is used to connect the OLT and the optical network.

The PON signal processing unit 92 includes a multi-point control protocol (MPCP) module 95, a band allocating module 96, an operations, administration, and maintenance (OAM) module 97, a media access control (MAC) module 98, and a physical layer (PHY) module 99.

The MPCP module 95 reports a data amount in a queue included in the ONU to the ONU using a report message. The band allocating module 96 monitors the data amount in the queue included in the ONU on the basis of the report message received from the ONU and allocates an instantaneous bandwidth under use to each ONU. The OAM module 97 exchanges a control frame for maintenance and monitor with the ONU. The MAC module 98 controls a transmitting/receiving operation of an MAC frame. The PHY module 99 that is a physical layer performs signal conversion between a signal having a MAC frame format and a signal transmitted through the optical network.

The queue managing unit 93 queues data that is exchanged with a service network and manages the data.

The SNI 94 is an interface that is used to connect the OLT and the service network.

A downlink main signal is transmitted to the PON-IF 91 through the SNI 94, the queue managing unit 93, and the PON signal processing unit 92. Meanwhile, an uplink main signal is transmitted to the SNI 94 through the PON-IF 91, the PON signal processing unit 92, and the queue managing unit 93.

FIG. 18 is a diagram illustrating the configuration of a conventional ONU in an EPON. An ONU 100 includes a user network interface (UNI) 101, a queue managing unit 102, a PON signal processing unit 103, and a PON-IF 104.

The UNI 101 is an interface that is used to connect the ONU and a terminal such as a PC or a router.

The queue managing unit 102 queues data that is exchanged with the terminal and manages the data.

The PON signal processing unit 103 includes an MPCP module 105, an OAM module 106, a MAC module 107, and a PHY module 108.

The MPCP module 105 reports a data amount in a queue to the OLT using a report message. The OAM module 106 exchanges a control frame for maintenance and monitor with the OLT. The MAC module 107 controls a transmitting/receiving operation of a MAC frame. The PHY module 108 that is a physical layer performs signal conversion between a signal having a MAC frame format and a signal transmitted through the optical network.

The PON-IF 104 is an interface that is used to connect the ONU and the optical network.

An uplink main signal is transmitted to the PON-IF 104 through the UNI 101, the queue managing unit 102, and the PON signal processing unit 103. Meanwhile, a downlink main signal is transmitted to the UNI 101 through the PON-IF 104, the PON signal processing unit 103, and the queue managing unit 102.

In the IEEE802.3av taskforce, 10G-EPON is examined as a 10 gigabit-class PON. Meanwhile, as a technology for saving power of a communication device, mounting of a sleep method that stops non-used functions in the case where communication in a non-communication state (idle state) or an adaptive link rate method that changes a link rate according to a communication amount is examined (for example, refer to Non-patent Document 2).

In addition, in the IEEE802.3az taskforce, standardization of the power-saving Ethernet® is advanced. As the conventional technology that is related to saving of power of a communication terminal, a method that causes a transmitting terminal to monitor a flow control signal from a receiving terminal and perform power saving control is known (for example, refer to Patent Document 1).

FIG. 19 is a diagram illustrating an autonomous intermittent start method that is an example of the sleep method in two facing communication devices.

A second communication device 112 monitors traffic that is transmitted from a first communication device 111 to the second communication device 112 or from the second communication device 112 to the first communication device 111. Further, it sets threshold values for an arrival interval of transmission frames, an instantaneous bandwidth under use, or a queue length in a buffer, and when it exceeds the threshold values, it is determined to be in a non-communication state. When it is determined to be in the non-communication state, it transmits a sleep request message to the first communication device 111 and stops partial functions of the second communication device 112.

When the second communication device 112 starts up, it communicates with the first communication device 111 (S1102). If the first communication device 111 receives a sleep request from the second communication device 112 (S1103), it transmits a confirmation response (ACK message) to the second communication device 112 (S1104). If the second communication device 112 receives the confirmation response, it stops the partial functions for a predetermined period (S1105).

The second communication device 112 restarts after a predetermined time passes (S1106), confirms existence or non-existence of the traffic with respect to the communication device 1101 (traffic confirmation message) (S1107), and when it is in the non-communication state (NO message) (S1108), it stops the partial functions for a predetermined period (S1109). Further, it restarts after the predetermined time passes (S1110), confirms existence or non-existence of the traffic with respect to the first communication device 111 (S1111), and when frames arrive (YES message) (S1112), it restarts communication with the first communication device 111 (S1113). Hereinafter, the same operation is executed for S1114 to S1124.

The autonomous intermittent start method can be applied to a network of a point-to-point type topology and a point-to-multi-point type topology. For example, in the case of the EPON, power of the ONU can be saved by associating the first communication device 111 with the OLT and associating the second communication device 112 with the ONU.

FIG. 28 is a diagram illustrating the configuration of an optical network system of a point-to-point type. An optical network of a point-to-point type is a network in which one optical line terminal (OLT) 93 performs one-to-one communication with one optical network unit (ONU) 91 through an optical fiber transmission path 92.

FIG. 29 is a diagram illustrating the configuration of a passive optical network (PON) system of a point-to-multi-point type. The PON is a network in which one optical line terminal (OLT) 1030 performs 1-to-n communication with plural optical network units (ONU) 101 to 10*n* through an optical fiber transmission path 1020 and a one-to-n (n refers to a natural number) optical splitter 1010. As a representative standard of a gigabit-class PON, an Ethernet® PON (EPON) that is standardized in the IEEE802.3 is known.

FIG. 30 is a diagram illustrating the configuration of a conventional OLT in an EPON. An OLT 110 includes a PON interface (PON-IF) 111, a PON signal processing unit 112, a queue managing unit 113, and a service node interface (SNI) 114.

The PON-IF 111 is an interface that is used to connect the OLT 110 and an optical network.

The PON signal processing unit 112 includes a multi-point control protocol (MPCP) module 115, a band allocating module 116, an operations, administration, and maintenance (OAM) module 117, a media access control (MAC) module 118, and a physical layer (PHY) module 119.

The MPCP module 115 reports a data amount in a queue included in the ONU to the ONU using a report message. The band allocating module 116 monitors the data amount in the queue included in the ONU, on the basis of the report message received from the ONU, and allocates an instantaneous bandwidth under use to each ONU. The OAM module 117 exchanges a control frame for maintenance and monitor with the ONU. The MAC module 118 controls a transmitting/receiving operation of a MAC frame. The PHY module 119 that is a physical layer performs signal conversion between a signal having a MAC frame format and a signal transmitted through the optical network.

The queue managing unit 113 queues data that is exchanged with a service network and manages the data.

The SNI 114 is an interface that is used to connect the OLT and the service network.

A downlink main signal is transmitted to the PON-IF 111 through the SNI 114, the queue managing unit 113, and the PON signal processing unit 112. Meanwhile, an uplink main signal is transmitted to the SNI 114 through the PON-IF 111, the PON signal processing unit 112, and the queue managing unit 113.

FIG. 31 is a diagram illustrating the configuration of a conventional ONU in an EPON. An ONU 120 includes a user network interface (UNI) 121, a queue managing unit 122, a PON signal processing unit 123, and a PON-IF 124.

The UNI 121 is an interface that is used to connect the ONU 120 and a terminal such as a PC or a router.

The queue managing unit 122 queues data that is exchanged with the terminal and manages the data.

The PON signal processing unit 123 includes an MPCP module 125, an OAM module 126, a MAC module 127, and a PHY module 128.

The MPCP module 125 reports a data amount in a queue to the OLT using a report message. The OAM module 126 exchanges a control frame for maintenance and monitor with the OLT. The MAC module 127 controls a transmitting/receiving operation of a MAC frame. The PHY module 128 that is a physical layer performs signal conversion between a signal having a MAC frame format and a signal transmitted through the optical network.

The PON-IF 124 is an interface that is used to connect the ONU and the optical network.

An uplink main signal is transmitted to the PON-IF 124 through the UNI 121, the queue managing unit 122 and the PON signal processing unit 123. Meanwhile, a downlink main signal is transmitted to the UNI 121 through the PON-IF 124, the PON signal processing unit 123, and the queue managing unit 122.

In the IEEE802.3av taskforce, 10G-EPON is examined as a 10 gigabit-class PON. Meanwhile, as a technology for saving power of a communication device, mounting of a sleep method that stops non-used functions in the case where communication is in a non-communication state (idle state) or an adaptive link rate method that changes a link rate according to a communication amount is examined (for example, refer to Non-patent Document 2).

In addition, in the IEEE802.3az taskforce, standardization of the power-saving Ethernet® is being progressed. As the conventional technology that is related to saving of power of a communication terminal, a method that causes a transmitting terminal to monitor a flow control signal from a receiving terminal and perform power saving control is known (for example, refer to Patent Document 1).

FIG. 32 is a diagram illustrating a master/slave type intermittent start method as an example of the sleep method in two facing communication devices.

A first communication device 131 monitors traffic that is transmitted from the first communication device 131 to a second communication device 132 or from the second communication device 132 to the first communication device 131. Further, it sets threshold values for an arrival interval of transmission frames, an instantaneous bandwidth under use, or a queue length in a buffer, and when it exceeds the threshold values, it is determined to be in a non-communication state. When it is determined to be in the non-communication state, it transmits a sleep instruction message to the second communication device 132 and stops partial functions of the second communication device 132.

When the second communication device 132 starts up (S1301), it communicates with the first communication device 131 (S1302). If the second communication device 132 receives a sleep instruction from the first communication device 131 (S1303), it transmits a confirmation response (ACK message) to the first communication device 131 (S1304). Then, the second communication device 132 stops the partial functions for a predetermined period (S1305).

The second communication device 132 restarts after a predetermined time passes (S1306), confirms existence or non-existence of the traffic with respect to the first communication device 131 (traffic confirmation message) (S1307), and when it is in the non-communication state (NO message) (S1308), stops the partial functions for a predetermined period (S1309). Further, it restarts after the predetermined time passes (S1310), confirms existence or non-existence of the traffic with respect to the first communication device 131 (S1311), and when frames arrive (YES message) (S1312), restarts communication with the first communication device 131 (S1313). Hereinafter, the same operation is executed for S1314 to S1324.

The master/slave type intermittent start method can be applied to a network of a point-to-point type topology and a point-to-multi-point type topology. For example, in the case of the EPON, power of the ONU can be saved by associating the first communication device 131 with the OLT and associating the second communication device 132 with the ONU.

FIG. 33 is a diagram illustrating the configuration of an optical network system of a point-to-point type. An optical network of a point-to-point type is a network in which one optical line terminal (OLT) 13 performs one-to-one communication with one optical network unit (ONU) 11 through an optical fiber transmission path 12.

FIG. 34 is a diagram illustrating the configuration of a passive optical network (PON) system of a point-to-multi-point type. The PON is a network in which one optical line terminal (OLT) 230 performs 1-to-n communication with plural optical network units (ONU) 21 to 2n through an optical fiber transmission path 220 and a one-to-n (n refers to a natural number) optical splitter 210. As a representative standard of a gigabit-class PON, an Ethernet® PON (EPON) that is standardized in the IEEE802.3 is known.

FIG. 35 is a diagram illustrating the configuration of a conventional OLT in an EPON. An OLT 30 includes a PON interface (PON-IF) 31, a PON signal processing unit 32, a queue managing unit 33, and a service node interface (SNI) 34. The PON-IF 31 is an interface that is used to connect the OLT and an optical network.

The PON signal processing unit 32 includes a multi-point control protocol (MPCP) module 35, a band allocating module 36, an operations, administration, and maintenance (OAM) module 37, a media access control (MAC) module 38, and a physical layer (PHY) module 39.

The MPCP module 35 reports a data amount in a queue included in the ONU to the ONU using a report message. The band allocating module 36 monitors the data amount in the queue in the ONU, on the basis of the report message received from the ONU, and allocates an instantaneous bandwidth under use to each ONU. The OAM module 37 exchanges a control frame for maintenance and monitor with the ONU. The MAC module 38 controls a transmitting/receiving operation of a MAC frame. The PHY module 39 that is a physical layer performs signal conversion between a signal having a MAC frame format and a signal transmitted through the optical network.

The queue managing unit 33 queues data that is exchanged with a service network and manages the data. The SNI 34 is an interface that is used to connect the OLT and the service network. A downlink main signal is transmitted to the PON-IF 31 through the SNI 34, the queue managing unit 33, and the PON signal processing unit 32. Meanwhile, an uplink main signal is transmitted to the SNI 34 through the PON-IF 31, the PON signal processing unit 32, and the queue managing unit 33.

FIG. 36 is a diagram illustrating the configuration of a conventional ONU in an EPON. An ONU 40 includes a user network interface (UNI) 41, a queue managing unit 42, a PON signal processing unit 43, and a PON-IF 44.

The UNI 41 is an interface that is used to connect the ONU and a terminal such as a PC or a router. The queue managing unit 42 queues data that is exchanged with the terminal and manages the data. The PON signal processing unit 43 includes an MPCP module 45, an OAM module 46, a MAC module 47, and a PHY module 48.

The MPCP module 45 reports a data amount in a queue to the OLT using a report message. The OAM module 46 exchanges a control frame for maintenance and monitor with the OLT. The MAC module 47 controls a transmitting/receiving operation of a MAC frame. The PHY module 48 that is a physical layer performs signal conversion between a signal having a MAC frame format and a signal transmitted through the optical network. The PON-IF 44 is an interface that is used to connect the ONU and the optical network.

An uplink main signal is transmitted to the PON-IF 44 through the UNI 41, the queue managing unit 42 and the PON signal processing unit 43. Meanwhile, a downlink main signal is transmitted to the UNI 41 through the PON-IF 44, the PON signal processing unit 43, and the queue managing unit 42.

In the IEEE802.3av taskforce, 10G-EPON is examined as a 10 gigabit-class PON. Meanwhile, as a technology for saving power of a communication device, mounting of a sleep method that stops non-used functions in the case where communication is in a non-communication state (idle state) or an adaptive link rate method that changes a link rate according to a communication amount is examined (for example, refer to Non-patent Document 2).

In addition, in the IEEE802.3az taskforce, standardization of the power-saving Ethernet® is being progressed. As the conventional technology that is related to saving of power of a communication terminal, a method that causes a transmitting terminal to monitor a flow control signal from a receiving terminal and perform power saving control is known (for example, refer to Patent Document 1).

FIG. 37 is a diagram illustrating an autonomous intermittent start method as an example of the sleep method in two facing communication devices.

A second communication device 52 monitors traffic that is transmitted from a first communication device 51 to the second communication device 52 or from the second communication device 52 to the first communication device 51. Further, it sets threshold values for an arrival interval of transmission frames, an instantaneous bandwidth under use, or a queue length in a buffer, and when it exceeds the threshold values, it is determined to be in a non-communication state. When it is determined to be in the non-communication state, it transmits a sleep request message to the first communication device 51 and stops partial functions of the second communication device 52.

When the second communication device 52 starts up (step S501), it communicates with the first communication device 51 (S502). If the first communication device 51 receives a sleep request from the second communication device 52 (S503), it transmits a confirmation response (ACK message) to the second communication device 52 (S504). If the second communication device 52 receives the confirmation response, it stops the partial functions for a predetermined period (S505).

The second communication device 52 restarts after a predetermined time passes (S506), confirms existence or non-existence of the traffic with respect to the first communication device 51 (traffic confirmation message) (S507), and when it is in the non-communication state (NO message) (S508), stops the partial functions for a predetermined period (S509). Further, it restarts after the predetermined period passes (S510), confirms existence or non-existence of the traffic with respect to the first communication device 51 (S511), and when frames arrive (YES message) (S512), restarts communication with the first communication device 51 (S513). Hereinafter, the same operation is executed for S514 to S524.

The autonomous intermittent start method can be applied to a network of a point-to-point type topology and a point-to-multi-point type topology. For example, in the case of the EPON, power of the ONU can be saved by associating the first communication device 51 with the OLT and associating the second communication device 52 with the ONU.

FIG. 38 is a diagram illustrating a master/slave type intermittent start method as an example of the sleep method in two facing communication devices.

A third communication device 61 monitors traffic that is transmitted from the third communication device 61 to a fourth communication device 62 or from the fourth communication device 62 to the third communication device 61. Further, it sets threshold values for an arrival interval of transmission frames, an instantaneous bandwidth under use, or a queue length in a buffer, and when it exceeds the threshold values, it is determined to be in a non-communication state. When it is determined to be in the non-communication state, it transmits a sleep instruction message to the fourth communication device 62 and stops partial functions of the fourth communication device 62.

When the fourth communication device 62 starts up (S601), it communicates with the third communication device 61 (S602). If the fourth communication device 62 receives a sleep instruction from the third communication device 61 (S603), it transmits a confirmation response (ACK message) to the third communication device 61 (S604). Then, the fourth communication device 62 stops partial functions for a predetermined period (S605).

The fourth communication device 62 restarts after the predetermined time passes (S606), confirms existence or non-existence of the traffic with respect to the third communication device 61 (traffic confirmation message) (S607), and when it is in the non-communication state (NO message) (S608), stops the partial functions for a predetermined period (S609). Further, it restarts after the predetermined period passes (S610), confirms existence or non-existence of the traffic with respect to the third communication device 61 (S611), and when frames arrive (YES message) (S612), restarts communication with the third communication device 61 (S613). Hereinafter, the same operation is executed for S614 to S624.

The master/slave type intermittent start method can be applied to a network of a point-to-point type topology and a point-to-multi-point type topology. For example, in the case of the EPON, power of the ONU can be saved by associating the third communication device 61 with the OLT and associating the fourth communication device 62 with the ONU.

Patent Document 1: Japanese Patent Application Laid-Open No. 2008-263281

NON-PATENT DOCUMENT

Non-patent Document 1: Tsutomu Tatsuta, Noriyuki Oota, Noriki Miki, and Kiyomi Kumozaki, "Design philosophy and performance of a GE-PON system for mass deployment", JOURNAL OF OPTICAL NETWORKING, Vol. 6, No. 6, June 2007.

Non-patent Document 2: Sergiu Nedevschi, Lucian Popa, Gianluca Iannaccone, Sylvia Ratnasamy, David Wetherall, "Reducing network energy consumption via sleeping and rate-adaptation", Proceedings of the 5th USENIX Symposium on Networked Systems Design and Implementation, pp. 323-336, 2008.

However, in the PON that performs the point-to-multi-point communication through the optical splitter, the signal that is transmitted from the OLT may be physically broadcast to all ONUs. For this reason, only the specific ONU cannot be returned from the sleep state with ON/OFF of a physical signal as a trigger, and the other ONUs that enter into the sleep state may be returned from the sleep state. As a result, there has been a problem in that an increase in consumption power of the entire optical network may be caused by connecting the plural ONUS in the non-communication state.

Further, even in the optical network that performs the point-to-point communication, there has been a problem in that a receiving unit of the ONU cannot be completely stopped to return the ONU from the sleep state with ON/OFF of the physical signal as the trigger.

SUMMARY OF THE DISCLOSURE

The present disclosure has been made in view of the above problems and a first object of the present disclosure is to provide an optical line terminal and an optical network unit that can solve a problem of an increase in consumption power of an entire optical network because plural ONUS in a non-communication state are connected.

In the communication devices described above, similar to unknown traffic, a communication state is determined using only an arrival interval of frames, an instantaneous bandwidth under use, or a queue length in a buffer, with respect to traffic of which traffic characteristics such as the frame arrival interval and the instantaneous bandwidth under use are previously known. For this reason, there has been a problem in that disconnection or an increase in frame transmission delay may be caused due to carelessness.

To solve the above problem, a second object of the present disclosure is to provide an optical line terminal and an optical network unit that can save power of communication devices without deteriorating a communication quality of specific traffic.

In the communication devices described above, similar to unknown traffic, a communication state is determined using only an arrival interval of frames, an instantaneous bandwidth under use, or a queue length in a buffer, with respect to traffic of which traffic characteristics such as the frame arrival interval and the instantaneous bandwidth under use are previously known. For this reason, there is a problem in that disconnection or an increase in frame transmission delay may be caused due to carelessness.

To solve the above problem, a third object of the present disclosure is to provide an optical line terminal and an optical network unit that can save power of communication devices without deteriorating a communication quality of specific traffic.

In the devices described above, the stop time of the partial functions of the ONU is set to a predetermined value, so that there has been a problem in that consumption power of the ONU cannot be efficiently decreased according to the traffic characteristics, such as the frame arrival interval, the instantaneous bandwidth under use, the queue length in the buffer, and the traffic type.

The present disclosure has been made in view of the above problems and a fourth object of the present disclosure is to provide an optical line terminal and an optical network unit that can solve a problem of an increase in consumption power of an entire optical network which results from plural ONUS being connected in a non-communication state.

In order to achieve the first object described above, the present disclosure provides an optical line terminal in an optical network in which the optical line terminal (OLT) and an optical network unit (ONU) communicate with each other through an optical fiber transmission path, the optical line terminal including: an observing unit that observes information of at least one of an arrival interval of frames transmitted to the ONU or frames received from the ONU, an instantaneous bandwidth under use of a flow transmitted to the ONU or a flow received from the ONU, and a queue length of a queue temporarily storing the frames transmitted to the ONU or a queue temporarily storing the frames received from the ONU; and a calculating unit that dynamically determines a sleep time to be a period in which a sleep state where non-used functions of the ONU are stopped is maintained, on the basis of the information obtained by the observing unit, wherein there is a characteristic that a control signal to notify the ONU of a sleep state entering request and the sleep time is transmitted to the ONU, immediately after communication with the ONU ends, after a predetermined time passes from when the communication with the ONU ends, or after a time determined on the basis of the information passes from when the communication with the ONU ends.

It is preferable that a maximum value and a minimum value are set for the sleep time, and the ONU is maintained in a normal state in the case of at least one of the case where the arrival interval of the frames obtained by the observing unit is smaller than a threshold value of the arrival interval of the frames, the case where the instantaneous bandwidth under use is greater than a threshold value of the instantaneous bandwidth under use, and the case where the queue length is greater than a threshold value of the queue length, and the ONU is entered into the sleep state in the case of at least one of the case where the arrival interval of the frames obtained by the observing unit is equal to or greater than the threshold value of the arrival interval of the frames, the case where the instantaneous bandwidth under use is equal to or smaller than the threshold value of the instantaneous bandwidth under use, and the case where the queue length is equal to or smaller than the threshold value of the queue length, and the sleep time is set to a value between the maximum value and the minimum value.

It is preferable that, when the arrival interval of the frames obtained by the observing unit is equal to or greater than the threshold value of the arrival interval of the frames, the sleep time is calculated using following equations:

$T1 = T\min + (T\max - T\min) * f(p)$ $f(p) = (1 - (Th1/p))$ or $f(p) = (p - Th1)/(Th1' - Th1)$ (in this case, T1 indicates the sleep time, Tmin indicates the minimum value of the sleep time, Tmax indicates the maximum value of the sleep time, Th1 indicates the threshold value of the arrival interval of the frames, p indicates the arrival interval of the frames, and Th1' indicates the maximum threshold value of the arrival interval of the frames), when the instantaneous bandwidth under use obtained by the observing unit is equal to or smaller than the threshold value of the instantaneous bandwidth under use, the sleep time is calculated using following equations:

$T1 = T\min + (T\max - T\min) * f(B)$ $f(B) = (1 - (B/Th2))$ or $f(B) = (Th2 - B)/(Th2 - Th2')$ (in this case, T1 indicates the sleep time, Tmin indicates the minimum value of the sleep time, Tmax indicates the maximum value of the sleep time, Th2 indicates the threshold value of the instantaneous bandwidth under use, B indicates the instantaneous bandwidth under use, and Th2' indicates the minimum threshold value of the instantaneous bandwidth under use), when the queue length obtained by the observing unit is equal to or smaller than the threshold value of the queue length, the sleep time is calculated using following equations:

$T1 = T\min + (T\max - T\min) * f(q)$ $f(q) = (1 - (q/Th3))$ or $f(q) = (Th3 - q)/(Th3 - Th3')$ (in this case, T1 indicates the sleep time, Tmin indicates the minimum value of the sleep time, Tmax indicates the maximum value of the sleep time, Th3 indicates the threshold value of the queue length, q indicates the queue length, and Th3' indicates the minimum threshold value of the queue length), and any one of the calculated sleep times is determined as the sleep time.

It is preferable that an average value of information obtained during a past predetermined period is used in at least one of the information of the arrival interval of the frames, the instantaneous bandwidth under use, and the queue length.

The present disclosure also provides an optical line terminal in an optical network in which the optical line terminal (OLT) and an optical network unit (ONU) communicate with each other through an optical fiber transmission path, the optical line terminal including: an observing unit that observes at least one of protocol information and priority information of frames transmitted to the ONU and frames received from the ONU; a table where the priority information and/or the protocol information is associated with a sleep time to be a period in which a sleep state where non-used functions of the ONU are stopped is maintained; and a table associating unit that dynamically determines the sleep time of the ONU by referring to the table, on the basis of the priority information and/or the protocol information obtained by the observing unit, wherein there is a characteristic that a control signal to notify the ONU of a sleep state entering request and the sleep time is transmitted to the ONU, immediately after communication with the ONU ends, after a predetermined time passes from when the communication with the ONU ends, or after a time determined on the basis of the priority information and/or the protocol information passes from when the communication with the ONU ends.

The present disclosure also provides an optical network unit in an optical network in which an optical line terminal (OLT) and the optical network unit (ONU) communicate with each other through an optical fiber transmission path, the optical network unit including: a sleep unit that stops non-used functions to enter into a sleep state, wherein there is a characteristic that a sleep state entering request and a sleep time to be a period in which the sleep state is maintained are recognized using a control signal received from the OLT, the optical network unit enters into the sleep state by the sleep unit, immediately after the control signal is received, after a predetermined time passes from when the control signal is received, or after a time designated by the OLT passes, and the optical network unit returns to a normal state after the sleep time passes.

The present disclosure also provides an optical network system including: one optical line terminal (OLT) described above; and one optical network unit (ONU) described above, wherein there is a characteristic that the OLT performs point-to-point communication with the ONU through an optical fiber transmission path.

The present disclosure also provides an optical network system including: one optical line terminal (OLT) described above; and a plurality of optical network units (ONU) described above, wherein there is a characteristic that the OLT performs point-to-multi-point communication with the ONUS through an optical fiber transmission path.

The present disclosure also provides a method of controlling a sleep state of an optical network unit in an optical network in which an optical line terminal (OLT) and the optical network unit (ONU) communicate with each other through an optical fiber transmission path, wherein there is a characteristic that the method includes: a step that OLT observes information of at least one of an arrival interval of frames transmitted to the ONU or frames received from the ONU, an instantaneous bandwidth under use of a flow transmitted to the ONU or a flow received from the ONU, and a queue length of a queue temporarily storing the frames transmitted to the ONU or a queue temporarily storing the frames received from the ONU; a step that OLT dynamically determines a sleep time to be a period in which a sleep state where non-used functions of the ONU are stopped is maintained, on the basis of the information obtained by the observing; a step that OLT transmits a control signal to notify the ONU of a sleep state entering request and the sleep time to the ONU, immediately after communication with the ONU ends, after a predetermined time passes from when the communication with the ONU ends, or after a time determined on the basis of the information passes from when the communication with the ONU ends; a step that ONU recognizes the sleep state entering request and the sleep time using the control signal received from the OLT; and a step that ONU enters into the sleep state immediately after the control signal is received, after a predetermined time passes from when the control signal is received, or after a time designated by the OLT passes from when the control signal is received, and return to a normal state after the sleep time passes.

The present disclosure also provides a method of controlling a sleep state of an optical network unit in an optical network in which an optical line terminal (OLT) and the optical network unit (ONU) communicate with each other through an optical fiber transmission path, wherein there is a characteristic that the method includes: a step that OLT observes at least one of protocol information and priority information of frames transmitted to the ONU and frames received from the ONU; a step that OLT dynamically determines the sleep time of the ONU by referring to a table where the priority information and/or the protocol information is associated with a sleep time to be a period in which a sleep state where non-used functions of the ONU are stopped is maintained, on the basis of the priority information and/or the protocol information to be observed; a step that OLT transmits a control signal to notify the ONU of a sleep state entering request and the sleep time to the ONU, immediately after communication with the ONU ends, after a predetermined time passes from when the communication with the ONU ends, or after a time determined on the basis of the priority information and/or the protocol information passes from when the communication with the ONU ends; a step that ONU recognizes the sleep state entering request and the sleep time using the control signal received from the OLT; and a step that ONU enters into the sleep state immediately after the control signal is received, after a predetermined time passes from when the control signal is received, or after a time designated by the OLT passes from when the control signal is received, and return to a normal state after the sleep time passes.

Also, there is a characteristic in order to solve the second problem described above, when the specific traffic exists, the second communication device has a function of stopping or canceling the partial functions of the second communication device, so that power of the second communication device is saved while a communication quality is maintained. That is, an optical network unit according to the present disclosure is an ONU that is used in an optical network in which one optical line terminal (OLT) performs point-to-point or point-to-multi-point communication with one or more optical network units (ONU) through an optical fiber transmission path and saves power of the optical network. The ONU includes an observing unit that observes a traffic amount in a predetermined time and existence or non-existence of traffic of one or more specific types in the predetermined time, a stop determining unit that determines whether partial functions of the ONU are stopped, on the basis of the traffic amount and the existence or non-existence of the traffic of the specific types observed by the observing unit, and a stopping unit that stops the partial functions of the ONU for a second predetermined time, when the stop determining unit determines the stop of the partial functions.

Also, there is a characteristic in the optical network unit according to the present disclosure, the stop determining unit has a function of determining the non-stop of the partial functions, when the traffic amount observed by the observing unit is equal to or smaller than a threshold value but the traffic of the specific types exists.

Also, there is a characteristic in the optical network unit according to the present disclosure, the stop determining unit has a function of determining the stop of the partial functions, when the traffic amount observed by the observing unit is equal to or greater than the threshold value and the traffic is only traffic of specific types transmitted with a predetermined cycle.

Also, there is a characteristic in the optical network unit according to the present disclosure, the stop determining unit determines that the traffic of the specific types exists, when the observing unit observes one or more frames corresponding to the traffic of the specific types in the first predetermined time or a session of the traffic of the specific types is continuing in the first predetermined time.

Also, there is a characteristic in the optical network unit according to the present disclosure, the observing unit uses a value of a type of service (ToS) or a value of a class of service (CoS) and/or a report message transmitted to the OLT, when the frames of the specific types are observed.

Also, there is a characteristic in the optical network unit according to the present disclosure, the observing unit does not observe the frames that are discarded in the ONU.

Also, there is a characteristic in the optical network unit according to the present disclosure, the traffic of the specific types includes at least one of voice over Internet protocol (VoIP) traffic, real-time transport protocol (RTP) traffic, and traffic having the specific priority.

Also, there is a characteristic in the optical network unit according to the present disclosure, the ONU has a unit of notifying the OLT that the partial functions of the ONU are stopped or the partial functions of the ONU are not stopped.

Also, there is a characteristic in the optical network unit according to the present disclosure, the stopping unit has a function of immediately starting the stopped partial functions, when the frames from a terminal connected to the ONU are received, while the partial functions are stopped.

Further, an optical line terminal according to the present disclosure is connected to the optical network unit of any one of a first to ninth aspects, wherein there is a characteristic that the OLT includes a unit that temporarily stores the arrived frames, when the traffic to be transmitted to the ONU is generated, while the ONU stops the partial functions In order to solve the third problem described above, when the specific traffic exists, the first communication device has a function of stopping or canceling the partial functions of the second communication device, so that power of the second communication device is saved while a communication quality is maintained. That is, an optical line terminal according to the present disclosure is an OLT that is used in an optical network in which one optical line terminal (OLT) performs point-to-point or point-to-multi-point communication with one or more optical network units (ONU) through an optical fiber transmission path and saves power of the optical network. It is a characteristic of the OLT to include an observing unit that observes a traffic amount in a first predetermined time and existence or non-existence of traffic of one or more specific types in the first predetermined time, for each traffic with respect to each ONU connected to the OLT, and a stop determining unit that determines whether partial functions of the ONU are stopped, on the basis of the traffic amount and the existence or non-existence of the traffic of the specific types observed by the observing unit.

Also, there is a characteristic in the optical line terminal according to the present disclosure, the stop determining unit has a function of determining the non-stop of the partial functions, when the traffic amount observed by the observing unit is equal to or smaller than a threshold value but the traffic of the specific types exists.

Also, there is a characteristic in the optical line terminal according to the present disclosure, the stop determining unit has a function of determining the stop of the partial functions, when the traffic amount observed by the observing unit is equal to or greater than the threshold value and the traffic is only traffic of specific types transmitted with a predetermined cycle.

Also, there is a characteristic in the optical line terminal according to the present disclosure, the stop determining unit determines that the traffic of the specific types exists, when the observing unit observes one or more frames corresponding to the traffic of the specific types in the first predetermined time or the observing unit observes that a session of the traffic of the specific types is continuing in the first predetermined time.

Also, there is a characteristic in the optical line terminal according to the present disclosure, the observing unit uses a value of a type of service (ToS) or a value of a class of service (CoS) and/or a report message received from the ONU, when the frames of the specific type are observed.

Also, there is a characteristic in the optical line terminal according to the present disclosure, the observing unit does not observe the frames that are discarded in the ONU.

Also, there is a characteristic in the optical line terminal according to the present disclosure, the traffic of the specific types includes at least one of voice over Internet protocol (VoIP) traffic, real-time transport protocol (RTP) traffic, and traffic having the specific priority.

Also, there is a characteristic in the optical line terminal according to the present disclosure, the ONU further includes a unit that temporarily stores the arrived frames, when the ONU is in a stop state and the traffic to be transmitted to the ONU is generated.

Further, according to the present disclosure, an optical network unit that is connected to the optical line terminal of any one of the first to eighth aspects, wherein there is a characteristic that the ONU includes a stopping unit that stops the partial functions of the ONU for a second predetermined time, when the stop determining unit of the OLT determines the stop of the partial functions.

Also, there is a characteristic in the optical network unit, the stopping unit has a function of immediately starting the stopped partial functions, when the frames are received from a terminal connected to the ONU, while the partial functions are stopped.

In order to solve the fourth problem described above, the present disclosure provides an optical network in which one optical line terminal (OLT) performs point-to-point or pointto-multi-point communication with one or more optical network units (ONU) through an optical fiber transmission path, wherein there is a characteristic that the OLT or the ONU includes: an observing unit that observes information of at least one of an arrival interval of frames, an instantaneous bandwidth under use of a flow, a queue length of a queue temporarily storing the frames, and a traffic type; and a stop determining unit that dynamically determines a sleep time to be a period in which a sleep state where partial functions of the ONU are stopped is maintained, on the basis of the information obtained by the observing unit, and wherein there is a characteristic that the ONU includes: a stopping unit that enters the ONU into a sleep state, immediately after communication ends, after a predetermined waiting time passes from when the communication ends, or after a waiting time determined by the stop determining unit on the basis of the information passes from when the communication ends.

Also, there is a characteristic in the optical network according to the present disclosure, the stop determining unit sets a maximum value and a minimum value for the sleep time, and maintains the ONU in a normal state, in the case of at least one of the case where the arrival interval of the frames obtained by the observing unit is smaller than a threshold value of the arrival interval of the frames, the case where the instantaneous bandwidth under use is greater than a threshold value of the instantaneous bandwidth under use, and the case where the queue length is greater than a threshold value of the queue length, and the stop determining unit enters the ONU into the sleep state in the case of at least one of the case where the arrival interval of the frames obtained by the observing unit is equal to or greater than the threshold value of the arrival interval of the frames, the case where the instantaneous bandwidth under use is equal to or smaller than the threshold value of the instantaneous bandwidth under use, and the case where the queue length is equal to or smaller than the threshold value of the queue length, and sets the sleep time to a value between the maximum value and the minimum value.

There is a characteristic in the optical network according to the present disclosure that, when the arrival interval of the frames obtained by the observing unit is equal to or greater than the threshold value of the arrival interval of the frames, the stop determining unit calculates the sleep time using following equations:

$$T1 = Tmin + (Tmax - Tmin) * f(p)$$

$$f(p) = (1 - (Th1/p)) \text{ or}$$

$$f(p) = (p - Th1)/(Th1' - Th1)$$

(in this case, T1 indicates the sleep time, Tmin indicates the minimum value of the sleep time, Tmax indicates the maximum value of the sleep time, Th1 indicates the threshold value of the arrival interval of the frames, p indicates the arrival interval of the frames, and Th1' indicates the maximum threshold value of the arrival interval of the frames), when the instantaneous bandwidth under use obtained by the observing unit is equal to or smaller than the threshold value of the instantaneous bandwidth under use, the stop determining unit calculates the sleep time using following equations:

$$T1 = Tmin + (Tmax - Tmin) * f(B)$$

$$f(B) = (1 - (B/Th2)) \text{ or}$$

$$f(B) = (Th2 - B)/(Th2 - Th2')$$

(in this case, T1 indicates the sleep time, Tmin indicates the minimum value of the sleep time, Tmax indicates the maximum value of the sleep time, Th2 indicates the threshold value of the instantaneous bandwidth under use, B indicates the instantaneous bandwidth under use, and Th2' indicates the minimum threshold value of the instantaneous bandwidth under use), when the queue length obtained by the observing unit is equal to or smaller than the threshold value of the queue length, the stop determining unit calculates the sleep time using following equations:

$$T1 = Tmin + (Tmax - Tmin) * f(q)$$

$$f(q) = (1 - (q/Th3)) \text{ or}$$

$$f(q) = (Th3 - q)/(Th3 - Th3')$$

(in this case, T1 indicates the sleep time, Tmin indicates the minimum value of the sleep time, Tmax indicates the maximum value of the sleep time, Th3 indicates the threshold value of the queue length, q indicates the queue length, and Th3' indicates the minimum threshold value of the queue length), and any one of the calculated sleep times is determined as the sleep time.

There is a characteristic in the optical network according to the present disclosure that, the stop determining unit uses an average value of information obtained during a past predetermined period in at least one of information of the arrival interval of the frames, the instantaneous bandwidth under use, and the queue length.

There is a characteristic in the optical network according to the present disclosure that, the stop determining unit determines that the ONU is maintained in the normal state, when the traffic of the specific types is observed by the observing unit.

There is a characteristic in the optical network according to the present disclosure that, the observing unit uses a value of a type of service (ToS) or a value of a class of service (CoS) and/or a report message transmitted to the OLT, when the traffic of the specific types is observed.

There is a characteristic in the optical network according to the present disclosure that, the observing unit does not observe the frames that are discarded in the ONU.

There is a characteristic in the optical network according to the present disclosure that, the traffic of the specific types includes at least one of voice over Internet protocol (VoIP) traffic, real-time transport protocol (RTP) traffic, and traffic having the specific priority.

There is a characteristic in the optical network according to the present disclosure that, the ONU has a function of notifying the OLT that the partial functions of the ONU are stopped or the partial functions of the ONU are not stopped.

There is a characteristic in the optical network according to the present disclosure that, the stopping unit of the ONU has a function of immediately starting the stopped partial functions, when the frames are received from the terminal connected to the ONU, while the partial functions are stopped.

There is a characteristic in the optical network according to the present disclosure that, the OLT includes a unit that temporarily stores the arrived frames, when the traffic to be transmitted to the ONU is generated, while the ONU stops the partial functions.

The present disclosure can provide an optical line terminal and an optical network unit that can solve a problem of an increase in consumption power of an entire optical network which results from plural ONUS being connected in a non-communication state.

BRIEF DESCRIPTION OF THE DRAWINGS

FIG. 14 is a diagram illustrating a stop determining method of an ONU according to Embodiment 2-3 of the present disclosure.

FIG. 27 is a diagram illustrating a stop determining method of an OLT according to Embodiment 3-3 of the present disclosure.

DETAILED DESCRIPTION OF THE PREFERRED EMBODIMENT

Figure 1:
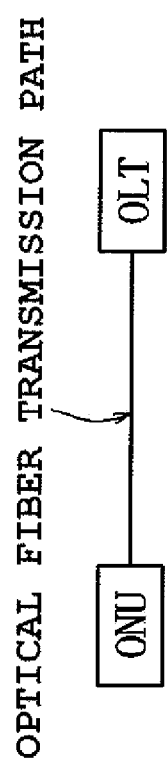
FIG. 1 is a diagram illustrating the configuration of an optical network system.
Figure 2:
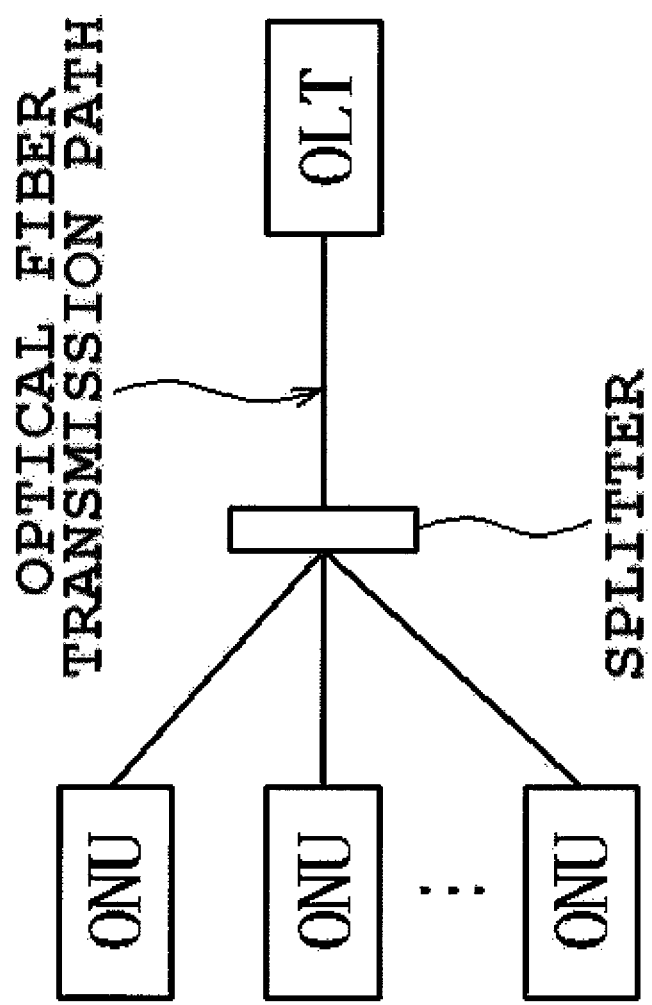
FIG. 2 is a diagram illustrating the configuration of a PON system.
Figure 3:
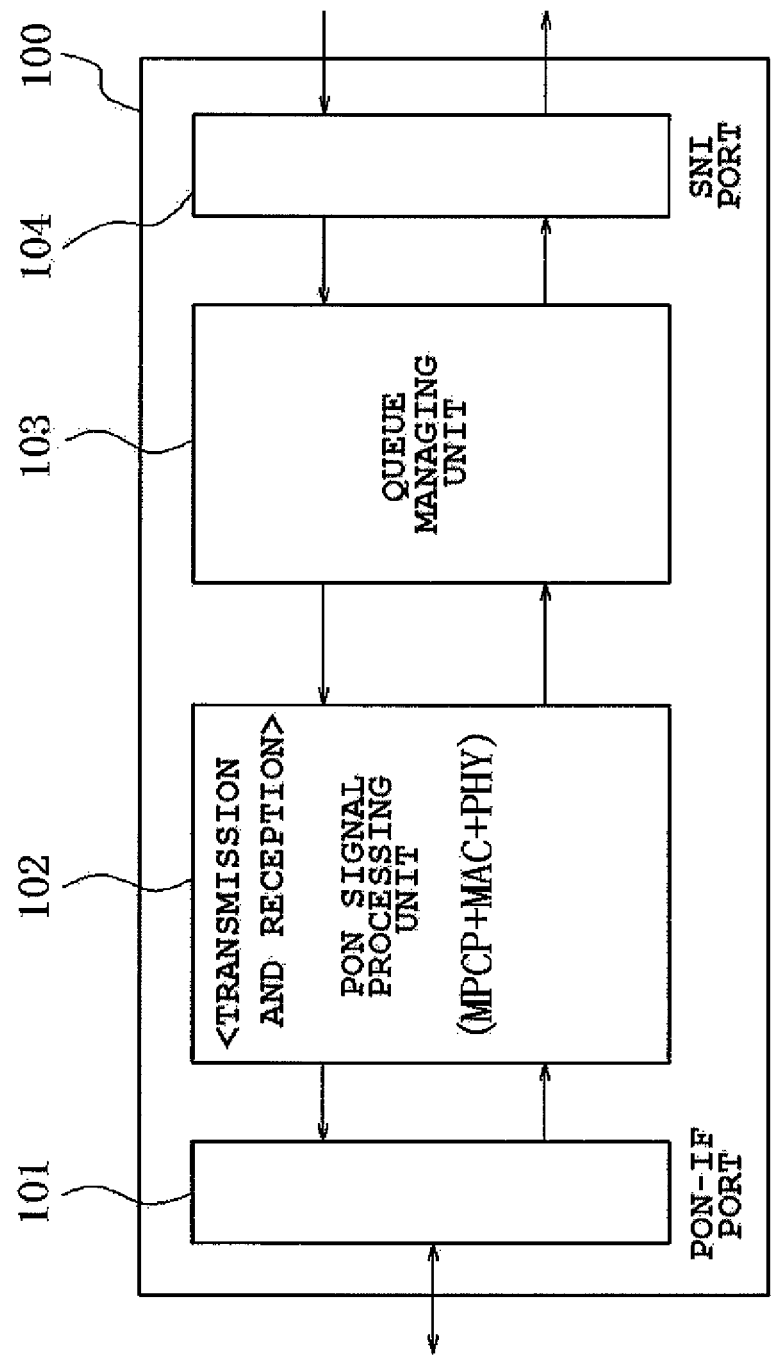
FIG. 3 is a functional block diagram of a conventional OLT in an EPON.
Figure 4:
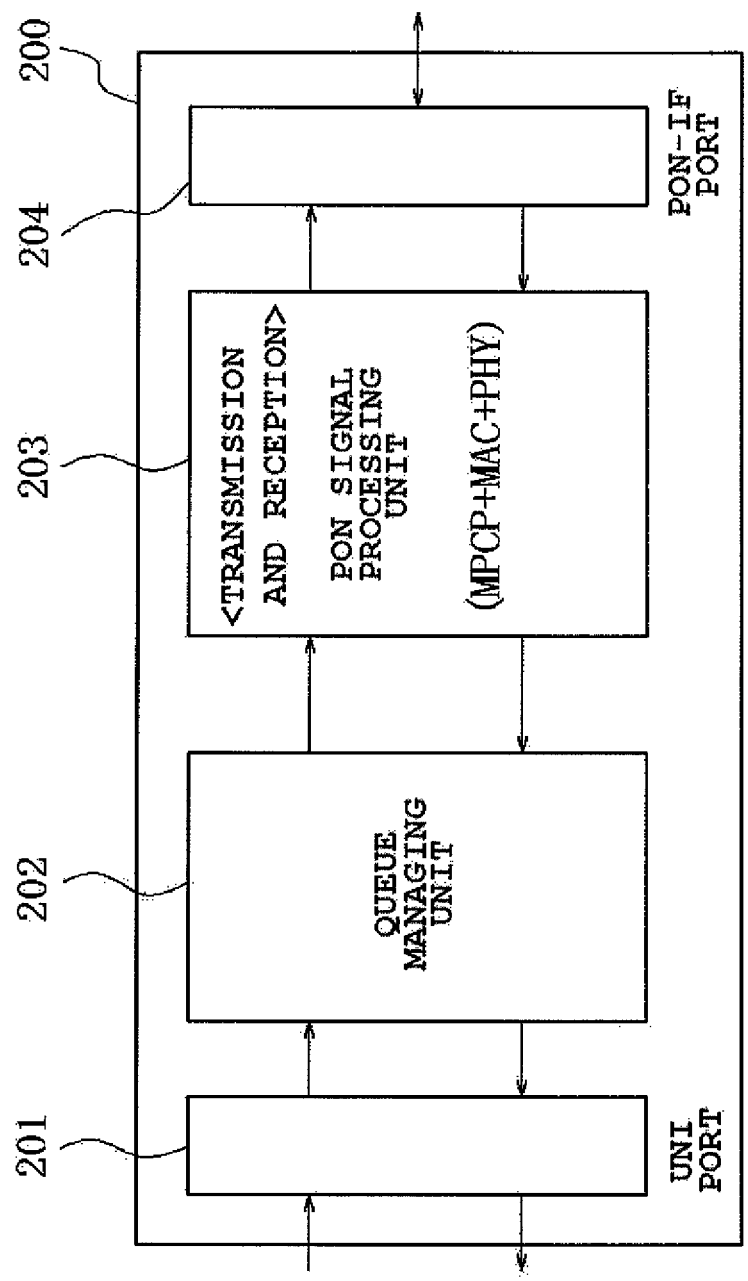
FIG. 4 is a functional block diagram of a conventional ONU in an EPON.

Hereinafter, embodiments of the present disclosure will be described with reference to the accompanying drawings. The embodiments to be described below are exemplary and do not limit the present disclosure. In this specification and drawings, the same reference numerals denote the same components.

The embodiments of the present disclosure will be described with reference to the drawings.

(Embodiment 1-1)

Figure 5:
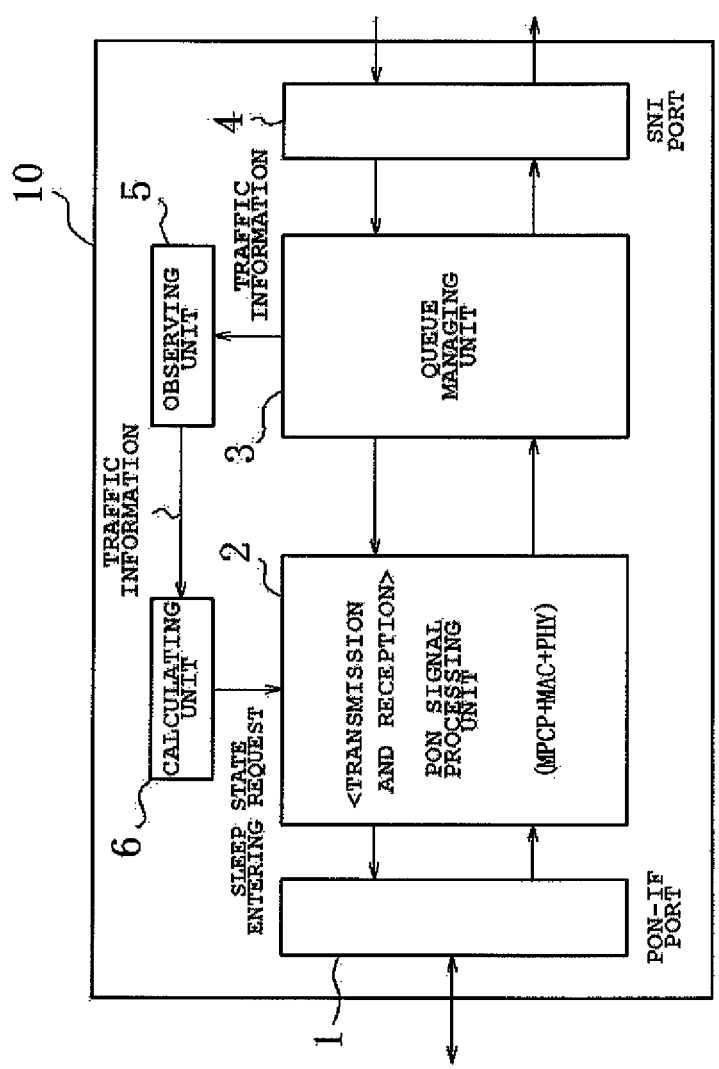
FIG. 5 is a functional block diagram of an OLT according to Embodiment 1-1 of the present disclosure.

Hereinafter, Embodiment 1-1 that uses an optical line terminal (OLT) according to the present disclosure will be described with reference to the drawings. FIG. 5 is a functional block diagram of an OLT according to Embodiment 1-1. An OLT 10 that is illustrated in FIG. 5 includes a PON interface (PON-IF) port 1, a PON signal processing unit 2, a queue managing unit 3, a service node interface (SNI) port 4, an observing unit 5, and a calculating unit 6.

The OLT 10 includes the observing unit 5 and the observing unit 5 observes information (hereinafter, referred to as traffic information) of any one or all of an arrival interval p of frames that are transmitted to an ONU and/or received from the ONU, an instantaneous bandwidth under use B of a flow that is transmitted to the ONU and/or received from the ONU, and a queue length q of a queue that temporarily stores the frames transmitted to the ONU and/or received from the ONU. In this case, the observing unit 5 may observe only the frames that are not discarded in an ONU of an observation object. That is, the frames that are previously recognized by the OLT side as frames being filtered and discarded in the ONU of the observation object may not be included in the observation objects. For example, as a method that realizes multicast communication in the PON, a method that transmits the frames broadcast from the OLT to all ONUS and filters the frames using identifiers of the frames at the ONU side is considered. Even in this case, since the OLT holds an association table of the ONUS of the objects performing the multicast communication and the frame identifiers, the ONU of the transmission destination can be specified at the OLT side. Even when a protocol filter to filter a specific protocol is mounted in the ONU, if filter information is held by the OLT, the same application can be made.

The OLT 10 includes the calculating unit 6 and the calculating unit 6 calculates a period (sleep time) T1 in which a state where non-used functions of the ONU are stopped is maintained, on the basis of the traffic information obtained by the observing unit 5. The OLT 10 has a function of transmitting a request for causing the specific ONU to enter into a state (sleep state) where non-used functions are stopped and the sleep time T1 calculated by the calculating unit 6, to the ONU using the MPCP unit. In this case, a message to request for entering into the sleep state is defined as a sleep state entering request message. The calculating unit 6 may calculate a time T2 until the ONU enters into the sleep state after receiving the sleep state entering request message. The sleep state entering request message may include information of the sleep time T1 or information of the time T2 until the ONU enters into the sleep state after receiving the sleep state entering request message. Timing when the sleep state entering request message (control signal) is transmitted to the ONU may be timing immediately after transmission of the frames with respect to the object ONU ends, timing after a predetermined time passes from when the transmission of the frames with respect to the object ONU ends, or timing after a time T3 determined on the basis of the traffic information passes from when the transmission of the frames with respect to the object ONU ends. In this case, the OLT 10 may have a function of stopping the transmission of the sleep state entering request message after the arrival of the transmission frames or may have a function of transmitting asleep entering request release message to the ONU.

In addition, it is determined that the transmission of the frames with respect to the object ONU ends, when the frame arrival interval p becomes a predetermined time Tp or more, the instantaneous bandwidth under use B becomes a period 0 of a predetermined time TB, or the queue length q becomes a period 0 of a predetermined time Tq. Values of Tp, TB, and Tq are preferably determined in consideration of a frame interval of VoIP traffic or video system traffic.

The OLT 10 has a function of transmitting the frames arrived at the OLT to the ONU, when the ONU is in a normal state, and temporarily storing the frames arrived at the OLT in the queue in the OLT, when the ONU is in a sleep state. The OLT 10 may determine whether the ONU is in the sleep state or the normal state, using a message transmitted from the ONU, or assume whether the ONU is in the sleep state or the normal state, using a timer in the OLT. When all ONUS connected to the OLT 10 are in the sleep state, the OLT 10 may stop the non-used functions of the OLT 10 and enter into the sleep state. The OLT 10 may have a function of immediately returning the OLT 10 to the normal state, when receiving the frames from the SNI port 4 and/or the PON-IF port 1.

Next, a sequence of dynamically determining the sleep time T1 in the calculating unit 6 on the basis of the arrival interval p of the frames transmitted to the ONU and/or received from the ONU, which is obtained by the observing unit 5, will be described.

The OLT side sets a maximum value Tmax and a minimum value Tmin to the sleep time T1. When the arrival interval p of the frames obtained by the observing unit 5 is smaller than a threshold value Th1, the ONU is maintained in the normal state. When the arrival interval p of the frames obtained by the observing unit 5 is equal to or greater than the threshold value Th1, the ONU enters into the sleep state and the sleep time T1 is set to a value between the maximum value Tmax and the minimum value Tmin. For example, the sleep time T1 is calculated as $T1=Tmin+(Tmax-Tmin)*f(p)$, using a specific function f(p). As an example of f(p), $f(p)=(1-(Th1/p))$ is considered. In this case, T1 is calculated as $T1=Tmin+(Tmax-Tmin)*(1-(Th1/p))$.

When the specific function f(p) is linearly changed, $f(p)=(p-Th1)/(Th1'-Th1)$ is considered. In this case, Th1' indicates a maximum threshold value of the frame arrival interval. T1 becomes 0 in the case of p<Th1 and T1 becomes Tmax in the case of p≥Th1'.

Next, a sequence of dynamically determining the sleep time T1 in the calculating unit 6 on the basis of the instantaneous bandwidth under use B of the flow transmitted to the ONU and/or received from the ONU, which is obtained by the observing unit 5, will be described.

The OLT side sets a maximum value Tmax and a minimum value Tmin to the sleep time T1. When the instantaneous bandwidth under use B obtained by the observing unit 5 is greater than a threshold value Th2, the ONU is maintained in the normal state. When the instantaneous bandwidth under use B obtained by the observing unit 5 is equal to or smaller than the threshold value Th2, the ONU enters into the sleep state and the sleep time T1 is set to a value between the maximum value Tmax and the minimum value Tmin. For example, the sleep time T1 is calculated as $T1=Tmin+(Tmax-Tmin)*f(B)$, using a specific function f(B). As an example of f(B), $f(B)=(1-(B/Th2))$ is considered. In this case, T1 is calculated as $T1=Tmin+(Tmax-Tmin)*(1-(B/Th2))$.

When the specific function f(B) is linearly changed, $f(B)=(Th2-B)/(Th2-Th2')$ is considered. In this case, Th2' indicates a minimum threshold value of the instantaneous bandwidth under use B. T1 becomes 0 in the case of B>Th2 and T1 becomes Tmax in the case of B Th2'.

Next, a sequence of dynamically determining the sleep time T1 in the calculating unit 6 on the basis of the queue length q of the queue temporarily storing the frames transmitted to the ONU and/or received from the ONU, which is obtained by the observing unit 5, will be described.

The OLT side sets a maximum value Tmax and a minimum value Tmin to the sleep time T1. When the queue length q obtained by the observing unit 5 is greater than a threshold value Th3, the ONU is maintained in the normal state. When the queue length q obtained by the observing unit 5 is equal to or smaller than the threshold value Th3, the ONU enters into the sleep state and the sleep time T1 is set to a value between the maximum value Tmax and the minimum value Tmin. For example, the sleep time T1 is calculated as $T1=Tmin+(Tmax-Tmin)*f(q)$, using a specific function f(q). As an example of f(q), $f(q)=(1-(q/Th3))$ is considered. In this case, T1 is calculated as $T1=Tmin+(Tmax-Tmin)*(1-(q/Th3))$.

When the specific function f(q) is linearly changed, $f(q)=(Th3-q)/(Th3-Th3')$ is considered. In this case, Th3' indicates a minimum threshold value of the queue length. T1 becomes 0 in the case of q (Th3 and T1 becomes Tmax in the case of q (Th3'.

In addition, instantaneous values or average values of information obtained during the past predetermined period may be used in any one or all of the information of the arrival interval p of the frames, the instantaneous bandwidth under use B, and the queue length q. The average values include a simple moving average, a weighting moving average, and an index smooth average.

When two or more information of the information of the arrival interval p of the frames, the instantaneous bandwidth under use B, and the queue length q is observed and each of the sleep times is calculated, an average value of each of the calculated sleep times may be used as a final sleep time or a minimum value or a maximum value may be used as the final sleep time.

In the embodiment described above, the method of calculating the sleep time T1 is described. However, the times T2 and T3 described above may be calculated by the same method.

The maximum value Tmax and the minimum value Tmin described above are preferably determined by performing a simulation and considering a QoS parameter such as a maximum delay time or an average delay time.

Also, the threshold values are preferably determined in consideration of a QoS parameter such as a delay time. Specifically, the same value as the minimum sleep time Tmin or more may be used with respect to p and 0 may be used with respect to B and q. In all the cases, comparisons of the average values and the threshold values of the past several samples are considered.

Further, in implementation, the time T1, T2, and T3 may be set to become discontinuous and approximated to multiple values.

(Embodiment 1-2)

Figure 6:
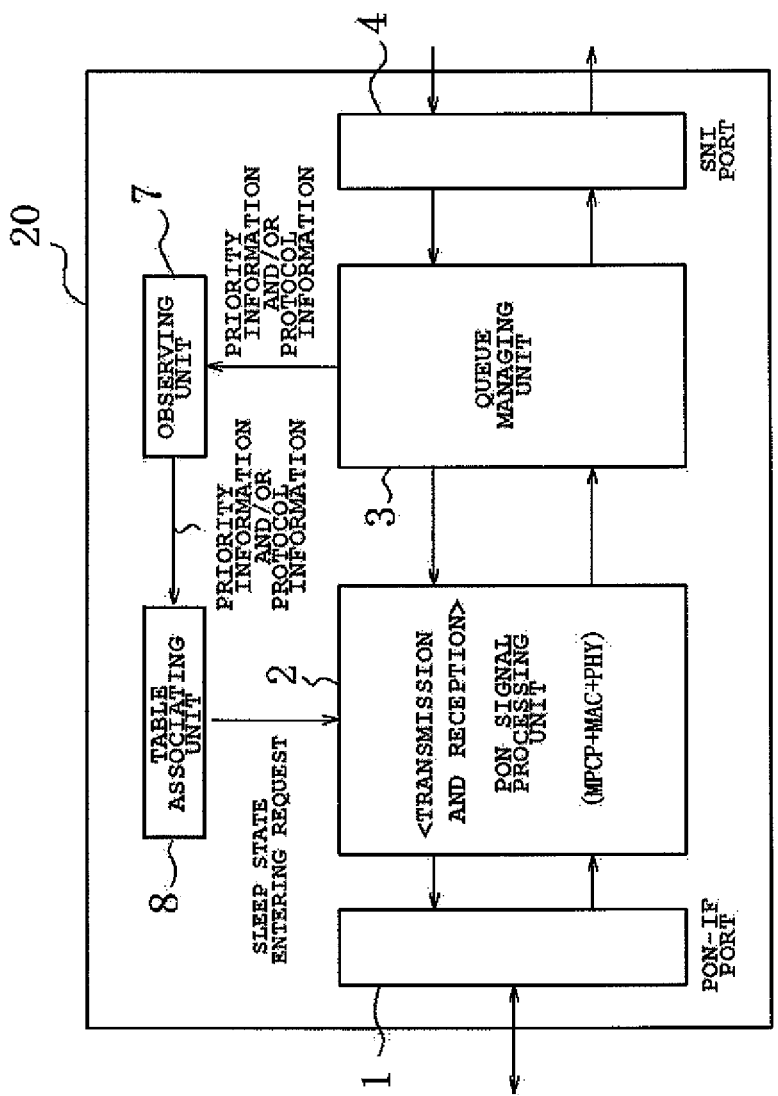
FIG. 6 is a functional block diagram of an OLT according to Embodiment 1-2 of the present disclosure.

Hereinafter, Embodiment 1-2 that uses an optical line terminal (OLT) according to the present disclosure will be described with reference to the drawings. FIG. 6 is a functional block diagram of an OLT according to Embodiment 1-2. An OLT 20 that is illustrated in FIG. 6 includes a PON interface (PON-IF) port 1, a PON signal processing unit 2, a queue managing unit 3, a service node interface (SNI) port 4, an observing unit 7, and a table associating unit 8.

The OLT 20 includes the observing unit 7 and the observing unit 7 observes protocol information and/or priority information of frames that are transmitted to an ONU and/or frames that are received from the ONU. The OLT 20 has a table (not illustrated in the drawings) where the priority information and/or the protocol information and the sleep time of the ONU are associated with each other. In this case, the observing unit 7 may observe only the frames that are not discarded in an ONU of an observation object. That is, the frames that are previously recognized by the side of the OLT side as frames being filtered and discarded in the ONU of the observation object may not be included in the observation objects. For example, as a method that realizes multicast communication in the PON, a method that transmits the frames broadcast from the OLT to all ONUS and filters the frames using identifiers of the frames at the side of the ONU is considered. Even in this case, since the OLT holds an association table of the ONUS of the object performing the multicast communication and the frame identifiers, the transmission destination ONU can be specified at the side of the OLT. Even when a protocol filter to filter a specific protocol is mounted in the ONU, if filter information is held by the OLT, the same application can be made.

The OLT 20 includes the table associating unit 8 and the table associating unit 8 dynamically determines the sleep time T4 of the ONU by referring to the table, on the basis of the priority information and/or the protocol information obtained by the observing unit 7. The OLT 20 has a function of transmitting a request for causing the specific ONU to enter into a state (sleep state) where non-used functions are stopped and the sleep time T4 calculated by the table associating unit 8, to the ONU using the MPCP unit. In this case, a message to request to enter into the sleep state is defined as a sleep state entering request message. Also, the table associating unit 8 may calculate a time T5 until the ONU enters into the sleep state after receiving the sleep state entering request message. The sleep state entering request message may include information of the sleep time T4 and information of the time T5 until the ONU enters into the sleep state after receiving the sleep state entering request message. Timing when the sleep state entering request message (control signal) is transmitted to the ONU may be timing immediately after transmission of the frames with respect to the object ONU ends, timing after a predetermined time passes from when the transmission of the frames with respect to the object ONU ends, or timing after a time T6 determined on the basis of the priority information and/or the protocol information passes from when the transmission of the frames with respect to the object ONU ends. In this case, the OLT 20 may have a function of stopping the transmission of the sleep state entering request message, when the transmission frames arrives, and a function of transmitting asleep entering request release message to the ONU.

In addition, it is determined that the transmission of the frames with respect to the object ONU ends, when the frame arrival interval p becomes a predetermined time Tp or more, the instantaneous bandwidth under use B becomes a period 0 of a predetermined time TB, or the queue length q becomes a period 0 of a predetermined time Tq. Values of Tp, TB, and Tq are preferably determined in consideration of a frame interval of VoIP traffic or video system traffic.

The OLT 20 has a function of transmitting the frames arrived at the OLT to the ONU, when the ONU is in a normal state, and temporarily storing the frames arrived at the OLT in the queue in the OLT, when the ONU is in the sleep state. The OLT 20 may determine whether the ONU is in the sleep state or the normal state, using a message received from the ONU, or may estimate whether the ONU is in the sleep state or the normal state, using a timer in the OLT. When all of the ONUS connected to the OLT 20 are in the sleep state, the OLT 20 may stop the non-used functions of the OLT 20 and enter into the sleep state. The OLT 20 may have a function of immediately returning the state of the OLT 20 to the normal state, when receiving the frames from the SNI port and/or the PON-IF port.

Next, a sequence of dynamically determining the sleep time T4 in the table associating unit 8 on the basis of the protocol information and/or the priority information of the frames transmitted to the ONU and/or received from the ONU, which is obtained by the observing unit 7, will be described.

The table of the OLT side is previously designated such that the sleep times T4 of 50 ms, 30 ms, 10 ms, and 5 ms are set to traffics with the priority of 0, 1, 2, and 3, respectively. By referring to the table when the frames are transmitted, T4=5 ms is set in the case of the frame with the priority of 3. As protocol information, header information such as a session initiation protocol (SIP), a user datagram protocol (UDP), a real-time transport protocol (RTP), a transmission control protocol (TCP), an Internet protocol (IP), and the Ethernet® may be used. For example, it is considered that in the case where an SIP session is continuous or RTP traffic is circulated, the sleep time T4 is set to 0 ms, and in the other cases, the sleep time T4 is set according to a value of a type of service (ToS) of an IP header or a value of a class of service (CoS) of a VLAN tag.

In this case, the method of determining the sleep time T4 is described. However, the times T5 and T6 described above may be determined by the same method.

Figure 7:
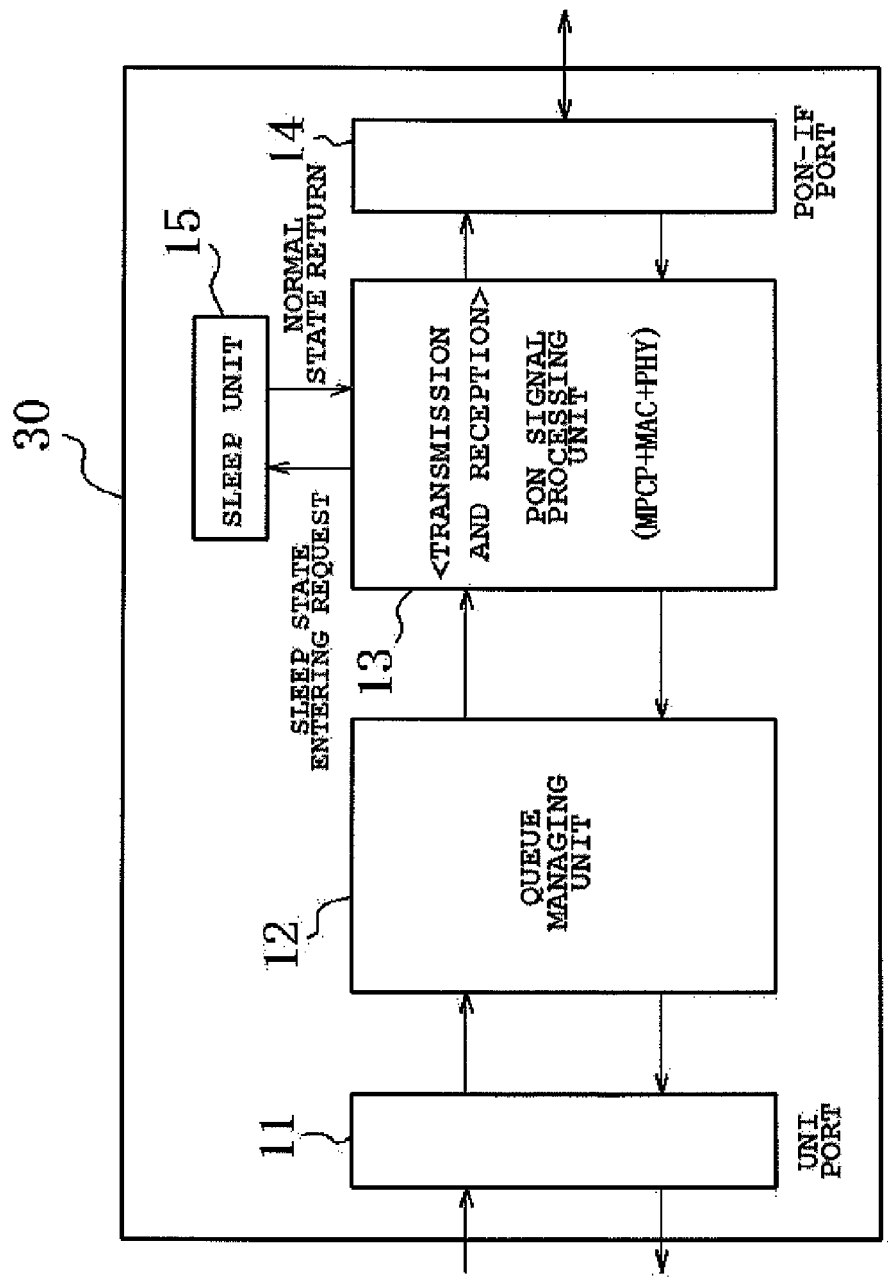
FIG. 7 is a functional block diagram of an ONU according to Embodiment 1-1 and Embodiment 1-2 of the present disclosure.

Next, an optical network unit (ONU) according to the present disclosure will be described with reference to the drawings. FIG. 7 is a functional block diagram of an ONU according to Embodiment 1-1 and Embodiment 1-2. An ONU 30 that is illustrated in FIG. 7 includes a user network interface (UNI) port 11, a queue managing unit 12, a PON signal processing unit 13, a PON interface (PON-IF) port 14, and a sleep unit 15.

The ONU 30 has a function of stopping non-used functions and entering into the sleep state by the sleep unit 15, when receiving a sleep state entering request message (control signal) from the OLT. The ONU 30 has a function of maintaining the sleep state by the sleep time T1 or the sleep time T4 to be designated. The ONU 30 returns to a normal state, after the sleep time T1 or the sleep time T4 passes. The ONU 30 may enter into the sleep state immediately after the sleep state entering request message is received, enter into the sleep state after a predetermined time passes from when the sleep state entering request message is received, or enter into the sleep state after the time T2 or the time T5 determined by the OLT passes from when the sleep state entering request message is received. In this case, the ONU 30 may have a function of stopping the entering of the ONU into the sleep state, when the transmission frames arrive. The ONU 30 may have a function of notifying the OLT that the ONU returns to the normal state, using the MPCP unit. In this case, a message to notify the OLT that the ONU returns to the normal state is defined as a normal state return message. The ONU 30 may have a function of immediately returning to the normal state, when receiving the frames from the UNI port. The functions that are stopped by the ONU may be previously determined.

Figure 8:
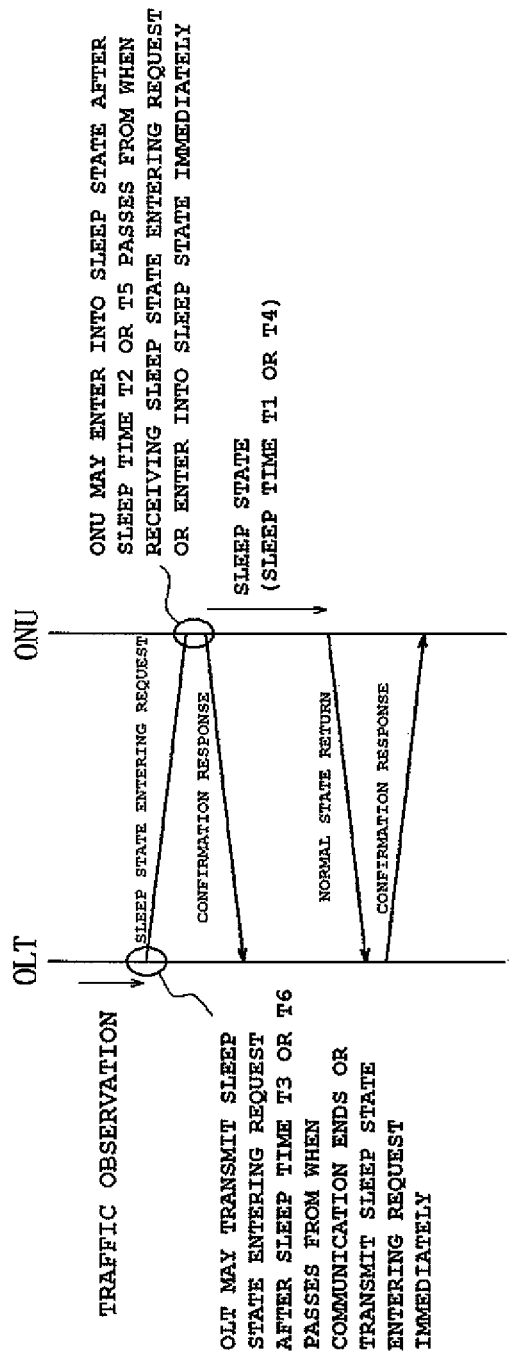
FIG. 8 is a diagram illustrating a message exchanging sequence of an OLT and an ONU.

FIG. 8 is a diagram illustrating a message exchanging sequence of the OLT and the ONU. The OLT may transmit a confirmation response to the ONU, with respect to the normal state return message transmitted by the ONU. The ONU may transmit a confirmation response to the OLT, with respect to the sleep state entering request message transmitted by the OLT.

The functions of the OLT and the ONU or the methods of calculating the sleep time in Embodiment 1-1 and Embodiment 1-2 may be arbitrarily combined and used. For example, the sleep time may be calculated by observing the frame interval of only the frames having the certain priority or the frames having the certain protocol information. In the table associating unit 8 according to Embodiment 1-2, the table information may be changed as needed according to the traffic information observed using the observing unit 5 according to Embodiment 1-1. If the table information is changed, when the frames having the certain priority or the frames having the certain protocol information are not transmitted during a predetermined period, consumption power can be greatly decreased by increasing the sleep time.

In the embodiment described above, the cases of the EPON and the 10G-EPON are described. However, it is apparent that the present disclosure can be applied to other PONS, for example, a B-PON, a G-PON, a WDM-PON, and a CDM-PON based on the ITU-T advice. In addition, it is apparent that the present disclosure can also be applied to an optical network system that performs point-to-point communication shown in FIG. 1.

(Embodiment 2-1)

Figure 9:
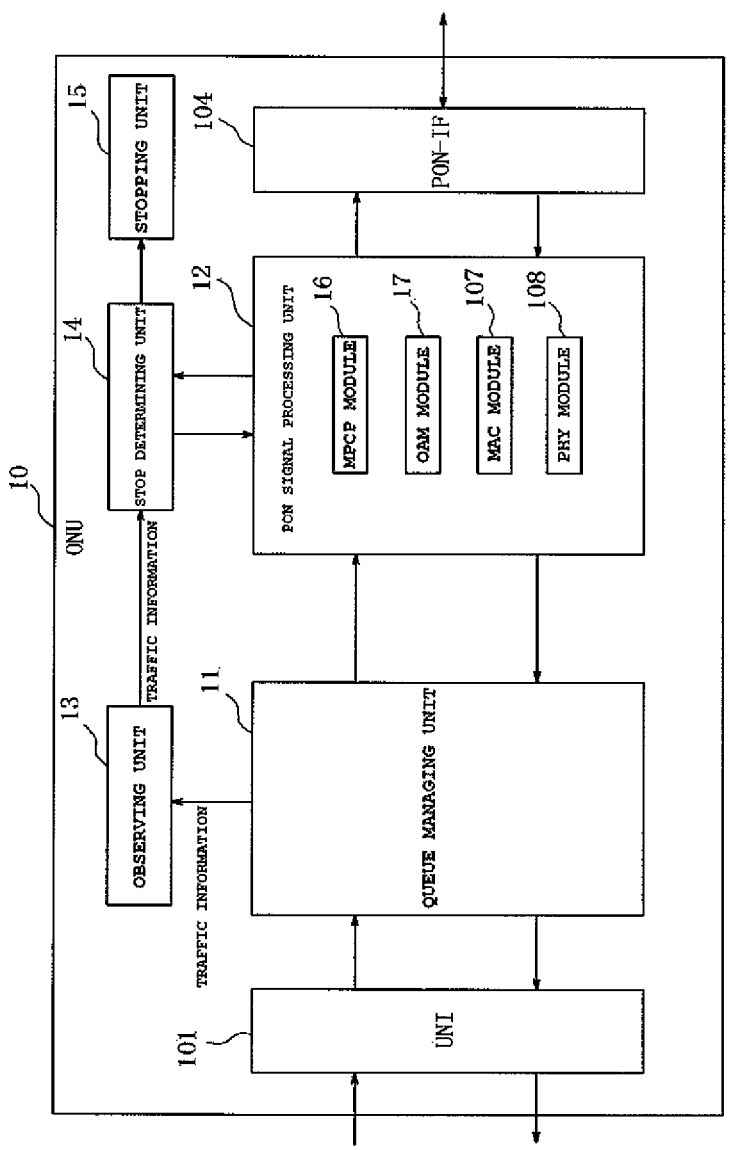
FIG. 9 is a diagram illustrating the configuration of an ONU according to the present disclosure.

First, the configuration of the ONU according to the present disclosure will be described using FIG. 9. FIG. 9 is a diagram illustrating the configuration of the ONU according to the present disclosure.

[Configuration of the ONU]

An ONU 10 includes an UNI 101, a queue managing unit 11, a PON signal processing unit 12, a PON-IF 104, an observing unit 13, a stop determining unit 14, and a stopping unit 15.

The queue managing unit 11 observes a value of ToS or a value of CoS for each frame, to be described below.

The PON signal processing unit 12 includes an MPCP module 16, an OAM module 17, a MAC module 107, and a PHY module 108, and receives a sleep request message from the stop determining unit 14 to be described below. The sleep request message is transmitted to the OLT.

The observing unit 13 monitors traffic. For example, the observing unit 13 monitors an arrival interval of frames, an instantaneous bandwidth under use, and a queue length in a buffer during a period of a predetermined time t1. The observing unit 13 monitors communication traffic and observes whether traffic of a specific type exists.

The stop determining unit 14 sets threshold values to the arrival interval of the frames, the instantaneous bandwidth under use, and the queue length in the buffer, and determines whether measurement values are equal to or greater than the threshold value or equal to or smaller than the threshold values to determine whether communication is in a non-communication state. For example, the stop determining unit 14 uses the case where the measurement value of the frame arrival interval is equal to or greater than the threshold value and the measurement values of the instantaneous bandwidth under use and the queue length are equal to or smaller than the threshold values as a determination reference of the non-communication state. When it is determined that the communication is in the non-communication state during the period of the predetermined time t1, the stop determining unit 14 transmits a sleep request message to the OLT, after transmission of data frames ends. If the OLT receives the sleep request message from the ONU 10, the OLT transmits a confirmation response (ACK message) to the ONU 10.

When the predetermined time t1 is set to be equal to or longer than the predetermined time t2 and the frames arrive with a cycle of an average frame interval Tint, average queuing delay can be minimized. For example, when Tint is 5 ms, if 5 ms is set to the predetermined time t1 and 6 ms is set to the predetermined time t2, on the average, one or more frames arrive during a stop period. Meanwhile, when Tint is 5 ms, if 5 ms is set to the predetermined time t1 and 4 ms is set to the predetermined time t2, on the average, only one frame or less arrives during the stop period. Therefore, as compared with the former, average queuing delay decreases. In order to maximize a power saving effect while minimizing the average queuing delay, the predetermined time t1 and the predetermined time t2 are preferably set to the value as Tint.

The stop determining unit 14 has a function of not stopping the partial functions of the ONU 10 or a function of stopping the partial functions of the ONU 10 during the period of the predetermined time t2 and starting the partial functions with a predetermined cycle, regardless of whether communication of the ONU 10 including the traffic of the designated type enters into the non-communication state during the period of the predetermined time t1, when the traffic of the specific type exists. In this case, the stop determining unit 14 may transmit a sleep stop request message to the OLT, when the partial functions of the ONU 10 are not stopped, and transmit a sleep request message to the OLT, when the partial functions of the ONU 10 are stopped. When the sleep stop request message is transmitted and received, for example, the MPCP module 16 or the OAM module 17 can be used.

Instead of the ONU 10 transmitting the sleep request message or the sleep stop request message to the OLT, the OLT may autonomously determine a stop state of the ONU 10 and estimate that the ONU 10 is in the stop state. In this case, the observing unit 13 and the stop determining unit 14 that are mounted in the ONU 10 are also mounted in the OLT to monitor the specific traffic for each ONU 10.

The existence or non-existence of the traffic of the specific type can be determined on the basis of whether one or more frames of the specific type are observed during the period of the predetermined time t3. For example, VoIP packets (frames including the VoIP packets) are transmitted at an interval of 20 ms and each packet has the arrival time difference of a maximum of ±20 ms. For this reason, if the predetermined time t3 is set as 60 to 220 ms and VoIP communication having the high priority is performed with a specific ToS value or CoS value, at least 1 to 10 VoIP packets (frames including the VoIP packets) can be observed for the predetermined time t3. Therefore, it can be determined whether the VoIP communication having the high priority is performed.

The existence or non-existence of the traffic of the specific type can be determined on the basis of whether a session of the traffic of the specific type is continuing. For example, when the VoIP communication is performed, fixing and opening of sessions between terminals are performed using a session initiation protocol (SIP). Therefore, by snooping an INVITE message at the time of starting the session and a BYE message at the time of opening the session, it can be determined whether the session is continuing.

If the ONU 10 receives a confirmation response (ACK message), the stopping unit 15 stops the partial functions (for example, functions of the queue managing unit 11, the PON signal processing unit 12, the observing unit 13, and the stop determining unit 14) of the ONU 10 during the period of the predetermined time t2. After the predetermined time t2 passes, the stopping unit 15 starts the stopped partial functions and confirms whether traffic exists with respect to the OLT (traffic confirmation message). If it is in the non-communication state (NO message), it stops the partial functions during the period of the predetermined time t2. If the frames arrive (YES message), it starts communication with the OLT.

The stopping unit 15 preferably has a function of immediately starting the stopped partial functions to prevent transmission delay of frames and transmitting the frames to the OLT, when the traffic is transmitted from the UNI 101. When the individual messages (the sleep request message, the ACK message, the traffic confirmation message, the NO message, and the YES message) described above are transmitted and received, for example, the MPCP module 16 or the OAM module 17 can be used.

Hereinafter, the case where the non-communication state is determined by the instantaneous bandwidth under use (traffic amount) will be described.

For example, when connection of the traffic having the high priority, such as the VoIP communication using the RIP or the SIP, exists, the functions of the ONU are not stopped in all cases to maintain a communication quality with respect to the traffic having the high priority.

For this reason, the queue managing unit 11 has a function of observing a ToS value stored in a header of an Internet protocol (IP) packet for each frame, and confirms whether VoIP traffic exists. The queue managing unit 11 has a function of managing the ToS value of the IP packet to be associated with a CoS value stored in a virtual LAN (VLAN) tag provided MAC frame and observing the CoS value for each frame.

Figure 10:
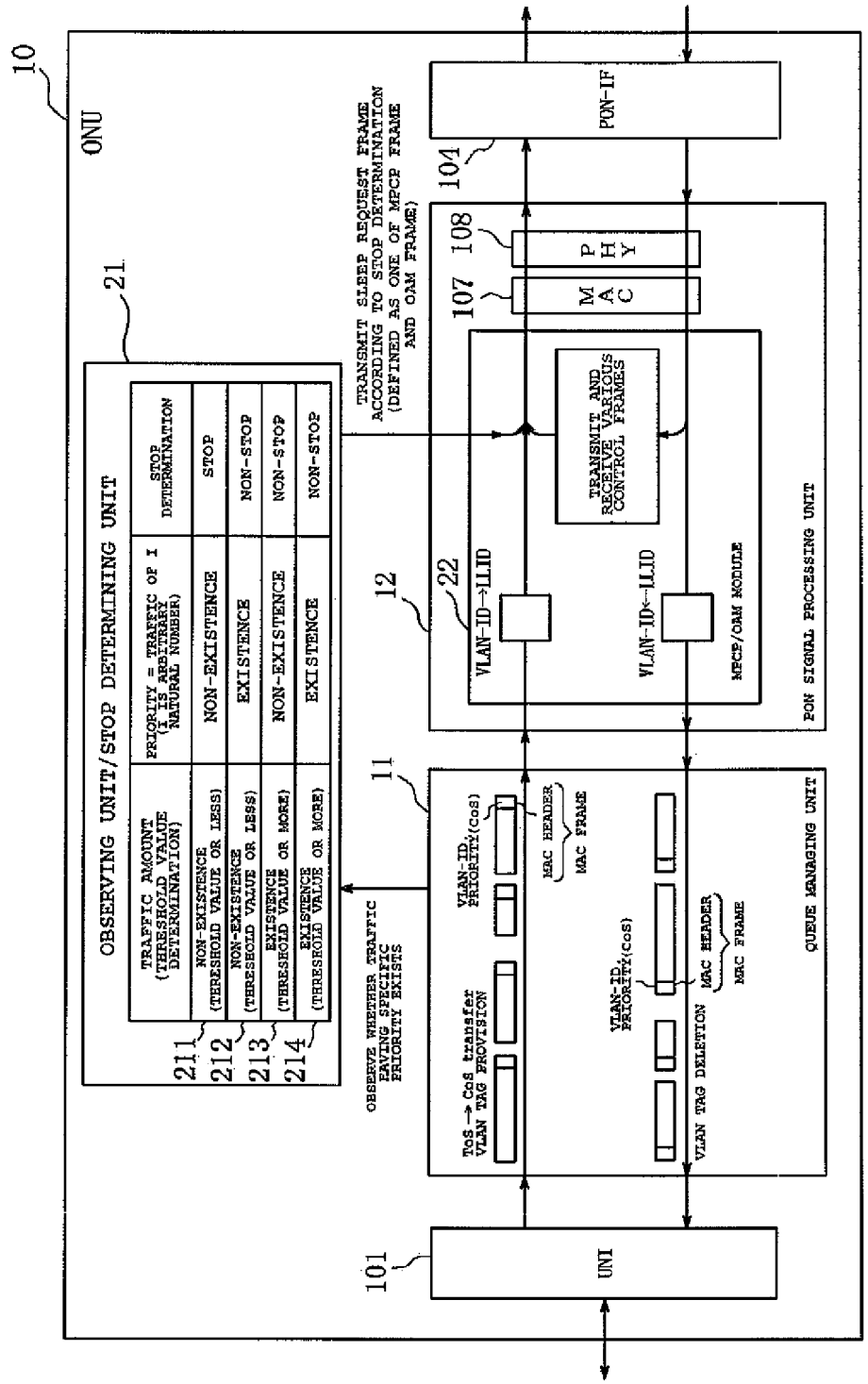
FIG. 10 is a diagram illustrating functions of an ONU according to the present disclosure.

Next, the functions of the ONU 10 will be described using FIG. 10. FIG. 10 is a functional block diagram of the ONU 10.

[Functions of the ONU]

FIG. 10 illustrates the case where the queue managing unit 11 manages the ToS value of the IP packet to be associated with the CoS value stored in the VLAN tag provided MAC frame and observes the CoS value for each frame. The queue managing unit 11 has a function of providing or deleting a VLAN tag and associating the ToS value and the CoS value with each other.

In addition, it is assumed that the queue managing unit 11 associates a VLAN-ID designated in the VLAN tag and a logical link ID (LLID) of a PON provided from the OLT and performs communication. The LLID is an identifier that is allocated to each logical link.

An observing unit/stop determining unit 21 is a component that is represented as one block by collecting the functions of the observing unit 13 and the stop determining unit 14. The observing unit/stop determining unit 21 observes the traffic amount and the priority of the traffic and performs the stop determination on the basis of the traffic amount and the priority of the traffic.

When the traffic amount is equal to or smaller than the threshold value during the period of the predetermined time t1 and the traffic having the specific priority (ToS value or CoS value) is not observed, the observing unit/stop determining unit 21 determines the stop of the partial functions and transmits the sleep request message (211). The sleep request message is defined as one of the MPCP frame or the OAM frame.

When the traffic amount is equal to or smaller than the threshold value during the period of the predetermined time t1 and the traffic having the specific priority is observed, the observing unit/stop determining unit 21 determines the non-stop of the partial functions, and does not transmit the sleep request message and continuously observes the traffic during the period of the predetermined time t3 (212).

When the traffic amount is equal to or greater than the threshold value during the period of the predetermined time t1, the observing unit/stop determining unit 21 determines the non-stop of the partial functions, regardless of whether the traffic having the specific priority is observed (213 and 214).

An MPCP/OAM module 22 that is included in the PON signal processing unit 12 indicates the MPCP module 16 or the OAM module 17. The MPCP/OAMmodule 22 associates the VLAN-ID with the LLID in the case of an uplink signal, and associates the LLID with the VLAN-ID in the case of a downlink signal. When the sleep request message is received from the observing unit/stop determining unit 21, the sleep request message is transmitted as one of the MPCP frame or the OAM frame.

The observing unit 13 preferably does not include the frames discarded in the ONU 10 in communication traffic monitoring objects to improve the determination capability of the stop determining unit 14.

Even when the traffic of the specific type is circulated, the stop determining unit 14 can transmit the sleep request message to the OLT, in the case where the traffic of the specific type is the frames discarded in the ONU 10. For example, as a method that realizes multicast communication in the PON, a method that transmits the frames broadcast from the OLT to all of the ONUS 10 and filters the frames using the identifiers of the frames at the side of the ONU 10 is considered. This can be equally applied to the case where a protocol filter to filter the specific protocol is mounted in the ONU. As such, even when the multicast frames are circulated through the PON, the stop determining unit 14 can stop the partial functions of the ONU 10 in the non-communication state.

In this case, the OLT that is connected to the ONU 10 preferably includes a buffer (the buffer capacity is set as the maximum transmission amount in the stop time) that temporarily stores the arrived frames to suppress the number of lost frames to zero, when the ONU 10 is in the stop state and traffic to be transmitted to the ONU 10 is generated.

Next, the operation of the ONU 10 will be described using FIG. 11.

[Operation of the ONU]

Figure 11:
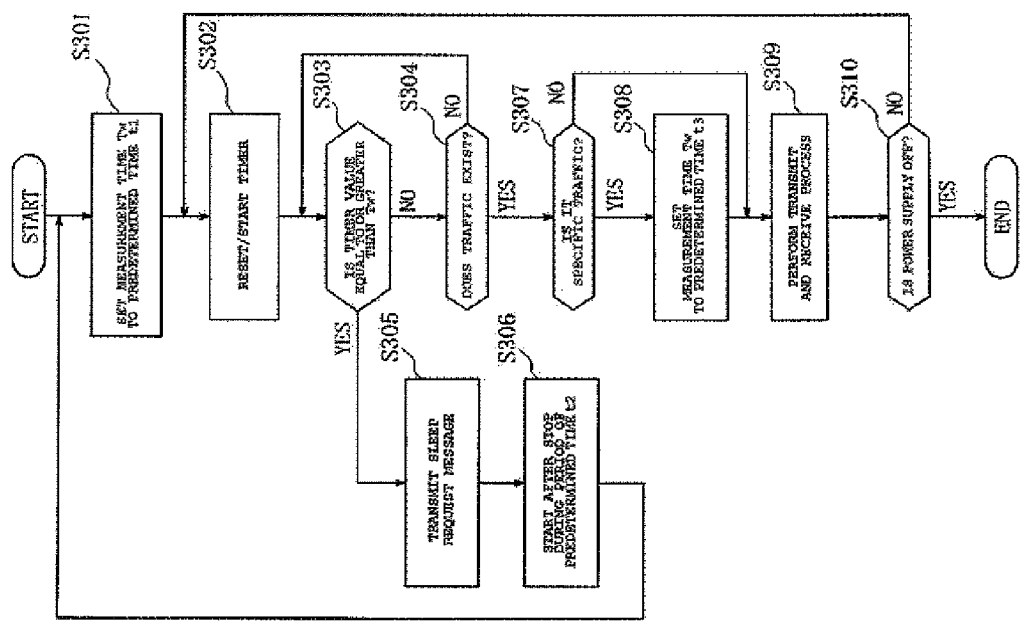
FIG. 11 is a diagram illustrating an operation of an ONU according to the present disclosure.

FIG. 11 is a flowchart illustrating an example of the operation of the ONU 10. First, in step S301, the observing unit 13 sets the measurement time Tw to the predetermined time t1. The process proceeds to step S302.

In step S302, the observing unit 13 starts a timer after resetting the timer. The process proceeds to step S303.

In step S303, the observing unit 13 determines whether a timer value is equal to or greater than the measurement time Tw. When the timer value is smaller than the measurement value Tw (step S303: No), the process proceeds to step S304. When the timer value is equal to or greater than the measurement value Tw (step S303: Yes), the process proceeds to step S305.

In step S304, the stop determining unit 14 determines whether the traffic exists. When the traffic exists (step S304: Yes), the process proceeds to step S307. When the traffic does not exist (step S304: No), the process returns to step S303.

In step S305, since the traffic does not exist for the measurement time Tw, the stop determining unit 14 determines that the communication is in the non-communication state and transmits the sleep request message to the OLT. The process proceeds to step S306.

In step S306, the stopping unit 15 stops the partial functions of the ONU during the period of the predetermined time t2 and starts the partial functions after the period of the predetermined time t2 passes.

In step S307, the stop determining unit 14 determines whether the traffic is the traffic having the specific priority. When the traffic is the traffic having the specific priority (step S307: Yes), the process proceeds to step S308. When the traffic is not the traffic having the specific priority (step S307: No), the process proceeds to step S309.

In step S308, the observing unit 13 sets the measurement time Tw to the predetermined time t3. The process proceeds to step S309. The reason why the measurement time Tw is set to the predetermined time t3 is that the process proceeds to step S305, in the case where traffic does not exist during the period of t3, not the period of t1, in step S303, when the traffic is the traffic having the specific priority. In this way, the condition of stopping the partial functions can be changed by changing the measurement time Tw according to the type of the traffic. For example, when the traffic of the specific type is the traffic having the high priority, t1>t3 can be set. When the traffic of the specific type is the traffic having the low priority, t3>t1 can be set.

In step S309, the ONU 10 communicates with the OLT and transmits and receives data. The process proceeds to step S310.

In step S310, it is determined whether a power supply of the ONU 10 is turned off. When the power supply is turned off (step S310: Yes), the process ends. When the power supply is turned on (step S310: No), the process returns to step S302.

This flowchart is exemplary and illustrates an example of the operation of transmitting the sleep request message when no traffic is observed during the period of the predetermined time t3, after the traffic having the specific priority is observed.

After the traffic having the specific priority is observed, when the traffic having the specific priority is not observed during the period of the predetermined time t3, if no traffic is observed during the period of the predetermined time t1, the sleep request message may be transmitted. In this case, a second time measuring unit (timer) may be used. When the traffic having the specific priority is observed, a value of the second time measuring unit may be set (reset) to 0 and the second time measuring unit may start, and when the value of the second time measuring unit becomes the predetermined time t3 or more, the measurement time Tw may be set again to the predetermined time t1.

According to Embodiment 2-1, power of the ONU 10 can be saved without deteriorating a communication quality of the traffic of the specific type.

(Embodiment 2-2)

Next, a modification of the observing method of the observing unit 13 in the ONU 10 will be described as Embodiment 2-2. The same components as those in Embodiment 2-1 are denoted by the same reference numerals and the description thereof is omitted.

Figure 12:
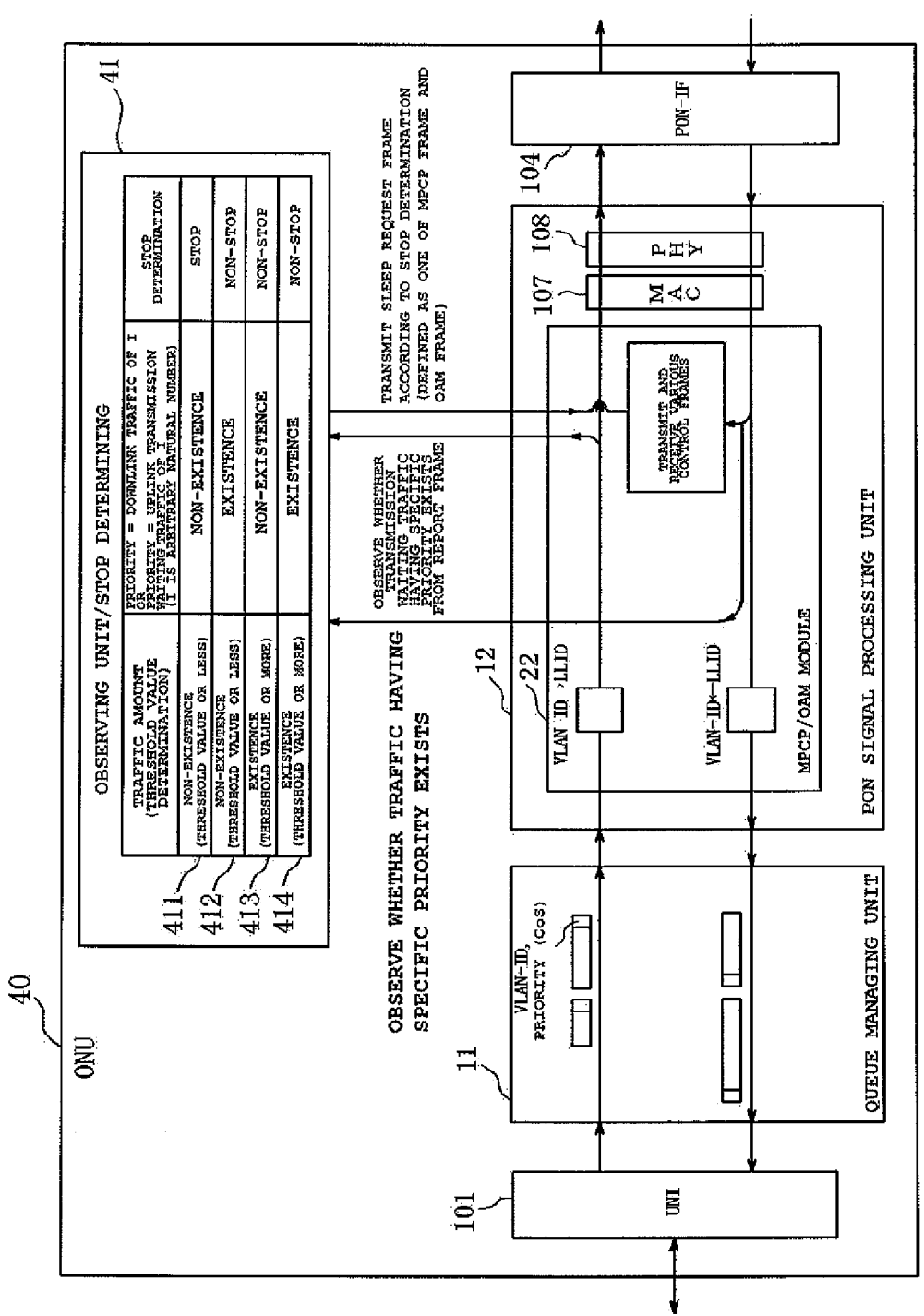
FIG. 12 is a diagram illustrating the configuration of an ONU according to Embodiment 2-2 of the present disclosure.

FIG. 12 is a functional block diagram of an ONU 40 according to Embodiment 2-2. The ONU 40 according to Embodiment 2-2 determines whether uplink traffic exists, using a report message generated by the MPCP module 16 of the PON signal processing unit 12 and transmitted to the OLT. The report message is a message that is used to notify the OLT of the transmission waiting traffic amount for each of the plural queues provided to the ONU 40, and it is used so that each queue can correspond to each priority (ToS value or CoS value).

Figure 13:
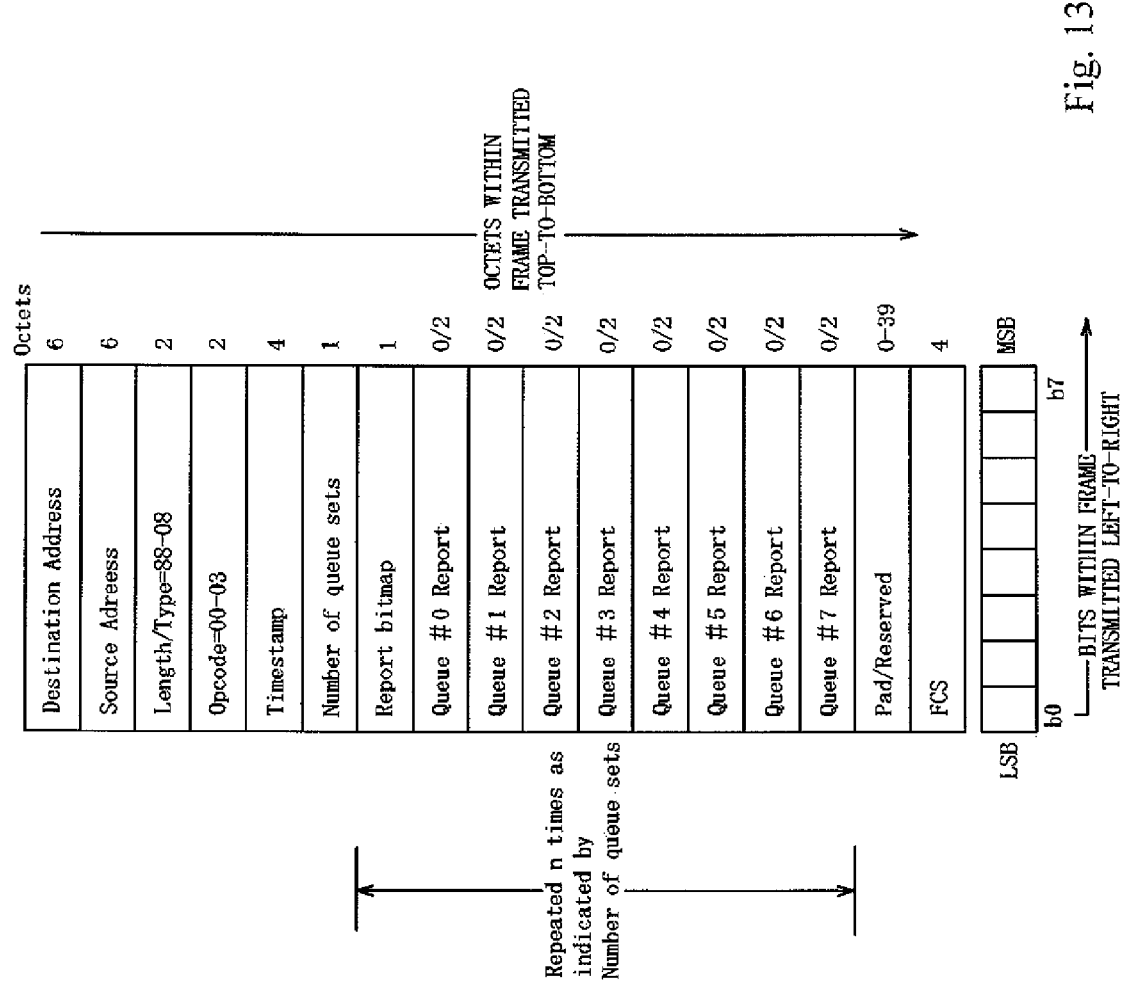
FIG. 13 is a diagram illustrating a frame format of a report message.

FIG. 13 is a diagram illustrating a frame format of a report message in the IEEE standard 802.3. As values of the priorities, 0 to 7 of "Queue #0 Report" to "Queue #7 Report" illustrated in the format are used.

When the traffic amount is equal to or smaller than the threshold value during the period of the predetermined time t1 and the traffic having the specific priority (ToS value or CoS value) is not observed, the observing unit/stop determining unit 21 determines the stop of the partial functions and transmits the sleep request message to the OLT (411).

When the traffic amount is equal to or smaller than the threshold value and the downlink traffic having the specific priority or the uplink transmission waiting traffic having the specific priority is observed, the observing unit/stop determining unit 21 determines the non-stop of the partial functions, and continuously performs the observation of the downlink traffic and the determination of the report message of the uplink transmission waiting traffic without transmitting the sleep request message, during the period of the predetermined time t3 (412).

When the traffic amount is equal to or greater than the threshold value during the period of the predetermined time t1, the observing unit/stop determining unit 21 determines the non-stop of the partial functions, regardless of whether the traffic having the specific priority is observed (413 and 414).

When the traffic of the designated type is determined, protocol information such as the RTP or the SIP may be used, and priority information such as the ToS value or the CoS value may be arbitrarily combined and used.

According to Embodiment 2-2, similar to Embodiment 2-1, power of the ONU 40 can be saved without deteriorating a communication quality of the traffic of the specific type.

(Embodiment 2-3)

Next, a modification of the determining method of the stop determining unit 14 in the ONU 10 according to Embodiment 2-1 and the ONU 40 according to Embodiment 2-2 will be described as Embodiment 2-3. In this embodiment, when only the frames transmitted with a predetermined cycle such as the VoIP exist, an intermittent start operation is performed with a cycle synchronized with a frame cycle thereof, and power of the ONU can be efficiently saved by setting a stop time shorter than the frame cycle. Even when traffic does not exist, the intermittent start operation is performed with the same cycle.

FIG. 14 is a diagram illustrating a determining method in the stop determining unit 14 according to this embodiment.

When traffic does not exist during the period of the predetermined time t1, the stop determining unit 14 according to this embodiment determines the stop of the partial functions (61).

Meanwhile, when traffic exists during the period of the predetermined time t1, the type of the traffic is determined during the period of the predetermined time t3. When the traffic is only traffic of the specific type (for example, VoIP), the stop determining unit 14 determines the stop of the partial functions and transmits asleep request message (62). When the traffic includes traffic other than the traffic of the specific type, the stop determining unit 14 determines the non-stop of the partial functions (63 and 64).

When traffic of a specific type is observed, the stop determining unit 14 performs the stop determination using the method illustrated in Embodiment 2-1. When traffic of another specific type is observed, the stop determining unit 14 can perform the stop determination using the method illustrated in Embodiment 2-3.

According to Embodiment 2-3, when only the frames transmitted with the predetermined cycle exist, power of the ONU can be efficiently saved.

The embodiments described above are descried as the representative examples. However, it can be apparent to those skilled in the art that various changes and replacements can be made within a range of the present disclosure without departing from the sprit of the present disclosure, and each embodiment can be combined and other embodiments can be realized. Therefore, the present disclosure is not analyzed to be limited by the embodiments described above, and various modifications or changes can be made without departing from a range of claims. For example, the observing unit 13 and the stop determining unit 14 that are described in each embodiment may be arbitrarily combined and used.

The range of the partial functions that are stopped at the time of the sleep is not particularly limited and may be determined by the balance with a rising time of a circuit. In each embodiment, it is assumed that the functions of the observing unit 13 and the stop determining unit 14 are stopped at the time of the sleep.

Figure 15:
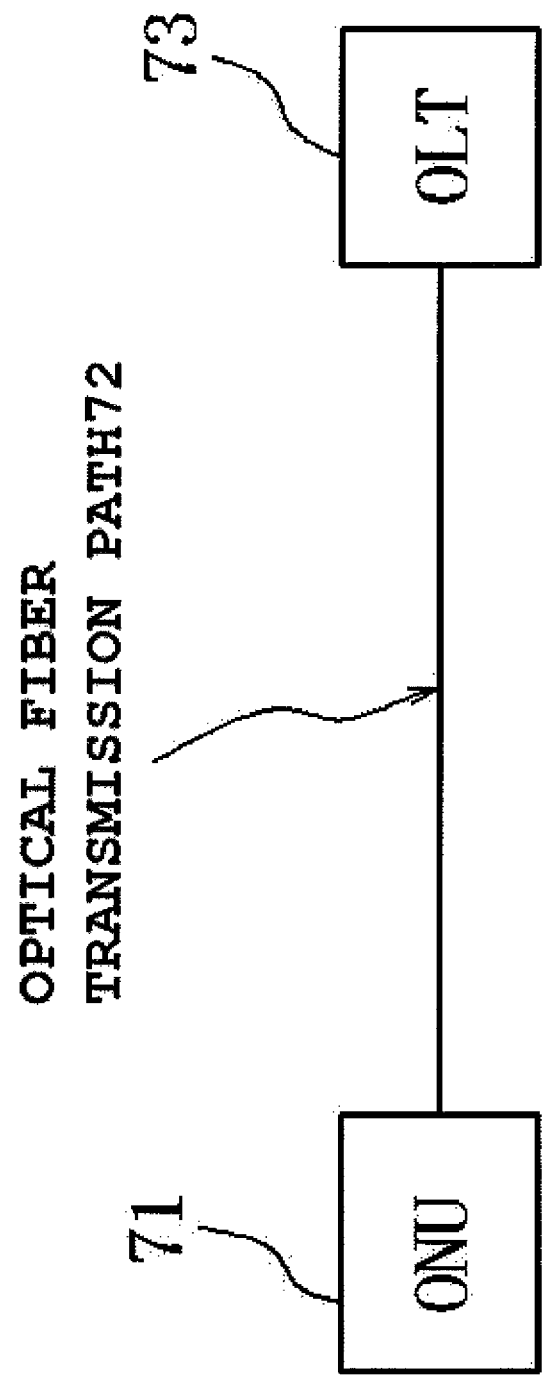
FIG. 15 is a diagram illustrating the configuration of an optical network system of a point-to-point type.
Figure 16:
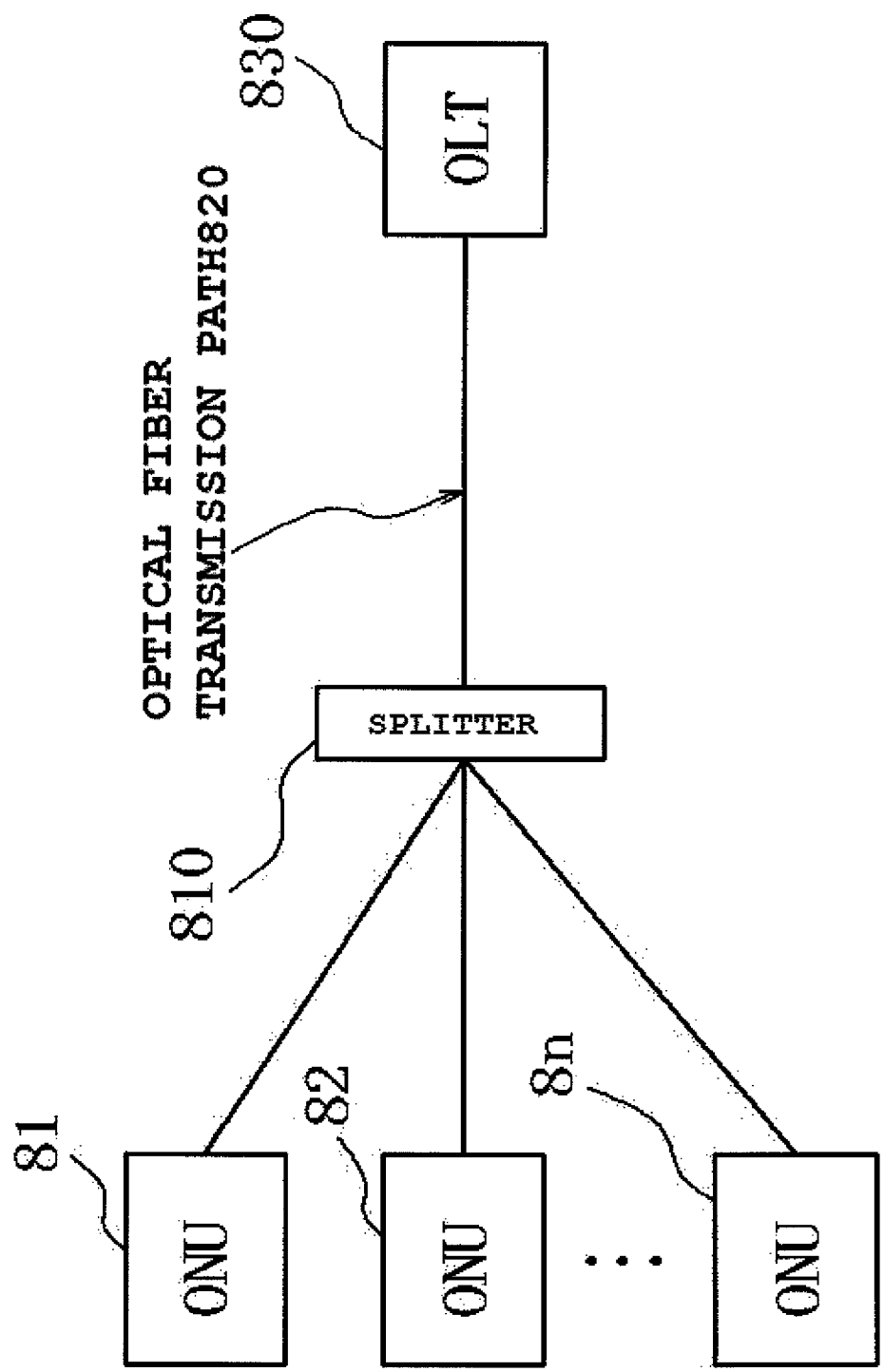
FIG. 16 is a diagram illustrating the configuration of a PON system.
Figure 17:
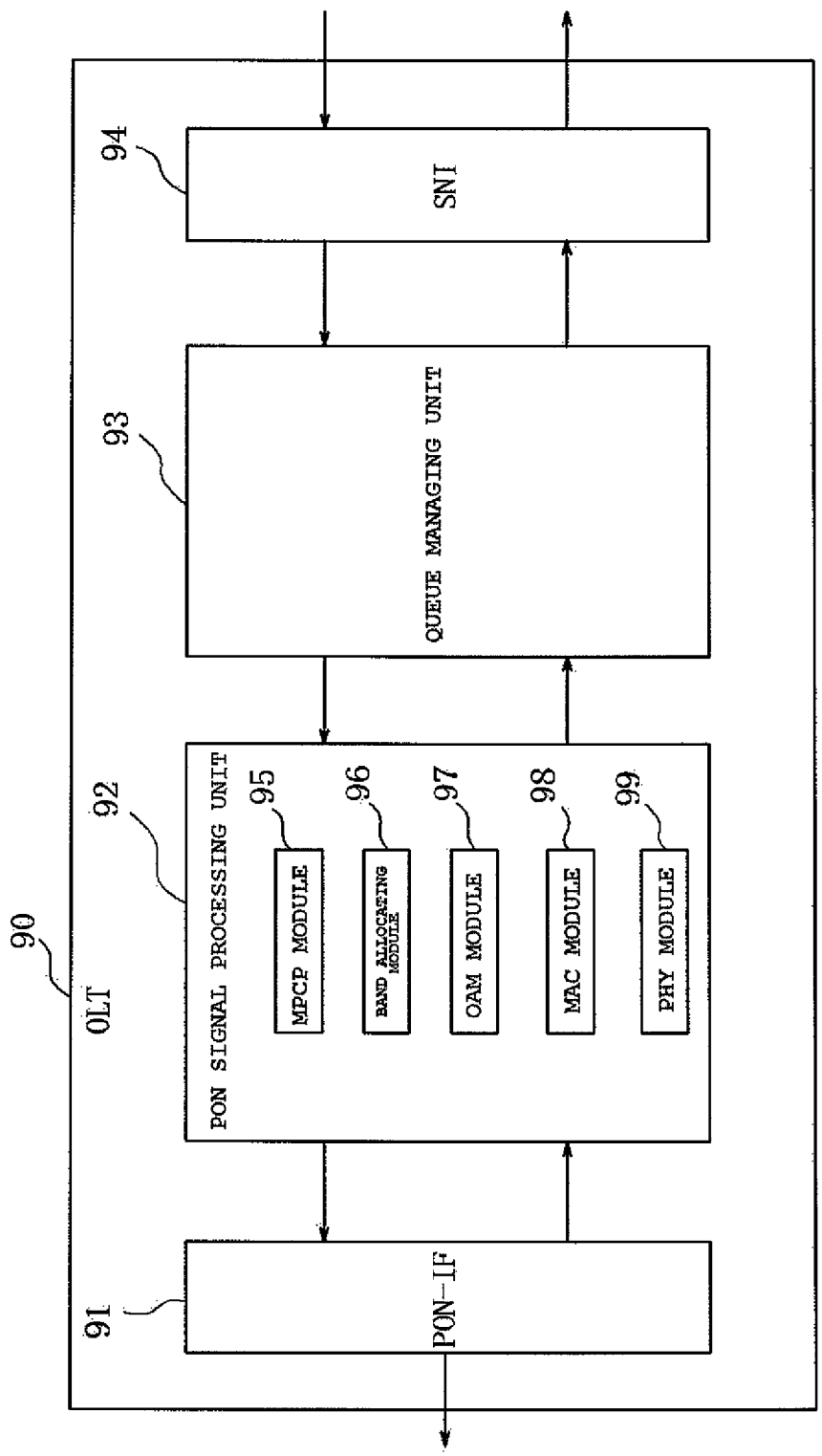
FIG. 17 is a diagram illustrating the configuration of a conventional OLT.
Figure 18:
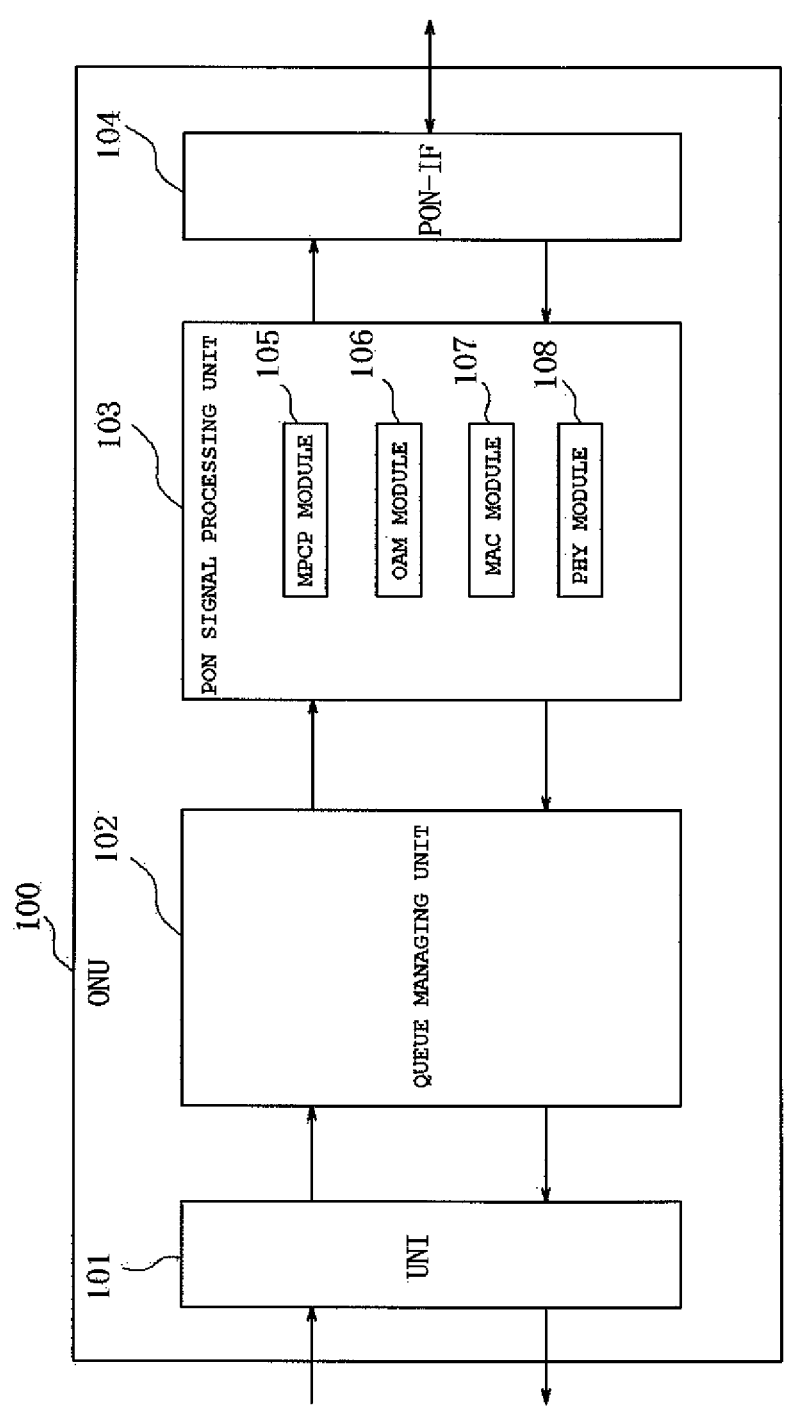
FIG. 18 is a diagram illustrating the configuration of a conventional ONU.
Figure 19:
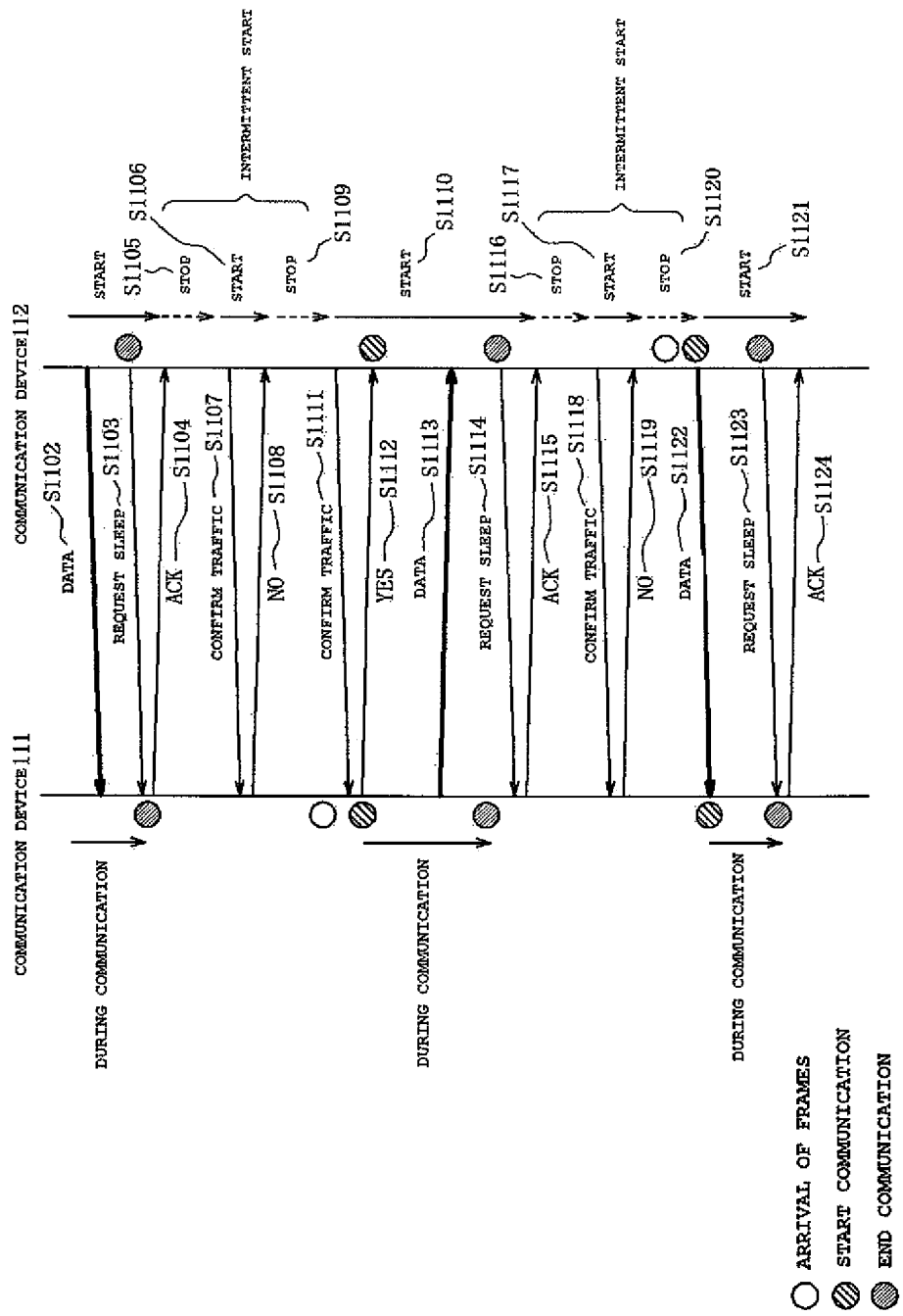
FIG. 19 is a diagram illustrating an autonomous intermittent start method.

In each embodiment, the cases of the EPON and the 10G-EPON are described. However, it is apparent that the present disclosure can be applied to other PONs, for example, a B-PON, a G-PON, a WDM-PON, and a CDM-PON based on the ITU-T advice. Further, it is apparent that the present disclosure can be applied to the optical network of the point-to-point type illustrated in FIG. 15.

Each embodiment in the EPON or the 10G-EPON will be described with reference to the drawings. It is assumed that traffic of a specific type to be described below includes at least one of VoIP traffic, RTP traffic, and traffic having the specific priority.

(Embodiment 3-1)

Figure 20:
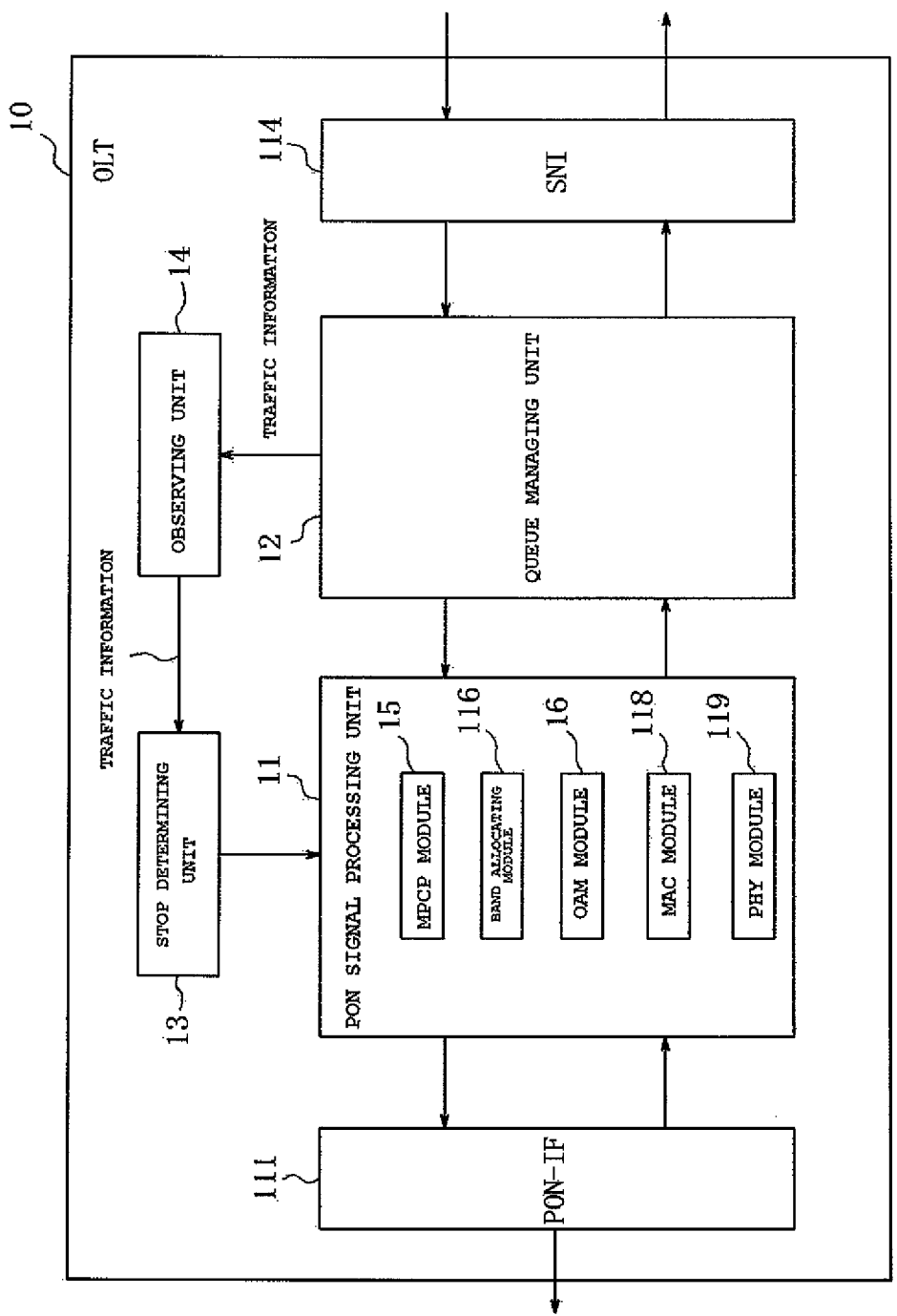
FIG. 20 is a diagram illustrating the configuration of an OLT according to the present disclosure.

First, the configuration of the OLT according to the present disclosure will be described using FIG. 20. FIG. 20 is a diagram illustrating the configuration of the OLT according to the present disclosure.

[Configuration of the OLT]

An OLT 10 includes a PON-IF 111, a PON signal processing unit 11, a queue managing unit 12, an SNI 114, a stop determining unit 13, and an observing unit 14.

The PON signal processing unit 11 has an MPCP module 15, a band allocating unit 116, an OAM module 16, a MAC module 118, and a PHY module 119, and receives a sleep instruction message from the stop determining unit 13, to be described below. The sleep instruction message is transmitted to the ONU.

The queue managing unit 12 observes a value of a type of service (ToS) or a value of a class of service (CoS) for each frame, to be described below.

The observing unit 14 monitors traffic for each of the ONUs connected to the OLT 10. For example, the observing unit 14 monitors an arrival interval of frames, an instantaneous bandwidth under use, and a queue length in a buffer during the period of the predetermined time t1. The observing unit 14 monitors communication traffic for each of the ONUs connected to the OLT 10 and observes whether traffic of a specific type exists.

The stop determining unit 13 sets threshold values to the arrival interval of the frames, the instantaneous bandwidth under use, and the queue length in the buffer, and determines whether the measurement values are equal to or greater than the threshold values or equal to or smaller than the threshold values to determine whether the communication is in the non-communication state. For example, the threshold values or more is used as a determination reference of the non-communication state in the case of the frame arrival interval and the threshold values or less is used as a determination reference of the non-communication state in the cases of the instantaneous bandwidth under use and the queue length in the buffer. When it is determined that the communication is in the non-communication state during the period of the predetermined time t1, the stop determining unit 13 transmits a sleep instruction message to the ONU after transmission of the data frames ends and stops the partial functions of the ONU.

The stop determining unit 13 has a function of not stopping the partial functions of the ONU or a function of stopping the partial functions of the ONU during the period of the predetermined time t2 and starting the partial functions with a predetermined cycle, regardless of whether communication of the ONU 10 including the traffic of the designated type enters into the non-communication state during the period of the predetermined time t1, when the traffic of the specific type exists. In this case, the stop determining unit 13 may transmit a sleep stop message to the ONU, when the partial functions of the ONU are not stopped, and transmit a sleep instruction message to the ONU, when the partial functions of the ONU are stopped. When the sleep instruction message and the sleep stop message are transmitted and received, for example, the MPCP module 15 or the OAM module 16 can be used.

When the predetermined time t1 is set to be equal to or longer than the predetermined time t2 and the frames arrive with a cycle of an average frame interval Tint, average queuing delay can be minimized. For example, when Tint is 5 ms, if 5 ms is set to the predetermined time t1 and 6 ms is set to the predetermined time t2, on the average, one or more frames arrive during the stop period. Meanwhile, when Tint is 5 ms, if 5 ms is set to the predetermined time t1 and 4 ms is set to the predetermined time t2, on the average, only one frame or less arrives during the stop period. Therefore, as compared with the former, average queuing delay decreases. In order to maximize a power saving effect while minimizing the average queuing delay, the predetermined time t1 and the predetermined time t2 are preferably set to the same value as Tint.

The existence or non-existence of the traffic of the specific type can be also determined on the basis of whether one or more frames of the specific type are observed during the period of the predetermined time t3. For example, VoIP packets (frames including the VoIP packets) are transmitted at an interval of 20 ms and each packet has the arrival time difference of a maximum of ±20 ms. For this reason, if the predetermined time t3 is set as 60 to 220 ms and VoIP communication having the high priority is performed with a specific ToS value or CoS value, at least 1 to 10 VoIP packets (frames including the VoIP packets) can be observed for the predetermined time t3. Therefore, it can be determined whether the VoIP communication having the high priority is performed. For example, when the traffic of the specific type is the traffic having the high priority, t1>t3 can be set. When the traffic of the specific type is the traffic having the low priority, t3<t1 can be set.

The existence or non-existence of the traffic of the specific type can be also determined on the basis of whether a session of the traffic of the specific type is continuing. For example, when the VoIP communication is performed, fixing and opening of sessions between terminals are performed using a session initiation protocol (SIP). Therefore, by snooping an INVITE message at the time of starting the session and a BYE message at the time of opening the session, it can be determined whether the session is continuing.

Figure 21:
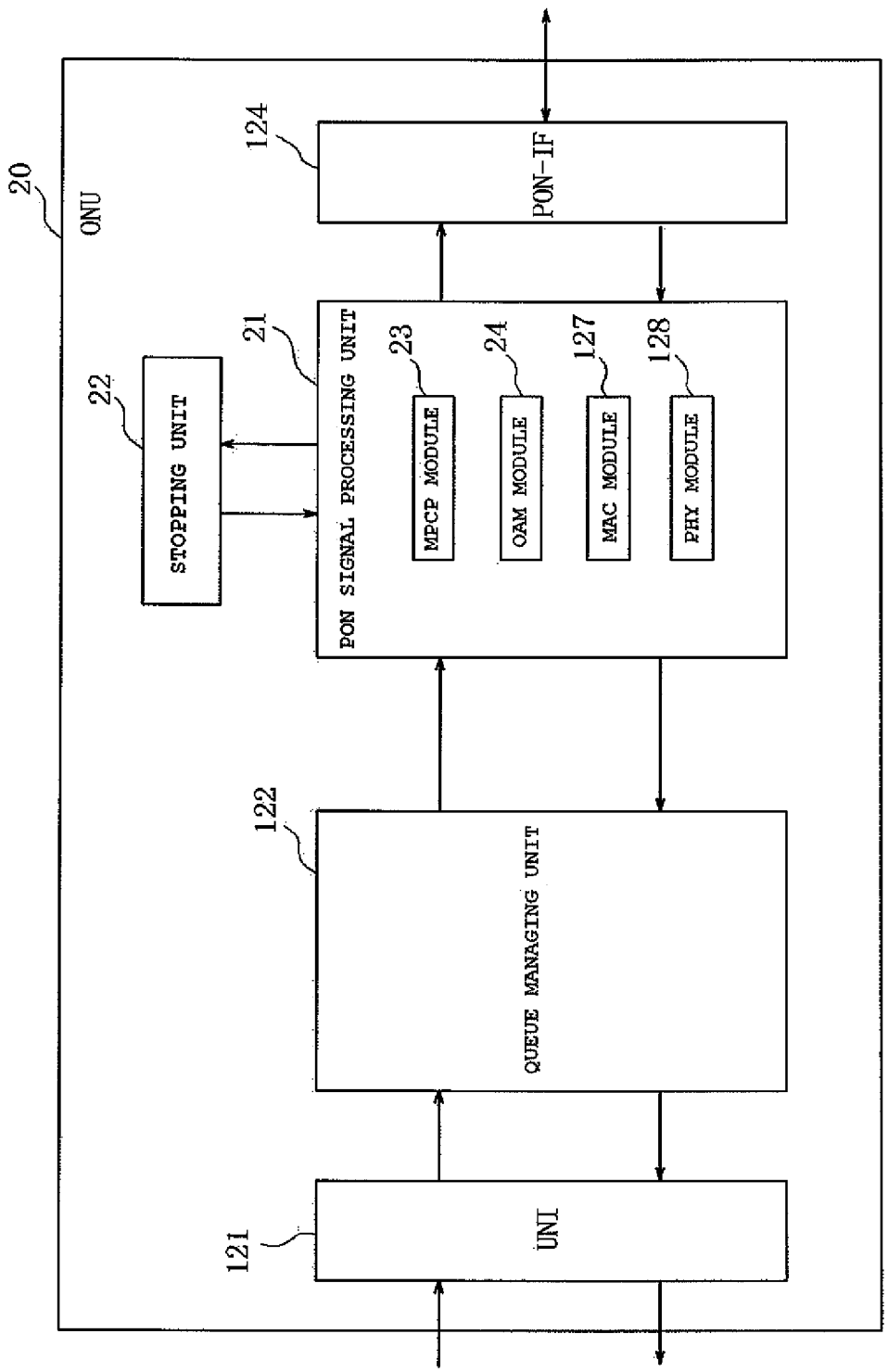
FIG. 21 is a diagram illustrating the configuration of an ONU according to the present disclosure.

Next, the configuration of the ONU according to the present disclosure will be described using FIG. 21. FIG. 21 is a diagram illustrating the configuration of the ONU according to the present disclosure.

[Configuration of the ONU]

An ONU 20 includes a UNI 121, a queue managing unit 122, a PON signal processing unit 21, a PON-IF 124, and a stopping unit 22.

The PON signal processing unit 21 has an MPCP module 23, an OAM module 24, a MAC module 127, and a PHY module 128, and exchanges a message with the stopping unit 22 to be described below.

If the stopping unit 22 receives a sleep instruction message from the OLT 10, the stopping unit 22 transmits a confirmation response (ACK message) to the OLT 10 and stops the partial functions (for example, functions of the queue managing unit 122 and the PON signal processing unit 21) of the ONU 20 during the period of the predetermined time t2. The stopping unit 22 starts the stopped partial functions after the predetermined time t2 passes and confirms whether traffic exists with respect to the OLT 10 (traffic confirmation message). If it is in the non-communication state (NO message), it stops the partial functions during the period of the predetermined time t2. If the frames arrive (YES message), it starts communication with the OLT 10.

The stopping unit 22 preferably has a function of immediately starting the stopped partial functions to prevent transmission delay of frames and transmitting the frames to the OLT 10, when the traffic is transmitted from the UNI 121. When traffic to be transmitted from the UNI 121 exists, the stopping unit 22 can return a rejection response (NACK message) with respect to a sleep instruction from the OLT 10 and ends the stop of the partial functions. When each of the message (the ACK message, the NACK message, the traffic confirmation message, the NO message, and the YES message) described above is transmitted and received, for example, the MPCP module 23 or the OAM module 24 can be used.

Hereinafter, the case where the non-communication state is determined by the instantaneous bandwidth under use (traffic amount) will be described.

For example, when connection of the traffic having the high priority, such as the VoIP communication using the RTP or the SIP, exists, the functions of the ONU 20 are not stopped in all cases to maintain a communication quality with respect to the traffic having the high priority.

For this reason, the queue managing unit 12 in the OLT 10 has a function of observing a ToS value stored in a header of an Internet protocol (IP) packet for each frame, and confirms whether VoIP traffic exists. Or the queue managing unit 12 has a function of managing the ToS value of the IP packet to be associated with a CoS value stored in a virtual LAN (VLAN) tag provided MAC frame and observing the CoS value for each frame.

Figure 22:
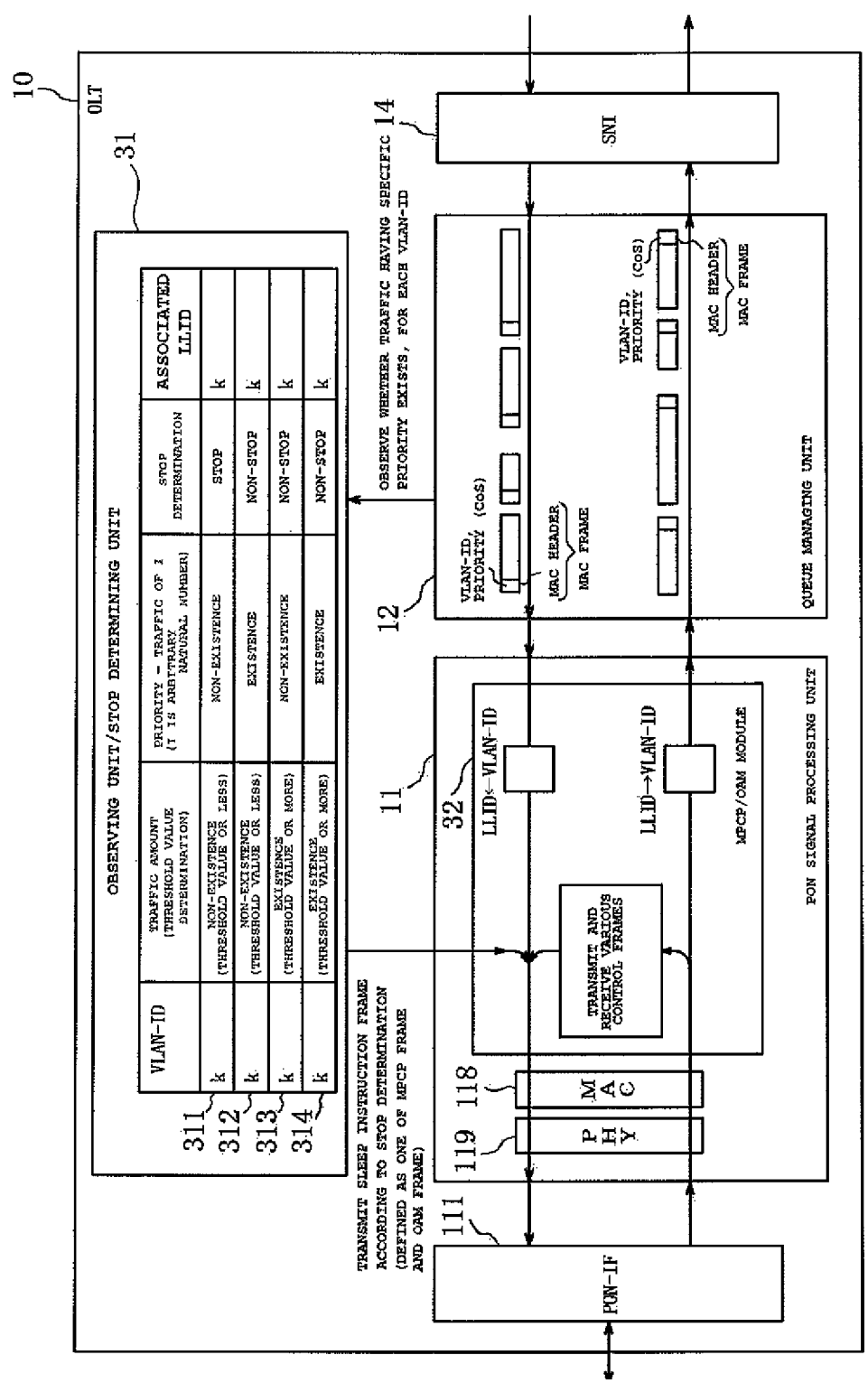
FIG. 22 is a diagram illustrating functions of an OLT according to the present disclosure.

Next, the functions of the OLT 10 will be described using FIG. 22. FIG. 22 is a functional block diagram of the OLT 10.

[Functions of the OLT]

FIG. 22 illustrates the case where the queue managing unit 12 manages the ToS value of the IP packet to be associated with the CoS value stored in the VLAN tag provided MAC frame and observing the CoS value for each frame.

In addition, it is assumed that the queue managing unit 12 associates a VLAN-ID designated in the VLAN tag and a logical link ID (LLID) of a PON, and performs communication. The LLID is an identifier that is allocated to each logical link.

An observing unit/stop determining unit 31 is a component that is represented as one block by collecting the functions of the observing unit 14 and the stop determining unit 13. The observing unit/stop determining unit 31 observes the traffic amount and the priority of the traffic for each VLAN-ID of the frame processed by the queue managing unit 12, and performs the stop determination on the basis of the traffic amount and the priority of the traffic.

When the traffic amount is equal to or smaller than the threshold value during the period of the predetermined time t1 and the traffic having the specific priority (ToS value or CoS value) is not observed, with respect to the certain VLAN-ID, the observing unit/stop determining unit 31 determines the stop of the partial functions and transmits the sleep instruction message with respect to the corresponding LLID (311). The sleep request message is defined as one of the MPCP frame or the OAM frame. In addition, k that is illustrated in 311 to 314 is a value that corresponds to each ONU registered in the OLT. For example, when the n ONUs are registered in the OLT, k becomes a value in a range of 1 (k (n.

When the traffic amount is equal to or smaller than the threshold value and the traffic having the specific priority is observed, the observing unit/stop determining unit 31 determines the non-stop of the partial functions, and continuously observes the traffic without transmitting the sleep instruction message, during the period of the predetermined time t3 (312).

When the traffic amount is equal to or greater than the threshold value during the period of the predetermined time t1, the observing unit/stop determining unit 31 determines the non-stop of the partial functions, regardless of whether the traffic having the specific priority is observed (313 and 314).

An MPCP/OAM module 32 that is included in the PON signal processing unit 11 indicates the MPCP module 15 or the OAM module 16. The MPCP/OAM module 32 associates the VLAN-ID with the LLID in the case of a downlink signal, and associates the LLID with the VLAN-ID in the case of an uplink signal. When the sleep request message is received from the observing unit/stop determining unit 31, the sleep request message is transmitted as one of the MPCP frame or the OAM frame.

In this case, the OLT 10 preferably includes a buffer (the buffer capacity is set as the maximum transmission amount for the stop time) that temporarily stores the arrived frames to suppress the number of lost frames to zero, when the ONU 20 is in the stop state and traffic to be transmitted to the ONU 20 is generated.

The observing unit 14 preferably does not include the frames discarded in the ONU 20 in communication traffic monitoring objects to improve the determination capability of the stop determining unit 13.

Even when the traffic of the specific type is circulated, the sleep instruction message can be transmitted to the ONU 20, in the case where the traffic of the specific type are the frames discarded in the ONU 20. For example, as a method that realizes multicast communication in the PON, a method that transmits the frames broadcast from the OLT 10 to all of the ONUS 20 and filters the frames using the identifiers of the frames at the side of the ONUS 20 is considered. Even in this case, since the OLT 10 holds the association table of the ONU 20 of the object performing the multicast communication and the frame identifier, the transmission destination ONU 20 can be specified at the side of the OLT 10.

Even when a protocol filter to filter the specific protocol is mounted in the ONU 20, if the filter information is held by the OLT 10, the same application can be made. As such, even when the multicast frames are circulated through the PON, the partial functions of the ONU 20 can be stopped by selecting only the ONU 20 in the non-communication state.

Next, the operations of the OLT 10 and the ONU 20 will be described using FIGS. 23 and 24.

[Operations of the OLT and the ONU]

Figure 23:
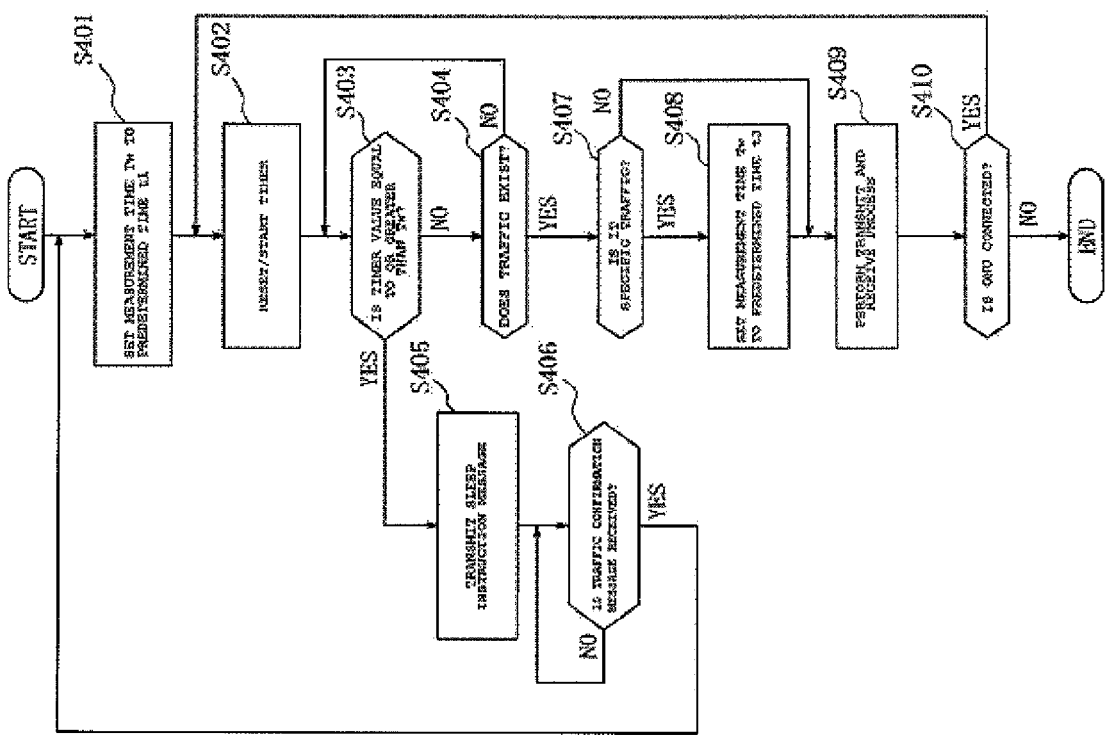
FIG. 23 is a diagram illustrating an operation of an OLT according to the present disclosure.

FIG. 23 is a flowchart illustrating an example of the operation of the OLT 10. In the OLT 10, a process of FIG. 23 is executed for each VLAN-ID.

In step S401, the observing unit 14 sets the measurement time Tw to the predetermined time t1. The process proceeds to step S402.

In step S402, the observing unit 14 starts a timer after resetting the timer. The process proceeds to step S403.

In step S403, the observing unit 14 determines whether a timer value is equal to or greater than the measurement time Tw. When the timer value is smaller than the measurement value Tw (step S403: No), the process proceeds to step S404. When the timer value is equal to or greater than the measurement value Tw (step S403: Yes), the process proceeds to step S405.

In step S404, the stop determining unit 13 determines whether the traffic exists. When the traffic exists (step S404: Yes), the process proceeds to step S407. When the traffic does not exist (step S404: No), the process returns to step S403.

In step S405, since the traffic does not exist for the measurement time Tw, the stop determining unit 13 determines that the communication is in the non-communication state and transmits the sleep instruction message to the ONU 20. The process proceeds to step S406.

In step S406, the observing unit 14 determines whether the traffic confirmation message is received from the ONU 20. When the traffic confirmation message is received from the ONU 20 (step S406: Yes), the process returns to step S401. When the traffic confirmation message is not received (step S406: No), the process returns to step S406. That is, the process is stopped until the traffic confirmation message is received from the ONU 20.

In step S407, the stop determining unit 13 determines whether the traffic is the traffic having the specific priority. When the traffic is the traffic having the specific priority (step S407: Yes), the process proceeds to step S408. When the traffic is not the traffic having the specific priority (step S407: No), the process proceeds to step S409.

In step S408, the observing unit 14 sets the measurement time Tw to the predetermined time t3. The process proceeds to step S409. The reason why the measurement time Tw is set to the predetermined time t3 is that the process proceeds to step S405, in the case where traffic does not exist during the period of t3, not the period of t1, in step S403, when the traffic is the traffic having the specific priority. In this way, the condition of stopping the partial functions of the ONU can be changed by changing the measurement time Tw according to the type of the traffic.

In step S409, the OLT 10 communicates with the ONU 20 and transmits and receives data. The process proceeds to step S410.

In step S410, it is determined whether the OLT 10 is connected to the ONU 20. When the OLT 10 is connected to the ONU 20 (step S410: Yes), the process returns to step S402. When the OLT 10 is not connected to the ONU 20 (step S410: No), the process ends.

This flowchart is exemplary and illustrates an example of the operation of transmitting the sleep instruction message when no traffic is observed during the period of the predetermined time t3, after the traffic having the specific priority is observed.

After the traffic having the specific priority is observed, when the traffic having the specific priority is not observed during the period of the predetermined time t3, if no traffic is observed during the period of the predetermined time t1, the sleep instruction message may be transmitted. In this case, a second time measuring unit (timer) may be used. When the traffic having the specific priority is observed, a value of the second time measuring unit may be set (reset) to 0 and the second time measuring unit may start, and when the value of the second time measuring unit becomes the predetermined time t3 or more, the measurement time Tw may be set again to the predetermined time t1.

Figure 24:
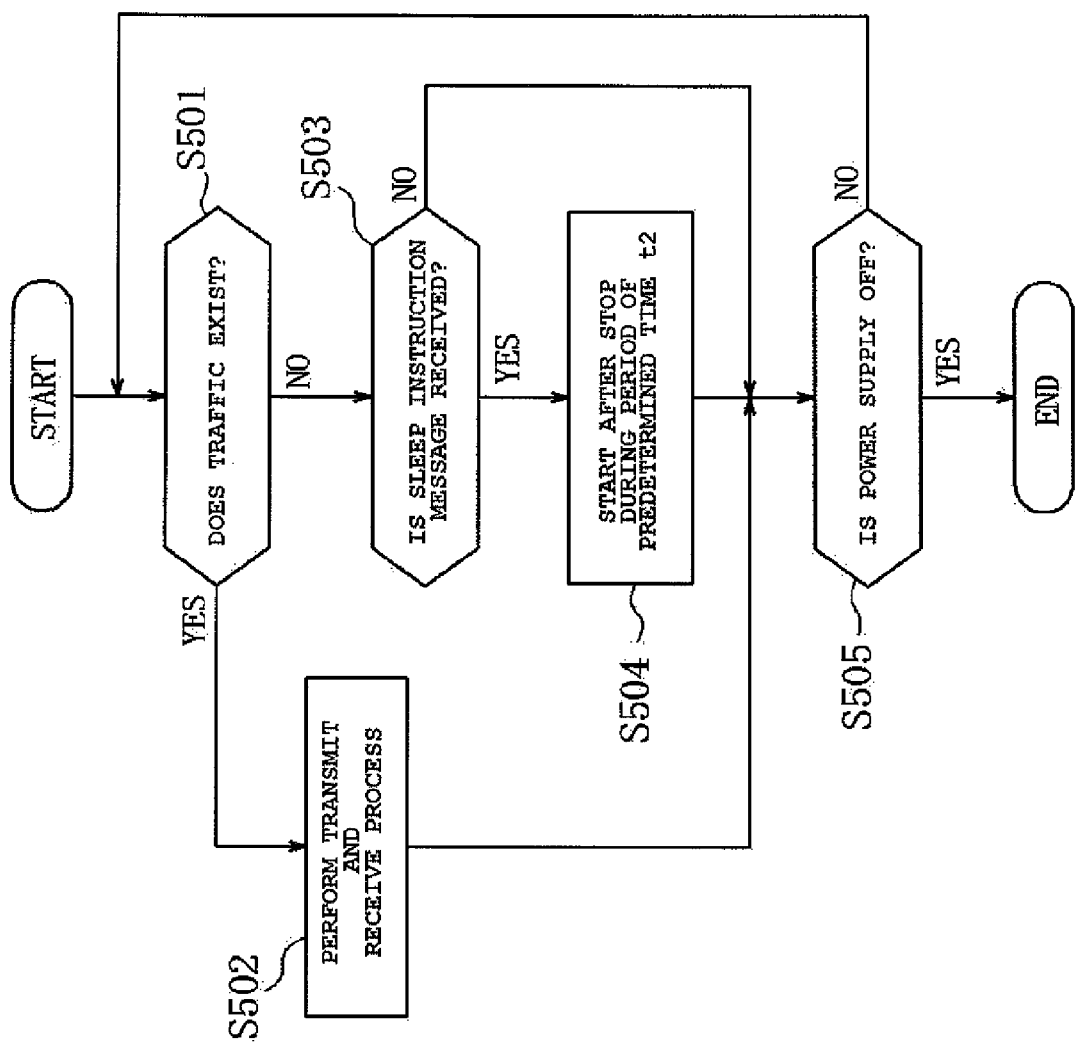
FIG. 24 is a diagram illustrating an operation of an ONU according to the present disclosure.

FIG. 24 is a flowchart illustrating an example of the operation of the ONU 20. First, in step S501, the stopping unit 22 determines whether traffic exists. When the traffic exists (step S501: Yes), the process proceeds to step S502. When the traffic does not exist (step S501: No), the process proceeds to step S503.

In step S502, the ONU 20 communicates with the OLT 10 and transmits and receives data. The process proceeds to step S505.

In step S503, the stopping unit 22 determines whether the sleep instruction message is received from the OLT 10. When the sleep instruction message is received (step S503: Yes), the process proceeds to step S504. When the sleep instruction message is not received (step S503: No), the process proceeds to step S505.

In step S504, the stopping unit 22 stops the partial functions of the ONU 20 during the period of the predetermined time t2, and starts the stopped partial functions after the period of the predetermined time t2 passes. Then, the process proceeds to step S505.

In step S505, it is determined whether the power supply of the ONU 20 is turned off. When the power supply is turned off (step S505: Yes), the process ends. When the power supply is turned on (step S505: No), the process returns to step S501.

According to Embodiment 3-1, power of the ONU 20 can be saved without deteriorating a communication quality of the traffic of the specific type.

(Embodiment 3-2)

Next, an example of a modification of the observing method of the observing unit 14 in the OLT 10 will be described as Embodiment 3-2. The same components as those in Embodiment 3-1 are denoted by the same reference numerals and the description thereof is omitted.

Figure 25:
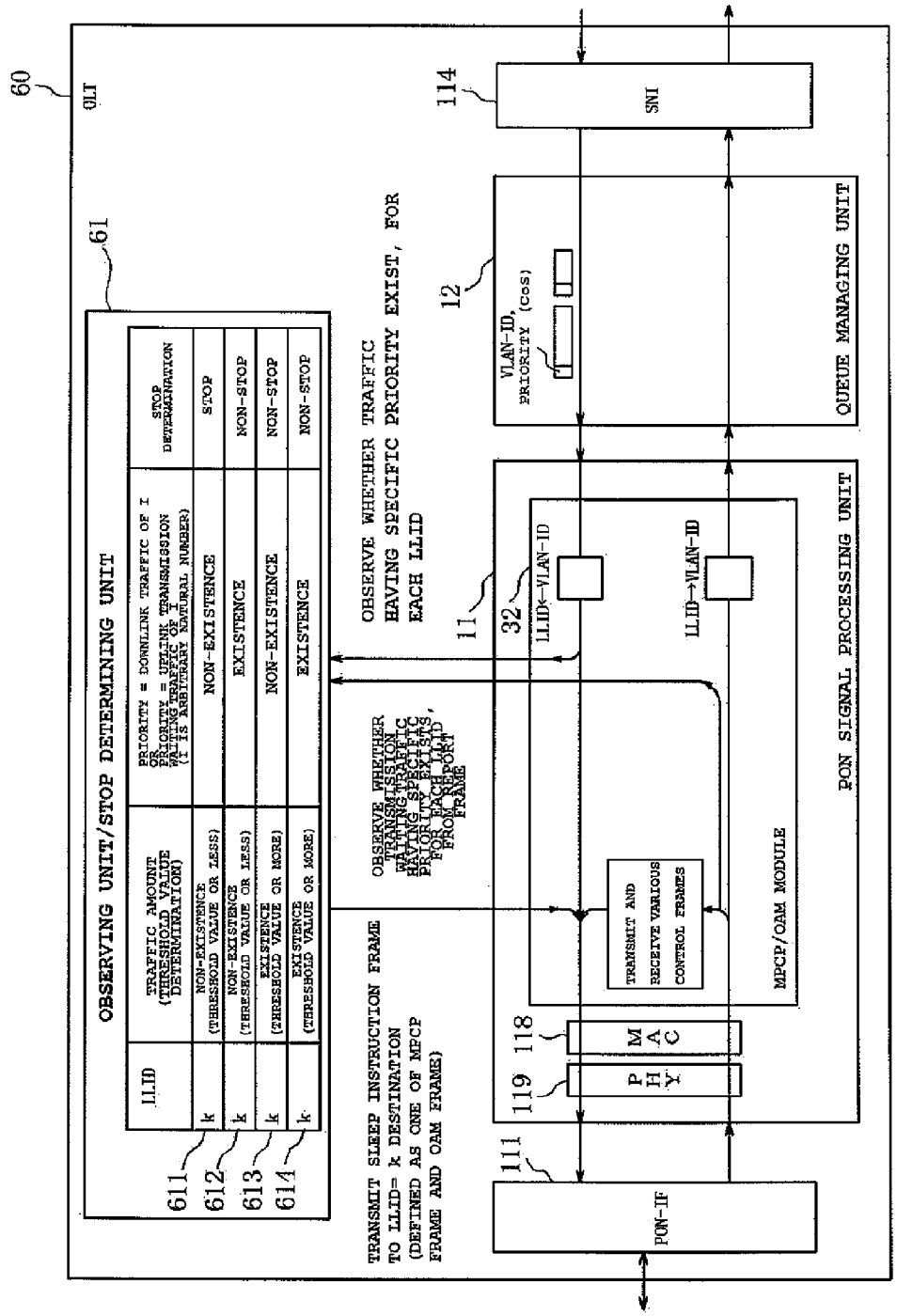
FIG. 25 is a diagram illustrating the configuration of an OLT according to Embodiment 3-2 of the present disclosure.

FIG. 25 is a functional block diagram of an OLT 60 according to Embodiment 3-2. The OLT 60 according to Embodiment 3-2 determines whether uplink traffic exists, using a report message received from each ONU 20. The report message is a message that is used to notify the OLT 60 of the transmission waiting traffic amount for each of the plural queues provided to the ONU 20, and each queue corresponds to each priority (ToS value or CoS value).

Figure 26:
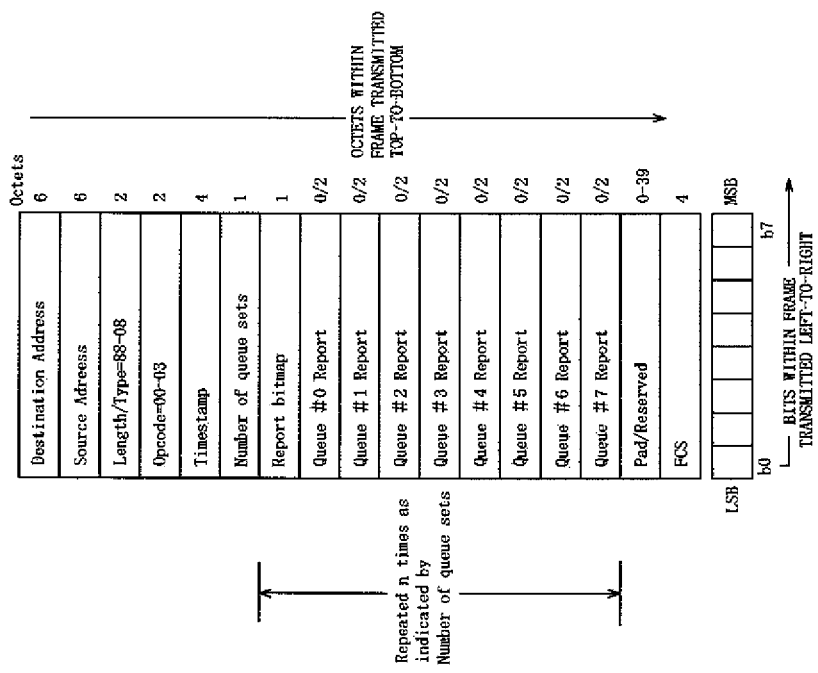
FIG. 26 is a diagram illustrating a frame format of a report message.

FIG. 26 is a diagram illustrating a frame format of a report message in the IEEE standard 802.3. As values of the priorities, 0 to 7 of "Queue #0 Report" to "Queue #7 Report" illustrated in the format are used.

The observing unit/stop determining unit 31 observes the traffic amount and the priority of the traffic for each LLID value and performs the stop determination on the basis of the traffic amount and the priority of the traffic.

When the traffic amount is equal to or smaller than the threshold value during the period of the predetermined time t1 and the traffic having the specific priority (ToS value or CoS value) is not observed, with respect to the certain LLID, the observing unit/stop determining unit 31 determines the stop of the partial functions and transmits the sleep instruction message with respect to the corresponding LLID (611). In addition, k that is illustrated in 611 to 614 is a value that corresponds to each ONU 20 registered in the OLT 60. For example, when the n ONUS 20 are registered in the OLT 60, k becomes a value in a range of 1≤k≤n.

When the traffic amount is equal to or smaller than the threshold value and the downlink traffic having the specific priority or the uplink transmission waiting traffic having the specific priority is observed, the observing unit/stop determining unit 31 determines the non-stop of the partial functions, and continuously performs the observation of the downlink traffic and the determination of the report message of the uplink transmission waiting traffic without transmitting the sleep instruction message, during the period of the predetermined time t3 (612). The uplink transmission waiting traffic that has the specific priority is determined from the report message.

When the traffic amount is equal to or greater than the threshold value during the period of the predetermined time t1, the observing unit/stop determining unit 31 determines the non-stop of the partial functions, regardless of whether the traffic having the specific priority is observed (613 and 614).

When the traffic of the designated type is determined, protocol information such as the RTP or the SIP may be used, and priority information such as the ToS value or the CoS value may be arbitrarily combined and used.

According to Embodiment 3-2, power of the ONU 20 can be saved without deteriorating a communication quality of the traffic of the specific type.

(Embodiment 3-3)

Next, a modification of the determining method of the stop determining unit 13 in the OLT 10 according to Embodiment 3-1 and the OLT 60 according to Embodiment 3-2 will be described as Embodiment 3-3. In this embodiment, when only the frames transmitted with a predetermined cycle such as the VoIP exist, an intermittent start operation is performed with a cycle synchronized with a frame cycle thereof, and power of the ONU 20 can be efficiently saved by setting a stop time shorter than the frame cycle. Even when traffic does not exist, the intermittent start operation is performed with the same cycle.

FIG. 27 is a diagram illustrating a determining method in the stop determining unit 13 according to this embodiment. In addition, k that is illustrated in 81 to 84 is a value that corresponds to each ONU 20 registered in the OLT 10 or 60. For example, when the n ONUS are registered in the OLT, k becomes a value in a range of 1 (k (n.

When traffic does not exist during the period of the predetermined time t1, with respect to the certain VLAN-ID (or LLID), the stop determining unit 13 according to this embodiment determines the stop of the partial functions (81).

Meanwhile, when traffic exists in the period of the predetermined time t1, the type of the traffic is determined during the period of the predetermined time t3. When the traffic is only traffic of the specific type (for example, VoIP), the stop determining unit 13 determines the stop of the partial functions and transmits a sleep instruction message (82). When the traffic includes traffic other than the traffic of the specific type, the stop determining unit 13 determines the non-stop of the partial functions (83 and 84).

When traffic of a specific type is observed, the stop determining unit 13 performs the stop determination using the methods illustrated in Embodiment 3-1 and Embodiment 3-2. When traffic of another specific type is observed, the stop determining unit 13 can perform the stop determination using the method illustrated in Embodiment 3-3.

According to Embodiment 3-3, when only the frames transmitted with the predetermined cycle exist, power of the ONU can be efficiently saved.

The embodiments described above are descried as the representative examples. However, it can be apparent to those skilled in the art that various changes and replacements can be made within a range of the present disclosure without departing from the sprit of the present disclosure, and each embodiment can be combined and other embodiments can be realized. Therefore, the present disclosure is not analyzed to be limited by the embodiments described above, and various modifications or changes can be made without departing from a range of claims. For example, the observing unit 14 and the stop determining unit 13 that are described in each embodiment may be arbitrarily combined and used.

The range of the partial functions that are stopped at the time of the sleep is not particularly limited and may be determined by the balance with a rising time of a circuit.

Figure 28:
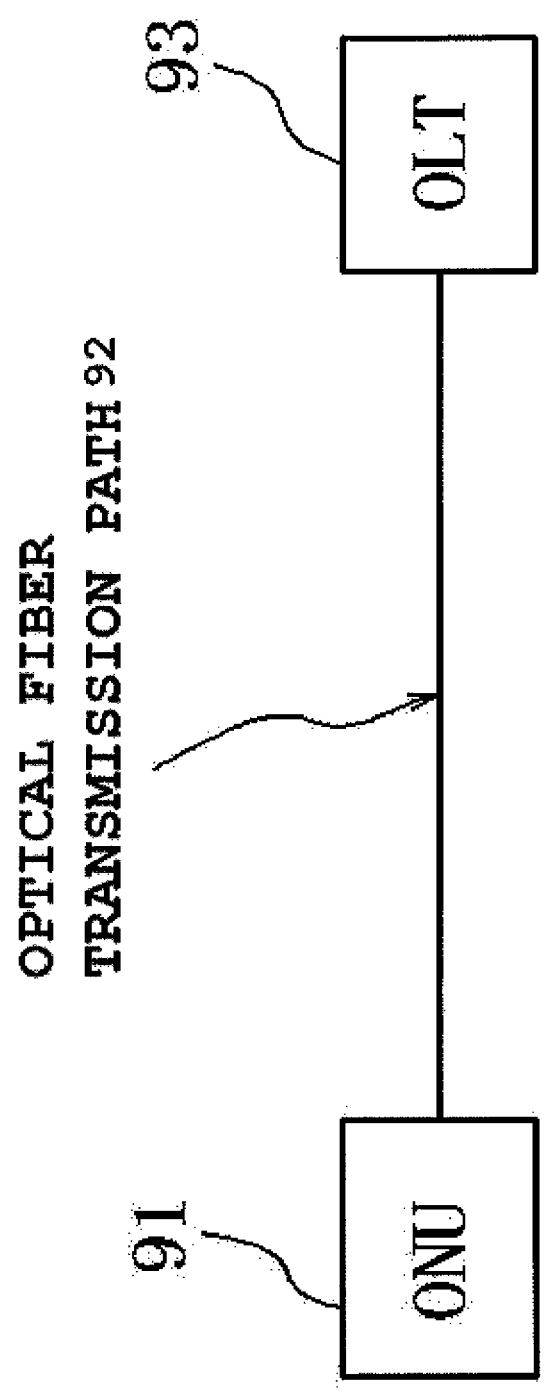
FIG. 28 is a diagram illustrating the configuration of an optical network system of a point-to-point type.
Figure 29:
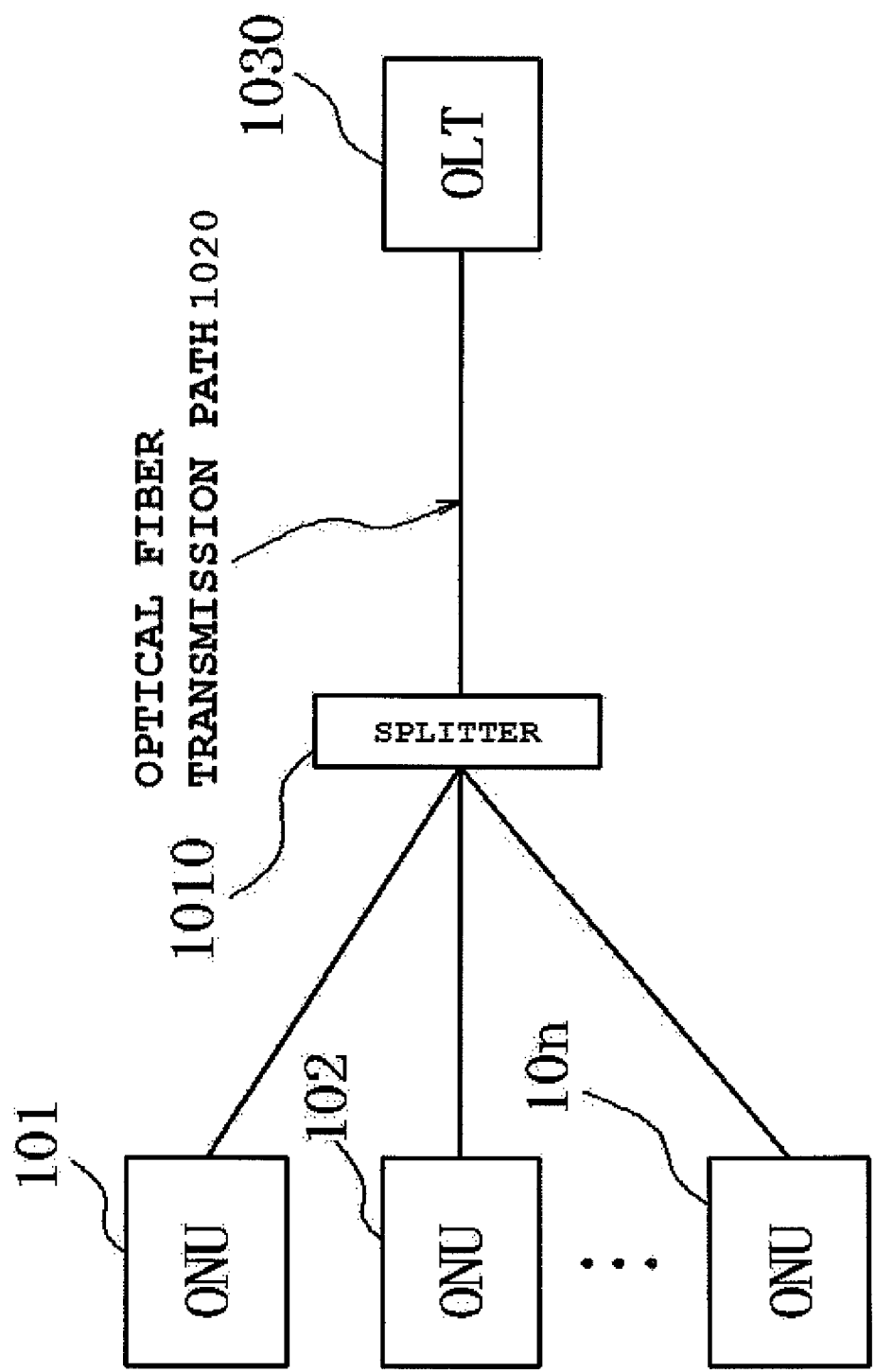
FIG. 29 is a diagram illustrating the configuration of a PON system.
Figure 30:
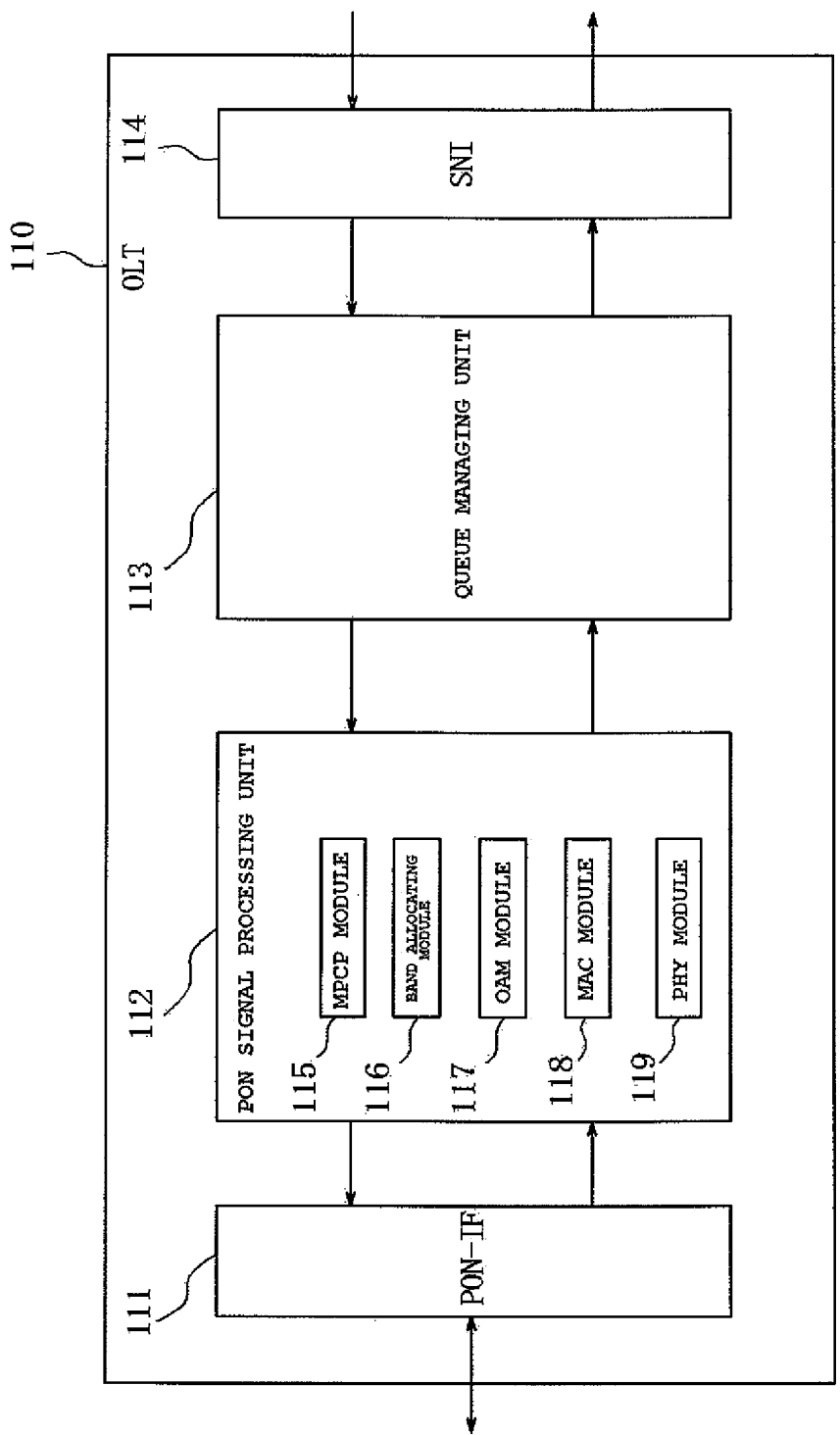
FIG. 30 is a diagram illustrating the configuration of a conventional OLT.
Figure 31:
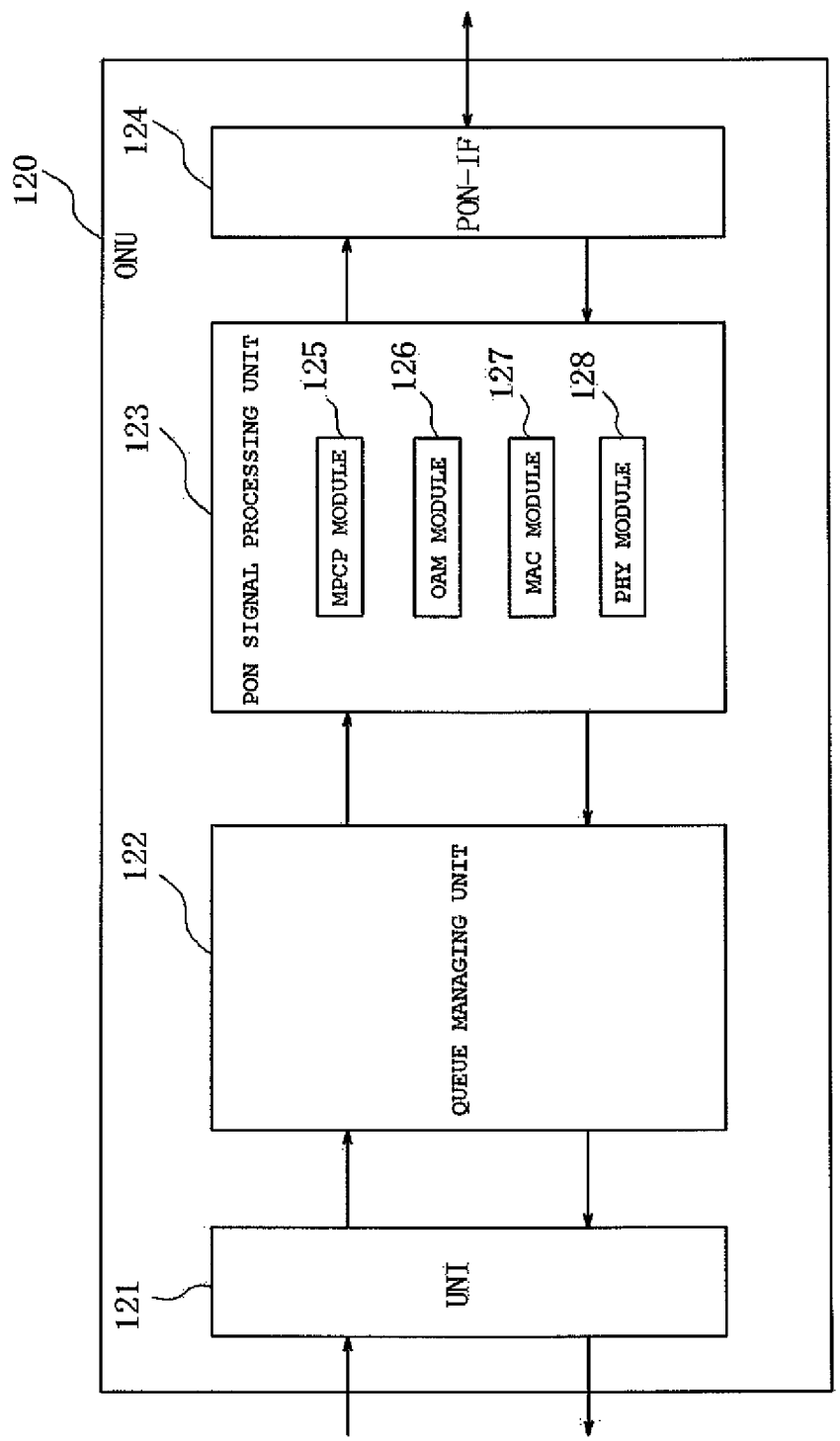
FIG. 31 is a diagram illustrating the configuration of a conventional ONU.
Figure 32:
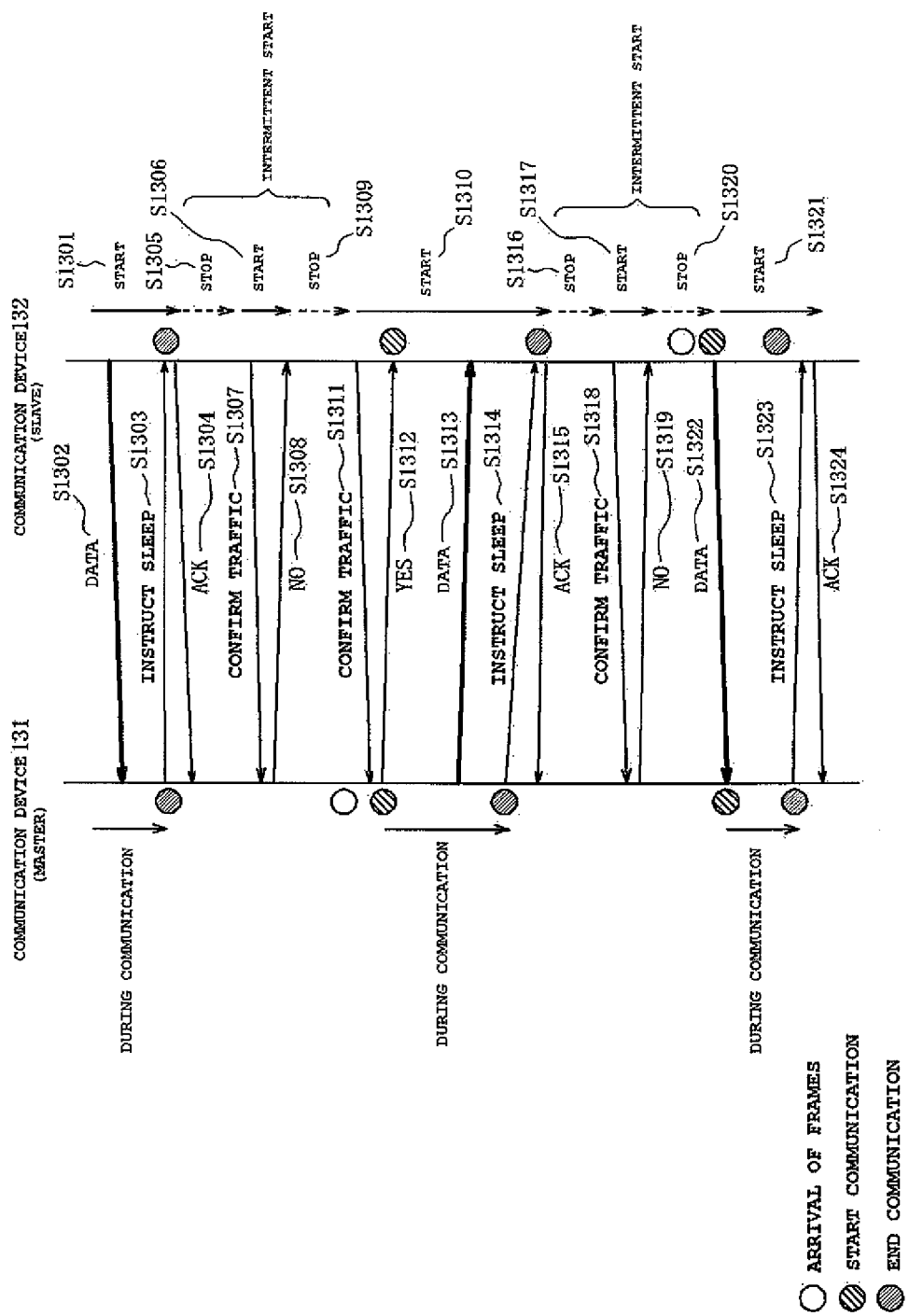
FIG. 32 is a diagram illustrating a master/slave type intermittent start method.
Figure 33:
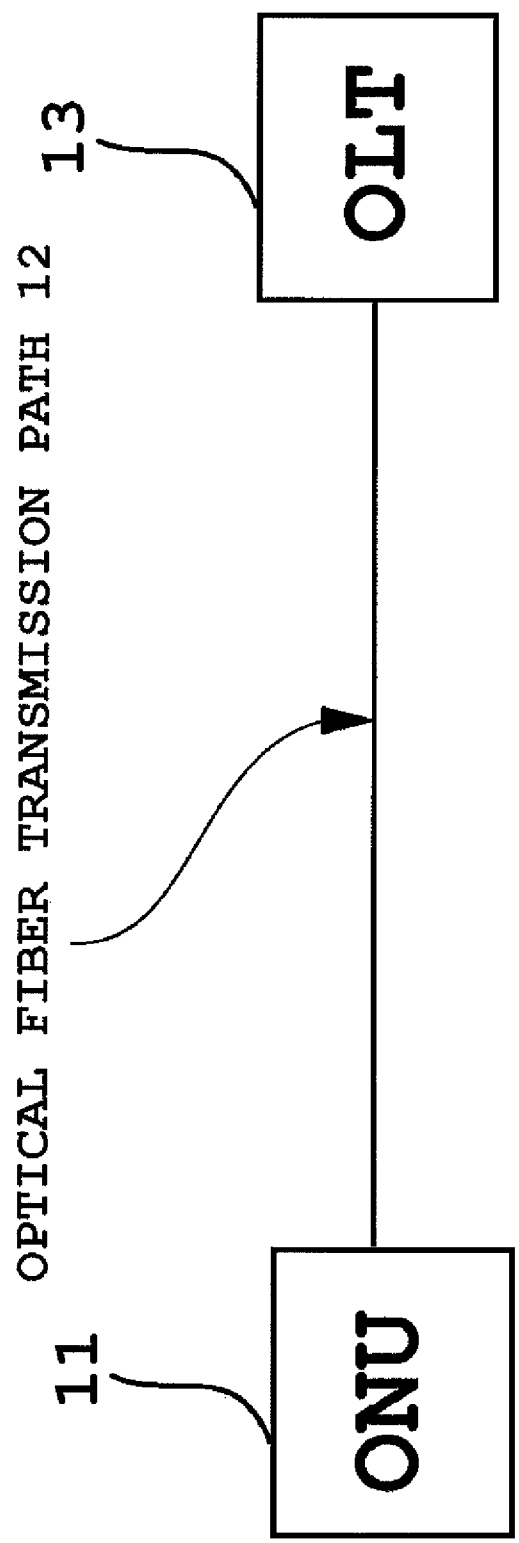
FIG. 33 is a diagram illustrating the configuration of an optical network system.
Figure 34:
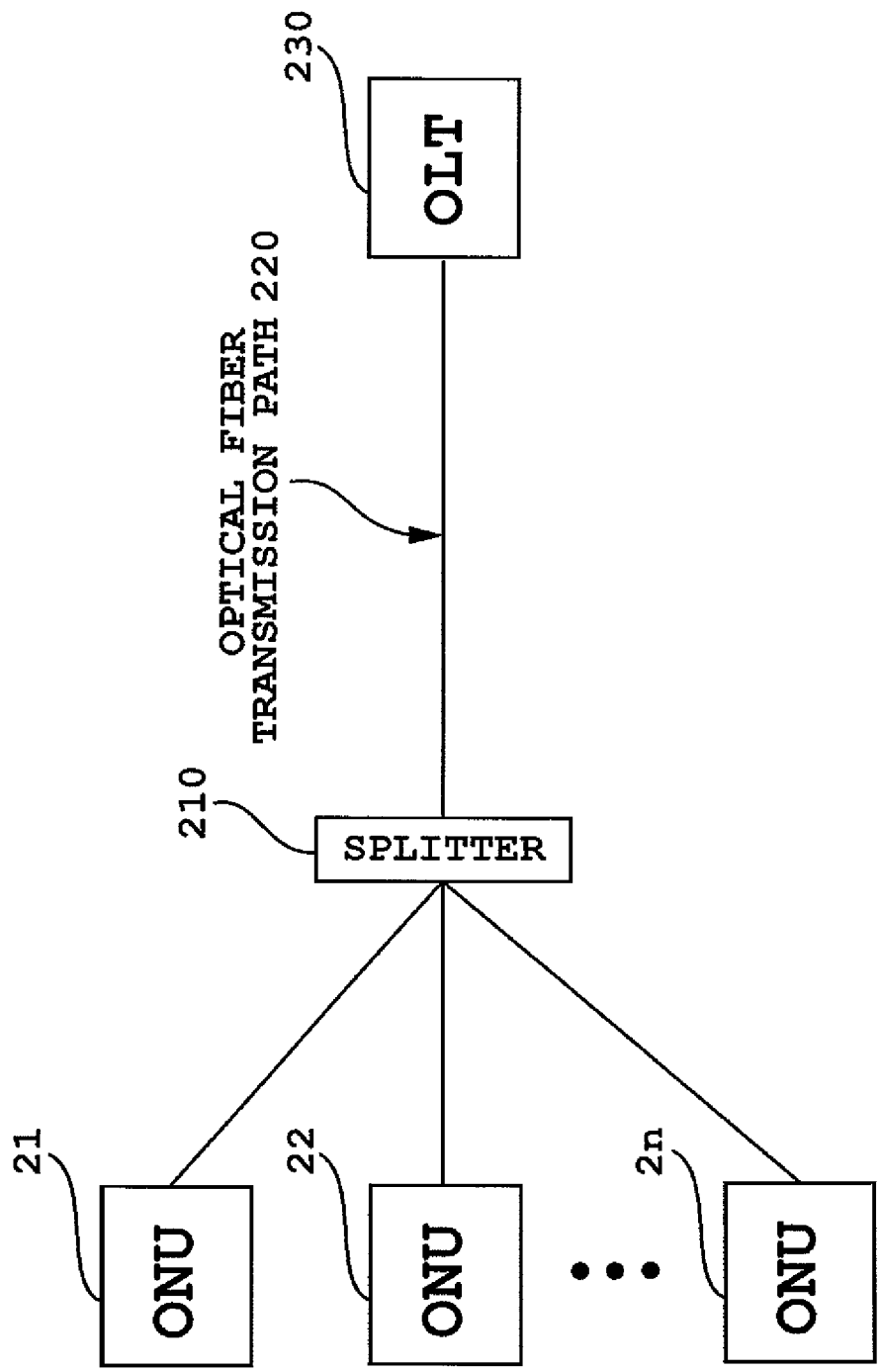
FIG. 34 is a diagram illustrating the configuration of a PON system.
Figure 35:
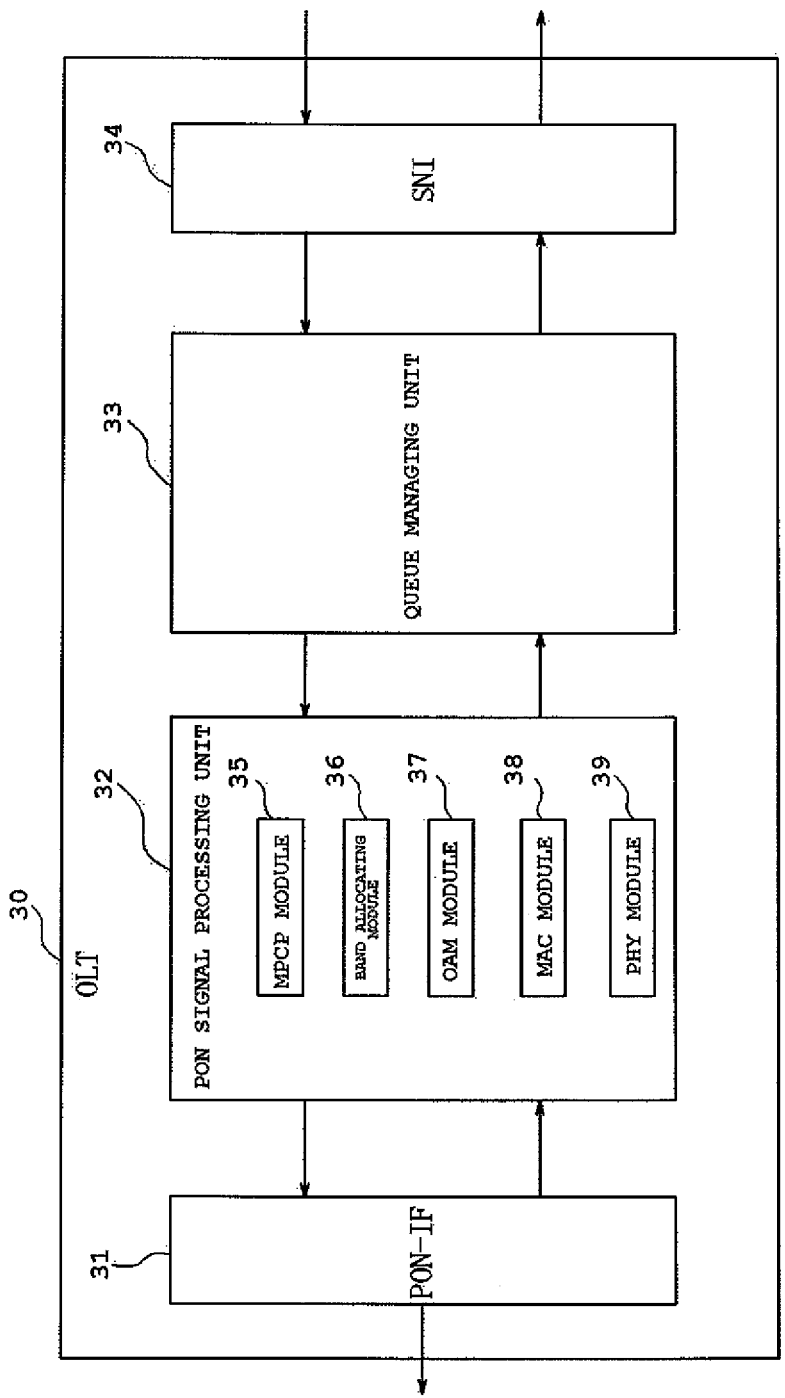
FIG. 35 is a functional block diagram of a conventional OLT in an EPON.
Figure 36:
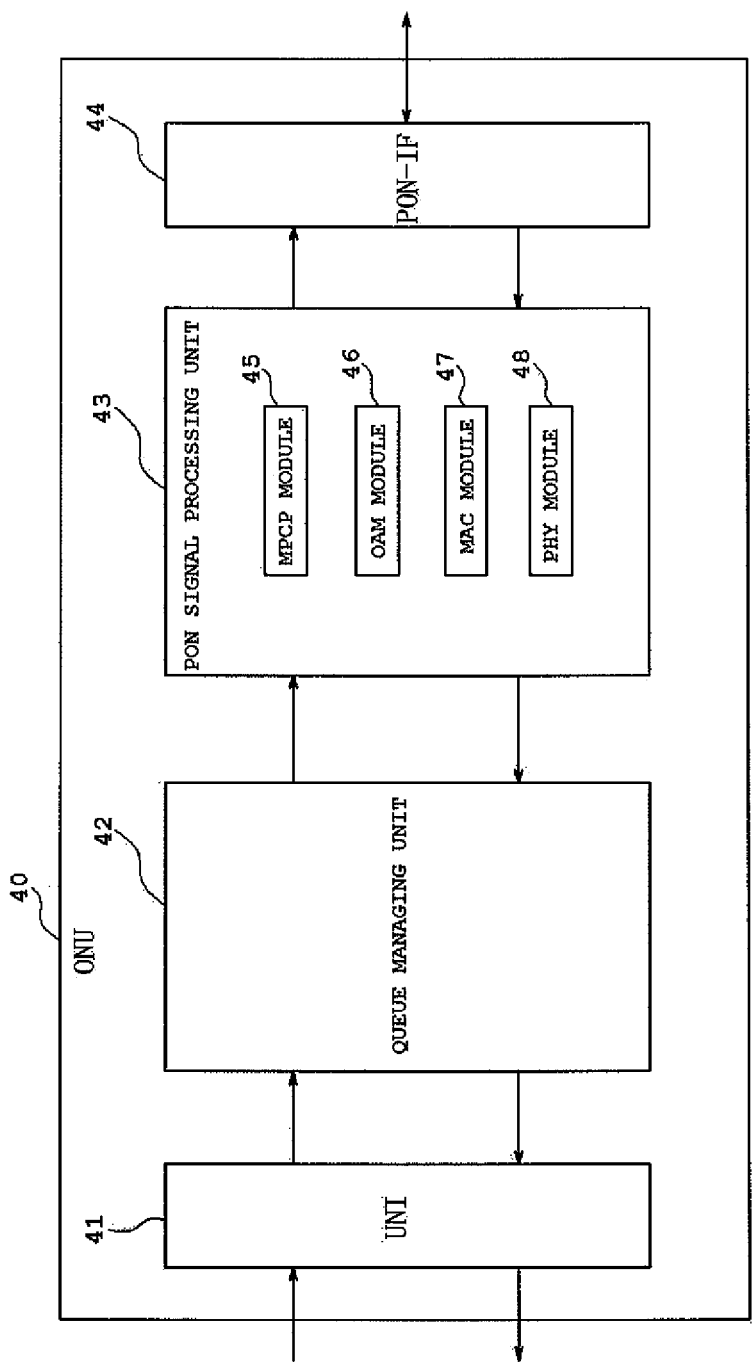
FIG. 36 is a functional block diagram of a conventional ONU in an EPON.

In each embodiment, the case of the EPON and the 10G-EPON is described. However, it is apparent that the present disclosure can be applied to other PONs, for example, a B-PON, a G-PON, a WDM-PON, and a CDM-PON based on the ITU-T advice. Further, the present disclosure can be applied to the optical network of the point-to-point type illustrated in FIG. 28.

(Embodiment 4)

An optical network according to this embodiment is an optical network in which one optical line terminal (OLT) performs point-to-point or point-to-multi-point communication with one or plural optical network units (ONU) through an optical fiber transmission path. It is a characteristic of the optical network to include an observing unit that observes information of any one or all of an arrival interval of frames, an instantaneous bandwidth under use of a flow, a queue length of a queue to temporarily store the frames, and a traffic type and a stop determining unit that dynamically determines a sleep period to be a period in which a sleep state where partial functions of the ONU are stopped is maintained, on the basis of the information obtained by the observing unit. The ONU is entered into the sleep state immediately after the communication ends, after a predetermined waiting time passes from when the communication ends, or after the waiting time determined on the basis of the information passes from when the communication ends.

Figure 37:
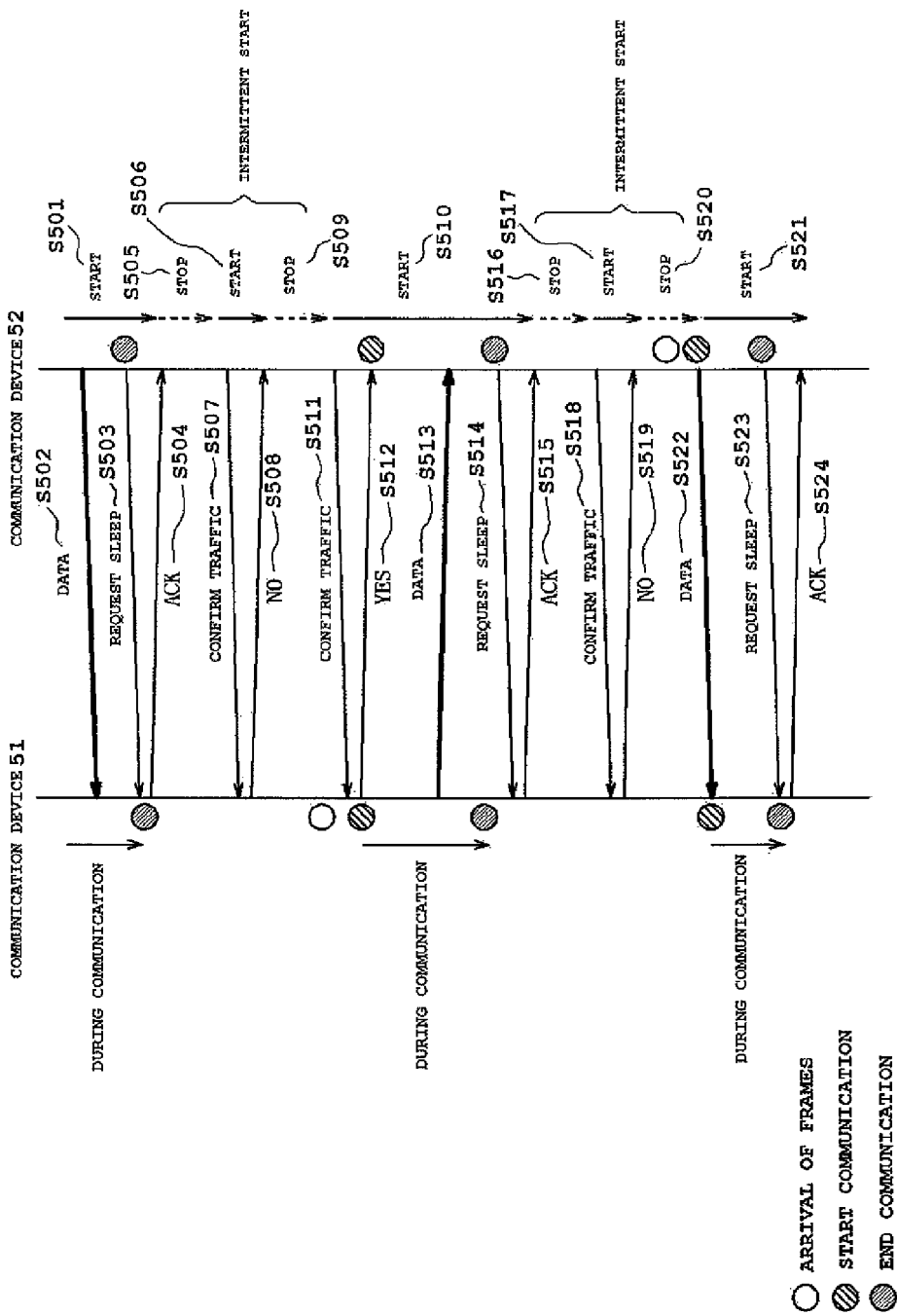
FIG. 37 is a diagram illustrating an autonomous intermittent start method.
Figure 39:
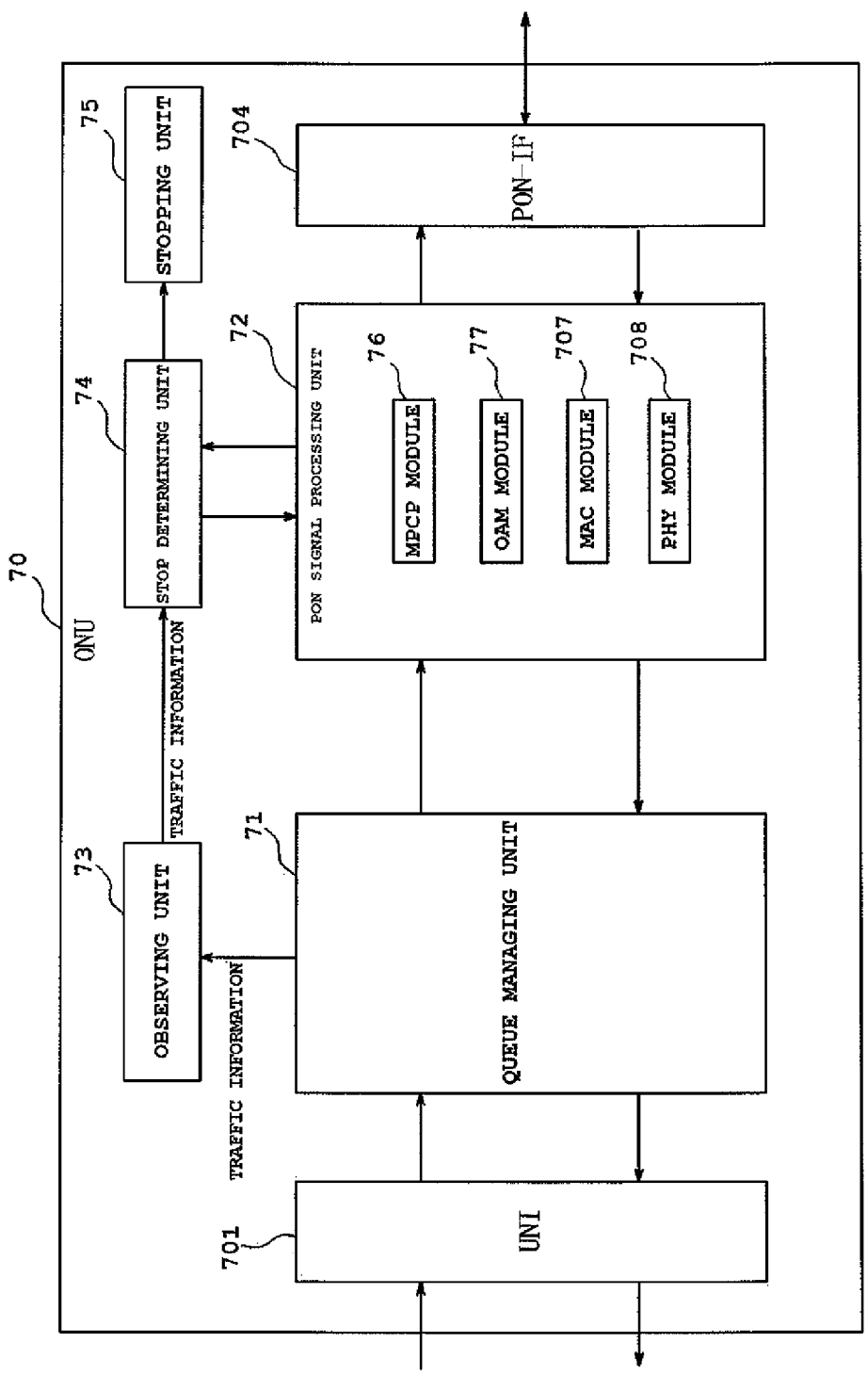
FIG. 39 is a diagram illustrating the configuration of an ONU according to the present disclosure.

The configuration of the ONU according to the present disclosure in the case where an autonomous intermittent start method illustrated in FIG. 37 is used is illustrated in FIG. 39.

An ONU 70 includes an UNI 701, a queue managing unit 71, a PON signal processing unit 72, a PON-IF 704, an observing unit 73, a stop determining unit 74, and a stopping unit 75.

The queue managing unit 71 temporarily stores frames (uplink frames) that are transmitted to the OLT and frames (downlink frames) that are received from the OLT.

The PON signal processing unit 72 has an MPCP module 76, an OAM module 77, a MAC module 707, and a PHY module 708.

The observing unit 73 monitors traffic. For example, the observing unit 73 monitors an arrival interval of the downlink frames, an instantaneous bandwidth under use, a queue length in a buffer, and a traffic type during the period of the predetermined time t1.

The stop determining unit 74 determines the sleep time and the waiting time, on the basis of the arrival interval of the downlink frames, the instantaneous bandwidth under use, the queue length in the buffer, and the traffic type. When it is determined that communication is in a non-communication state during the period of the predetermined time t1, the stop determining unit 74 transmits a sleep request message to the OLT, after transmission of the data frames ends. If the OLT receives the sleep request message from the ONU 70, the OLT transmits a confirmation response (ACK message) to the ONU 70.

If the ONU 70 receives the confirmation response (ACK message), the stopping unit 75 stops the partial functions (for example, functions of the queue managing unit 71, the PON signal processing unit 72, the observing unit 73, and the stop determining unit 74) of the ONU 70 during the period of the sleep time. After the sleep time passes, the stopping unit 75 starts the stopped partial functions and confirms whether traffic exists with respect to the OLT (traffic confirmation message). If the communication is in the non-communication state (NO message), the stopping unit 75 stops the partial functions during the period of the sleep time. If the frames arrive (YES message), the stopping unit 75 starts communication with the OLT.

The stopping unit 75 preferably has a function of immediately starting the partial functions to prevent transmission delay of frames and transmitting the frames to the OLT, when the traffic is transmitted from the UNI 701. When the individual messages (the sleep request message, the ACK message, the traffic confirmation message, the NO message, and the YES message) described above are transmitted and received, for example, the MPCP module 76 or the OAM module 77 can be used.

Figure 38:
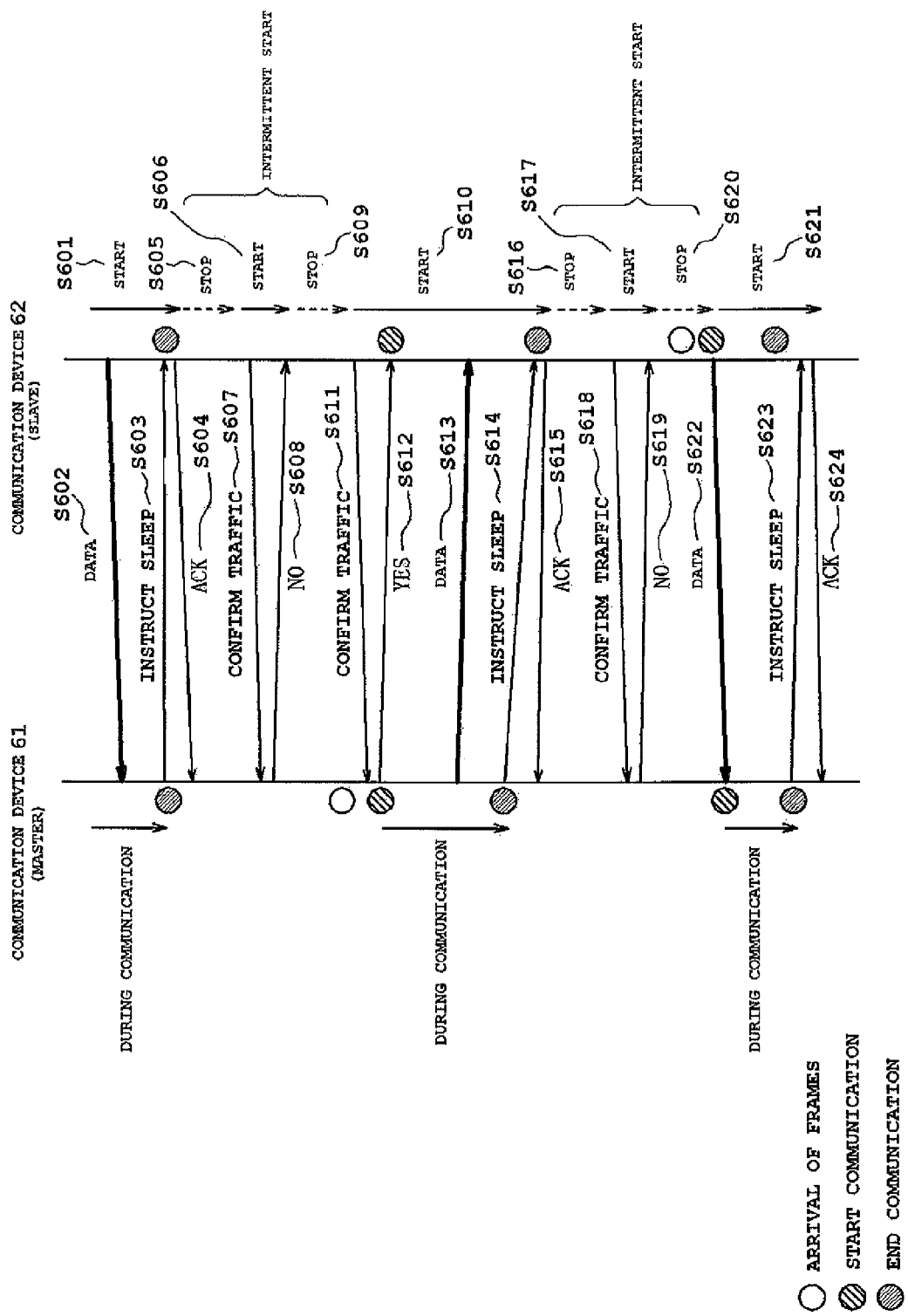
FIG. 38 is a diagram illustrating a master/slave type intermittent start method.
Figure 40:
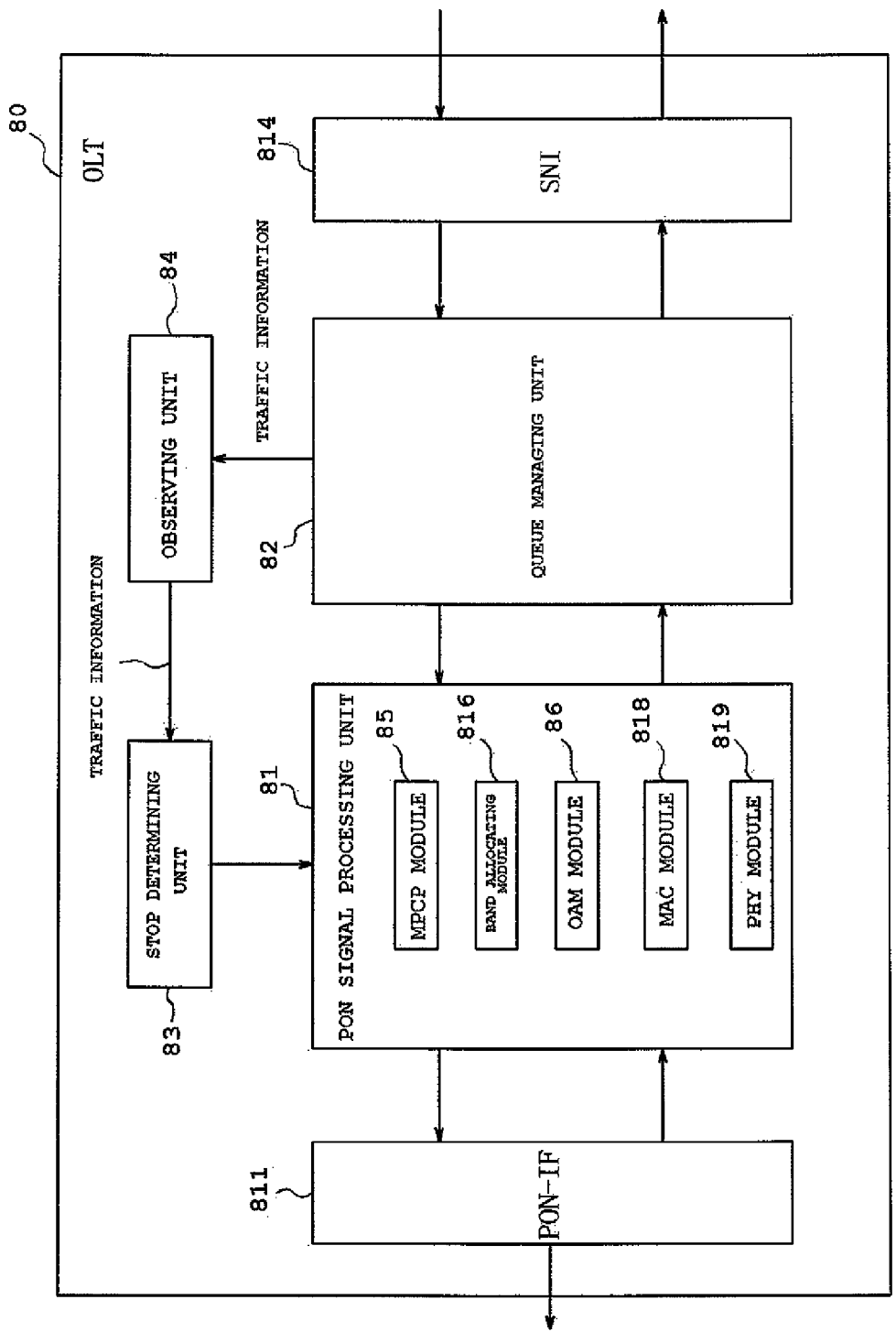
FIG. 40 is a diagram illustrating the configuration of an OLT according to the present disclosure.

The configuration of the OLT according to the present disclosure in the case where a master/slave type intermittent start method illustrated in FIG. 38 is used is illustrated in FIG. 40.

An OLT 80 includes a PON-IF 811, a PON signal processing unit 81, a queue managing unit 82, an SNI 814, a stop determining unit 83, and an observing unit 84.

The PON signal processing unit 81 has an MPCP module 85, a band allocating unit 816, an OAM module 86, a MAC module 818, and a PHY module 819, and receives a sleep instruction message from the stop determining unit 83, to be described below. The sleep instruction message is transmitted to the ONU.

The queue managing unit 82 temporarily stores frames that are transmitted to the ONU and frames that are received from the ONU.

The observing unit 84 monitors traffic for each of the ONUS connected to the OLT 80. For example, the observing unit 84 monitors an arrival interval of downlink frames, an instantaneous bandwidth under use, a queue length in a buffer, and a traffic type during the period of the predetermined time t1.

The stop determining unit 83 determines the sleep time and the waiting time, on the arrival interval of the downlink frames, the instantaneous bandwidth under use, on the basis of the queue length in the buffer, and the traffic type. When it is determined that communication is in a non-communication state during the period of the predetermined time t1, the stop determining unit 83 transmits a sleep instruction message to the ONU, after transmission of the data frames ends, and stops the partial functions of the ONU. The sleep instruction message preferably includes information of the sleep time and/or the waiting time.

Figure 41:
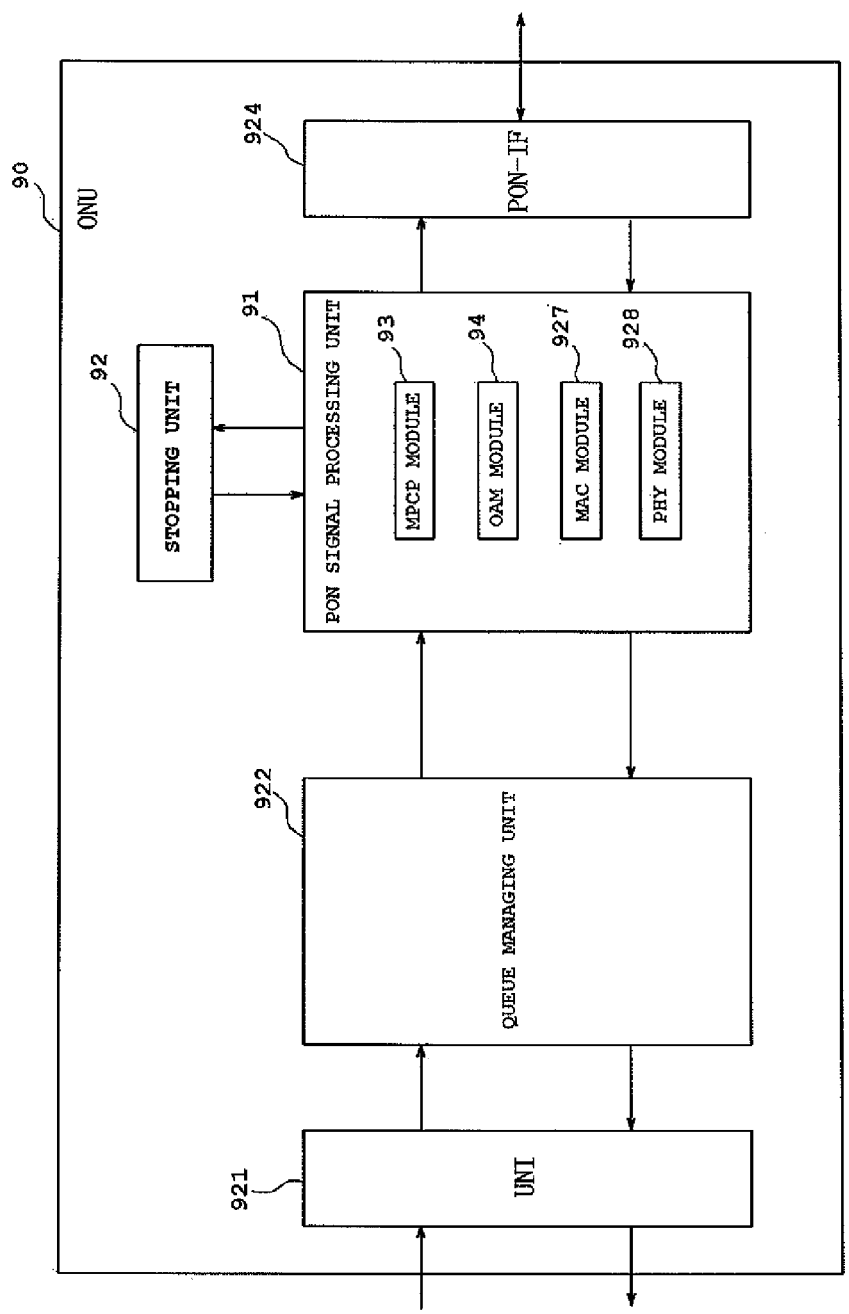
FIG. 41 is a diagram illustrating the configuration of an ONU according to the present disclosure.

The configuration of the ONU according to the present disclosure in the case where a master/slave type intermittent start method illustrated in FIG. 38 is used is illustrated in FIG. 41.

An ONU 90 includes a UNI 921, a queue managing unit 922, a PON signal processing unit 91, a PON-IF 924, and a stopping unit 92.

The PON signal processing unit 91 has an MPCP module 93, an OAM module 94, a MAC module 927, and a PHY module 928, and exchanges a message with the stopping unit 92 to be described below.

If the stopping unit 92 receives the sleep instruction message from the OLT 80, the stopping unit 92 transmits a confirmation response (ACK message) to the OLT 80 and stops the partial functions (for example, functions of the queue managing unit 922 and the PON signal processing unit 91) of the ONU 90 during the period of the sleep time.

The stopping unit 92 starts the stopped partial functions after the sleep time passes and confirms whether traffic exists with respect to the OLT 80 (traffic confirmation message). If the communication is in the non-communication state (NO message), the stopping unit 92 stops the partial functions during the period of the sleep time. If the frames arrive (YES message), the stopping unit 92 starts communication with the OLT 80.

The stopping unit 92 preferably has a function of immediately starting the partial functions to prevent transmission delay of frames and transmitting the frames to the OLT 80, when the traffic is transmitted from the UNI 921. When the traffic to be transmitted from the UNI 921 exists, the stopping unit 92 can return a rejection response (NACK message) with respect to a sleep instruction from the OLT 80 and end the stop of the partial functions. When the messages (the ACK message, the NACK message, the traffic confirmation message, the NO message, and the YES message) described above are transmitted and received, for example, the MPCP module 93 or the OAM module 94 can be used.

As such, in the optical network according to this embodiment, power of the optical network can be efficiently saved by dynamically determining the sleep time to be the period to maintain the sleep state where the partial functions of the ONU are stopped according to the traffic characteristics such as the frame arrival interval, the instantaneous bandwidth under use, the queue length in the buffer, and the traffic type.

The stop determining unit 83 sets a maximum value and a minimum value for the sleep time. In the case of at least one of the case where the arrival interval of the frames obtained by the observing unit 84 is smaller than a threshold value of the arrival interval of the frames, the case where the instantaneous bandwidth under use is greater than a threshold value of the instantaneous bandwidth under use, and the case where the queue length is greater than a threshold value of the queue length, the stop determining unit 83 maintains the ONU in the normal state. Meanwhile, in the case of at least one of the case where the arrival interval of the frames obtained by the observing unit 84 is equal to or greater than the threshold value of the arrival interval of the frames, the case where the instantaneous bandwidth under use is equal to or smaller than the threshold value of the instantaneous bandwidth under use, and the case where the queue length is equal to or smaller than the threshold value of the queue length, the stop determining unit 83 enters the ONU into the sleep state and sets the sleep time to a value between the maximum value and the minimum value.

When the arrival interval of the frames obtained by the observing unit 84 is equal to or greater than the threshold value of the arrival interval of the frames, the stop determining unit 83 calculates the sleep time using following equations: $T1=Tmin+(Tmax-Tmin)*f(p)$ and $f(p)=(1-(Th1/p))$ or $f(p)=(p-Th1)/(Th1'-Th1)$ (in this case, T1 indicates the sleep time, Tmin indicates the minimum value of the sleep time, Tmax indicates the maximum value of the sleep time, Th1 indicates the threshold value of the arrival interval of the frames, p indicates the arrival interval of the frames, and Th1' indicates the maximum threshold value of the arrival interval of the frames).

When the instantaneous bandwidth under use of the frames obtained by the observing unit 84 is equal to or smaller than the threshold value of the instantaneous bandwidth under use, the stop determining unit 83 calculates the sleep time using following equations: $T1=Tmin+(Tmax-Tmin)*f(B)$ and $f(B)=(1-(B/Th2))$ or $f(B)=(Th2-B)/(Th2-Th2')$ (in this case, T1 indicates the sleep time, Tmin indicates the minimum value of the sleep time, Tmax indicates the maximum value of the sleep time, Th2 indicates the threshold value of the instantaneous bandwidth under use, B indicates the instantaneous bandwidth under use, and Th2' indicates the minimum value of the instantaneous bandwidth under use).

When the queue length obtained by the observing unit 84 is equal to or smaller than the threshold value of the queue length, the stop determining unit 83 calculates the sleep time using following equations: $T1=Tmin+(Tmax-Tmin)*f(q)$ and $f(q)=(1-(q/Th3))$ or $f(q)=(Th3-q)/(Th3-Th3')$ (in this case, T1 indicates the sleep time, Tmin indicates the minimum value of the sleep time, Tmax indicates the maximum value of the sleep time, Th3 indicates the threshold value of the queue length, q indicates the queue length, and Th3' indicates the minimum value of the queue length).

Further, it is preferable that the stop determining unit 83 uses an average value of information obtained during the past predetermined period in at least one of the arrival interval of the frames, the instantaneous bandwidth under use, and the queue length.

In the OLT of the case of using the master/slave type intermittent start method or the ONU of the case of using the autonomous intermittent start method, the stop determining unit 83 has a function of determining the non-stop of the partial functions of the ONU, when the traffic of the specific type is observed by the observing 84.

In the OLT or the ONU, the observing unit 84 uses a value of a type of service (ToS) or a value of a class of service (CoS) and/or a report message transmitted to the OLT, when the frames of the specific type are observed.

The observing unit 84 does not observe the frames that are discarded in the ONU.

The traffic of the specific type includes at least one of voice over Internet protocol (VoIP) traffic, real-time transport protocol (RTP) traffic, and traffic having the specific priority.

The ONU has a function of notifying the OLT of the stop of the partial functions or the non-stop of the partial functions.

The stopping unit 92 has a function of immediately starting the stopped partial functions, when the frames from the terminal connected to the ONU are received, while the partial functions are stopped.

The OLT includes a unit that temporarily stores the arrived frames, when the traffic to be transmitted to the ONU is generated, while the ONU stops the partial functions.

The present disclosure is not limited to the embodiments described above and the components can be modified and specified within a range that does not depart from the scope of the present disclosure in implementing the embodiments. Further, various disclosures can be made by appropriately combining the plural components disclosed in the embodiments. For example, some components may be removed from all the components disclosed in the embodiments. Further, the components that are disclosed in the different embodiments may be appropriately combined.

The invention claimed is:

1. An optical line terminal in an optical network in which the optical line terminal (OLT) and an optical network unit (ONU) communicate with each other through an optical fiber transmission path, the OLT including:

an observing unit that observes information selected from the group consisting of at least one of protocol information of frames transmitted to the ONU, protocol information of frames received from the ONU, priority information of frames transmitted to the ONU, priority information of frames received from the ONU and combinations of the foregoing, wherein the protocol information of frames transmitted to or received from the ONU is protocol-type or priority information that is in a header of client data traffic input from and/or output to outside of a passive optical network (PON) and transmitted over the PON;

a table that describes a plurality of previously designated sleep times, each previously designated sleep time being a period in which non-used functions of the ONU are stopped, wherein the previously designated sleep times are set prior to the observing unit observing the frames of information that would lead to initiating a sleep state for each of the priority information and/or the protocol information; and a table associating unit that dynamically selects the sleep time of the ONU from among the plurality of previously designated sleep times described in the table, wherein the previously designated sleep time is selected on the basis of the priority information and/or the protocol information obtained by the observing unit in real time, wherein a control signal to notify the ONU of a sleep state entering request and the selected sleep time is transmitted to the ONU at a time selected from the group consisting of immediately after communication with the ONU ends, after a predetermined time passes from when the communication with the ONU ends, or after a time determined on the basis of the priority information and/or the protocol information passes from when the communication with the ONU ends.

2. An optical line terminal according to claim 1, wherein the previously designated sleep times are $T(0)$, $T(1)$, ..., $T(n)$ milliseconds where $T(0) > T(1) > ... > T(n)$, and wherein the previously designated sleep times are set to traffic having priorities of 0, 1, 2, ..., n, respectively.

3. An optical line terminal according to claim 1, wherein the previously designated sleep times are 50 ms, 30 ms, 10 ms, and 5 ms that are set to traffic having priorities of 0, 1, 2, and 3, respectively.

4. A method of controlling a sleep state of an optical network unit in an optical network in which an optical line terminal (OLT) and the optical network unit (ONU) communicate with each other through an optical fiber transmission path, the method including:

a step that the OLT observes information selected from the group consisting of at least one of protocol information of frames transmitted to the ONU, protocol information of frames received from the ONU, priority information of frames transmitted to the ONU, priority information of frames received from the ONU and combinations of the foregoing, wherein the protocol information of frames transmitted to or received from the ONU is protocol-type or priority information that is in a header of client data traffic input from and/or output to outside of a passive optical network (PON) and transmitted over the PON;

a step that the OLT dynamically selects a sleep time of the ONU from among a plurality of previously designated sleep times described in a table on the basis of the priority information and/or the protocol information observed in real time, each of the plurality of previously designated sleep times being a period in which non-used functions of the ONU are stopped, wherein the previously designated sleep times are set prior to the observing unit observing the frames of information that would lead to initiating a sleep state for each of the priority information and/or the protocol information;

a step that the OLT transmits a control signal to notify the ONU of a sleep state entering request and the selected sleep time to the ONU at a time selected from the group consisting of immediately after communication with the ONU ends, after a predetermined time passes from when the communication with the ONU ends, or after a time determined on the basis of the priority information and/or the protocol information passes from when the communication with the ONU ends;

a step that the ONU recognizes the sleep state entering request and the selected sleep time using the control signal received from the OLT; and a step that the ONU enters into the sleep state at a time selected from the group consisting of immediately after the control signal is received, after a predetermined time passes from when the control signal is received, or after a time designated by the OLT passes from when the control signal is received, and returns to a normal state after the sleep time passes.

5. A method of controlling a sleep state of an optical network unit in an optical network according to claim 4, wherein the previously designated sleep times are $T(0)$, $T(1)$, ..., $T(n)$ milliseconds where $T(0) > T(1) >, ..., > T(n)$, and wherein the previously designated sleep times are set to traffic having priorities of 0, 1, 2, ..., n, respectively.

6. A method of controlling a sleep state of an optical network unit in an optical network according to claim 4, wherein the previously designated sleep times are 50 ms, 30 ms, 10 ms, and 5 ms that are set to traffic having priorities of 0, 1, 2, and 3, respectively.

7. An optical network system, including:

one optical line terminal (OLT) and one optical network unit (ONU), wherein the OLT performs point-to-point communication with the ONU through an optical fiber transmission path, the OLT including:

an observing unit that observes information selected from the group consisting of at least one of protocol information of frames transmitted to the ONU, protocol information of frames received from the ONU, priority information of frames transmitted to the ONU, priority information of frames received from the ONU and combinations of the foregoing, wherein the protocol information of frames transmitted to or received from the ONU is protocol-type or priority information that is in a header of client data traffic input from and/or output to outside of a passive optical network (PON) and transmitted over the PON;

a table that describes a plurality of previously designated sleep times, each previously designated sleep time being a period in which non-used functions of the ONU are stopped, wherein each of the sleep times is set prior to the observing unit observing the frames of information that would lead to initiating a sleep state for each of the priority information and/or the protocol information; and a table associating unit that dynamically selects the sleep time of the ONU from among the plurality of previously designated sleep times described in the table on the basis of the priority information and/or the protocol information obtained by the observing unit in real time, wherein a control signal to notify the ONU of a sleep state entering request and the selected sleep time is transmitted to the ONU at a time selected from the group consisting of immediately after communication with the ONU ends, after a predetermined time passes from when the communication with the ONU ends, or after a time determined on the basis of the priority information and/or the protocol information passes from when the communication with the ONU ends, the ONU including:
a sleep unit that stops non-used functions to enter into a sleep state,
wherein a sleep state entering request and the selected sleep time being a period in which the sleep state is maintained are recognized using a control signal received from the OLT, wherein the ONU is entered into the sleep state by the sleep unit at a time selected from the group consisting of immediately after the control signal is received, after a predetermined time passes from when the control signal is received, or after a time designated by the OLT passes, and the ONU returns to a normal state after the selected sleep time passes.

8. An optical network system according to claim 7, wherein the previously designated sleep times are $T(0), T(1), \ldots, T(n)$ milliseconds where $T(0) > T(1) > \ldots > T(n)$, and wherein the previously designated sleep times are set to traffic having priorities of $0, 1, 2, \ldots, n$, respectively.

9. An optical network system according to claim 7, wherein the previously designated sleep times are 50 ms, 30 ms, 10 ms, and 5 ms that are set to traffic having priorities of 0, 1, 2, and 3, respectively.

10. An optical network system, including:
one optical line terminal (OLT) and a plurality of optical network units (ONU),
wherein the OLT performs point-to-multi-point communication with the plurality of ONUs through an optical fiber transmission path,
the OLT including:
an observing unit that observes information selected from the group consisting of at least one of protocol information of frames transmitted to the ONU, protocol information of frames received from the ONU, priority information of frames transmitted to the ONU, priority information of frames received from the ONU and combinations of the foregoing, wherein the protocol information of frames transmitted to or received from the ONU is protocol-type or priority information that is in a header of client data traffic input from and/or output to outside of a passive optical network (PON) and transmitted over the PON;
a table that describes a plurality of previously designated sleep times, each previously designated sleep time being a period in which non-used functions of at least one of the plurality of ONUs are stopped, wherein each of the sleep times is set prior to the observing unit observing the frames of information that would lead to initiating a sleep state for each of the priority information and/or the protocol information; and
a table associating unit that dynamically selects the sleep time of at least one of the plurality of ONUs from among the plurality of previously designated sleep times described in the table on the basis of the priority information and/or the protocol information obtained by the observing unit in real time,
wherein a control signal to notify at least one of the plurality of ONUs of a sleep state entering request and the selected sleep time is transmitted to the at least one of the plurality of ONUs at a time selected from the group consisting of immediately after communication with the at least one of the plurality of ONUs ends, after a predetermined time passes from when the communication with the at least one of the plurality of ONUs ends, or after a time determined on the basis of the priority information and/or the protocol information passes from when the communication with the at least one of the plurality of ONUs ends,
at least one of the plurality of ONUs including:
a sleep unit that stops non-used functions to enter into a sleep state, wherein a sleep state entering request and the selected sleep time being a period in which the sleep state is maintained are recognized using a control signal received from the OLT, and wherein the at least one of the plurality of ONUs is entered into the sleep state by the sleep unit at a time selected from the group consisting of immediately after the control signal is received, after a predetermined time passes from when the control signal is received, or after a time designated by the OLT passes, and the at least one of the plurality of ONUs returns to a normal state after the sleep time passes.

11. An optical network system according to claim 10, wherein the previously designated sleep times are $T(0), T(1), \ldots, T(n)$ milliseconds where $T(0) > T(1) > \ldots > T(n)$, and wherein the previously designated sleep times are set to traffic having priorities of $0, 1, 2, \ldots, n$, respectively.

12. An optical network system according to claim 10, wherein the previously designated sleep times are 50 ms, 30 ms, 10 ms, and 5 ms that are set to traffic having priorities of 0, 1, 2, and 3, respectively.

* * * * *